United States Patent
Shioya et al.

(10) Patent No.: US 6,824,905 B2
(45) Date of Patent: Nov. 30, 2004

(54) POWER SUPPLY SYSTEM AND DEVICE DRIVEN BY POWER SUPPLY SYSTEM

(75) Inventors: Masaharu Shioya, Akiruno (JP); Hidetoshi Akao, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 112 days.

(21) Appl. No.: 10/043,404

(22) Filed: Jan. 10, 2002

(65) Prior Publication Data

US 2002/0094462 A1 Jul. 18, 2002

(30) Foreign Application Priority Data

Jan. 15, 2001 (JP) .............................. 2001-006127
Oct. 5, 2001 (JP) .............................. 2001-309800
Nov. 28, 2001 (JP) .............................. 2001-363082

(51) Int. Cl.[7] .......................... H01M 8/04; H01M 16/00
(52) U.S. Cl. .......................... 429/22; 429/9; 429/23
(58) Field of Search .............................. 429/9, 22, 23, 429/24, 25

(56) References Cited

U.S. PATENT DOCUMENTS

| | | | |
|---|---|---|---|
| 4,883,724 A | * 11/1989 | Yamamoto | 429/23 |
| 5,439,758 A | * 8/1995 | Stone et al. | 429/22 X |
| 5,641,585 A | 6/1997 | Lessing et al. | |
| 5,714,874 A | * 2/1998 | Bonnefoy | 323/299 |
| 5,759,712 A | 6/1998 | Hockaday | |
| 5,814,970 A | 9/1998 | Schmidt | |
| 5,932,365 A | 8/1999 | Lin et al. | |
| 5,976,725 A | 11/1999 | Gamo et al. | |
| 6,096,448 A | * 8/2000 | Wilkinson et al. | 429/22 X |

FOREIGN PATENT DOCUMENTS

| | | |
|---|---|---|
| DE | 44 31 747 A1 | 3/1995 |
| EP | 1 009 054 A2 | 6/2000 |
| WO | WO 96/04564 A | 2/1996 |
| WO | WO 00/35032 A2 | 6/2000 |

OTHER PUBLICATIONS

Patent Abstracts of Japan, vol. 015, No. 106 (E–1044), Mar. 13, 1991 and JP 02–311134 A (Fuji Electric Co. Ltd.), Dec. 26, 1990—Abstract only.

G. Cacciola et al: "Technology up date and new strategies on fuel cells", Journal of Power Sources, Elsevier Sequoia S.A., Lausanne, Switzerland, vol. 100, No. 1–2, Nov. 30, 2001, pp. 67–79, XP004322175, ISSN: 0378-7753, paragraph 0003.

* cited by examiner

Primary Examiner—Stephen J. Kalafut
(74) Attorney, Agent, or Firm—Frishauf, Holtz, Goodman & Chick, P.C.

(57) ABSTRACT

A power supply system generates supply electric power by using a power generation fuel. The system includes a fuel charged portion in which the power generation fuel is charged, a power generator which generates power generation electric power by using the power generation fuel, an output controller which operates or stops the power generator and, a start-up controller which supplies start-up electric power used for operating the output controller to the output controller.

33 Claims, 35 Drawing Sheets

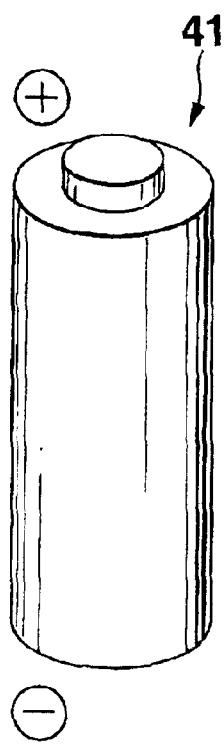
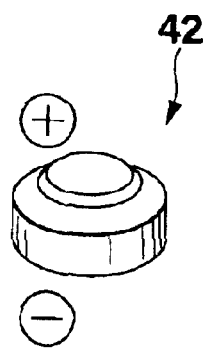
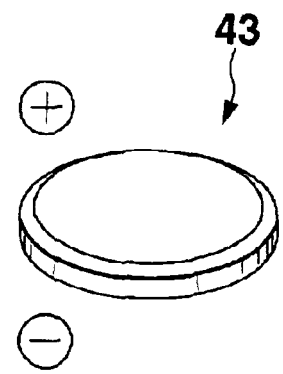
FIG.28A   FIG.28B   FIG.28C
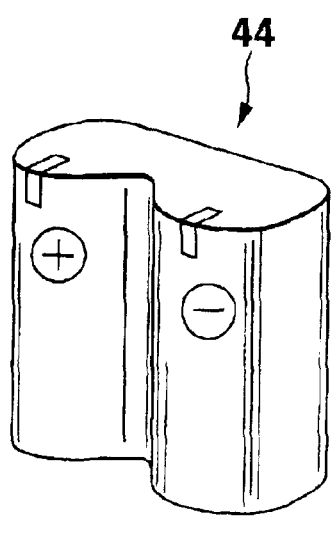
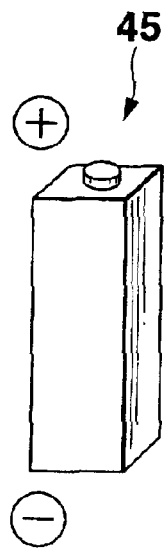
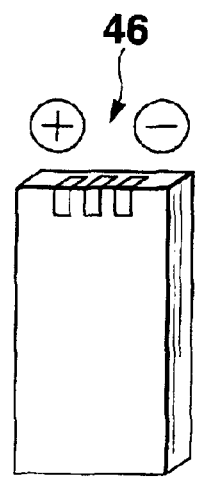
FIG.28D   FIG.28E   FIG.28F

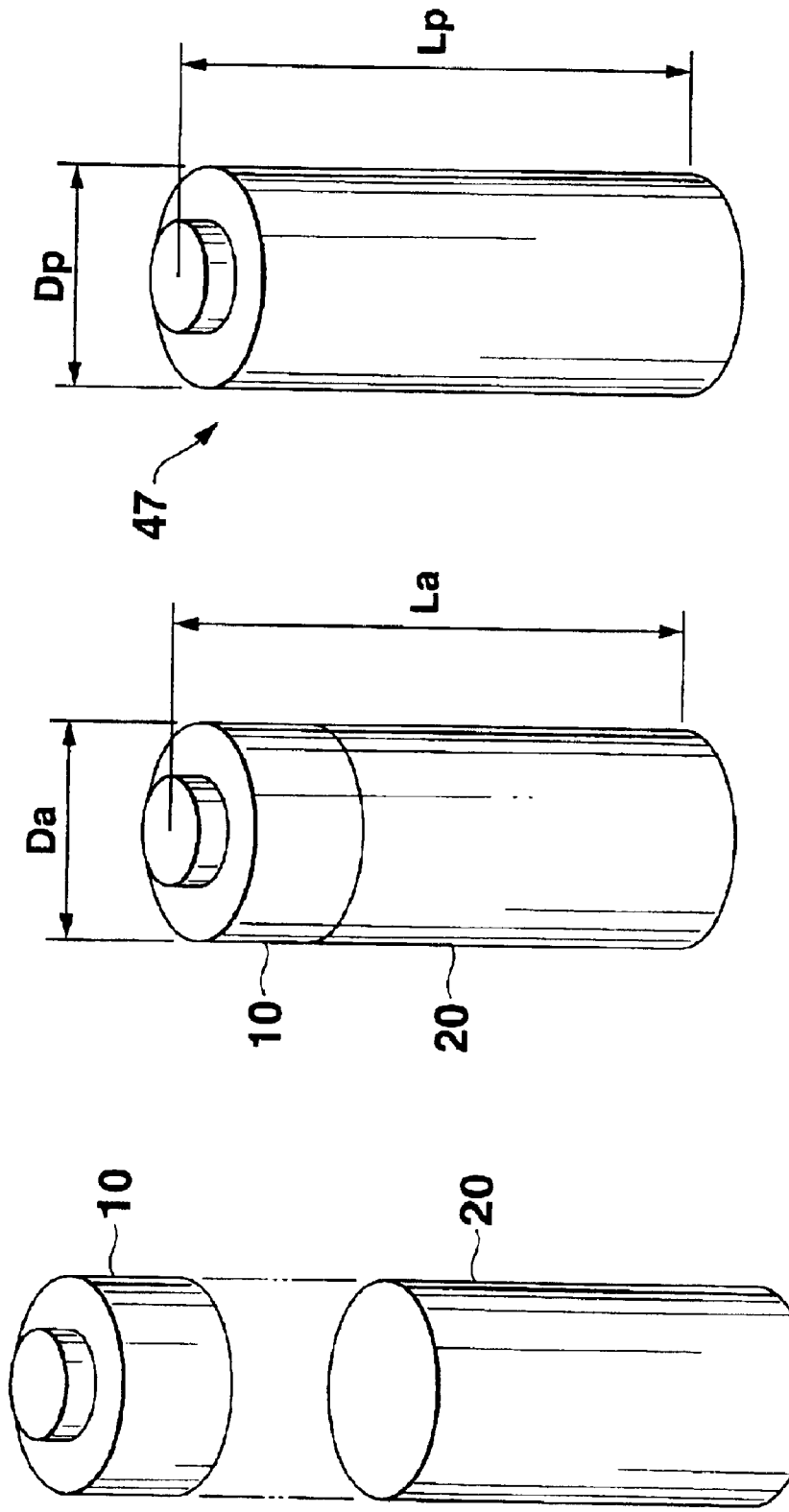

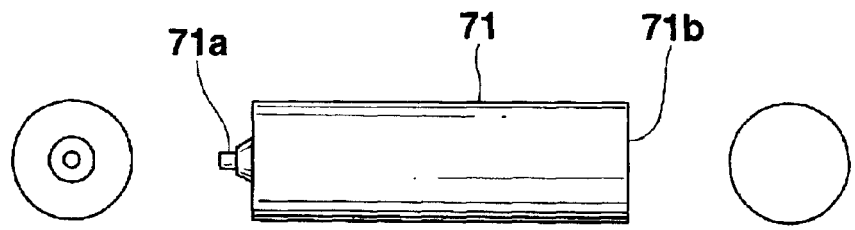
FIG.32A   FIG.32B   FIG.32C
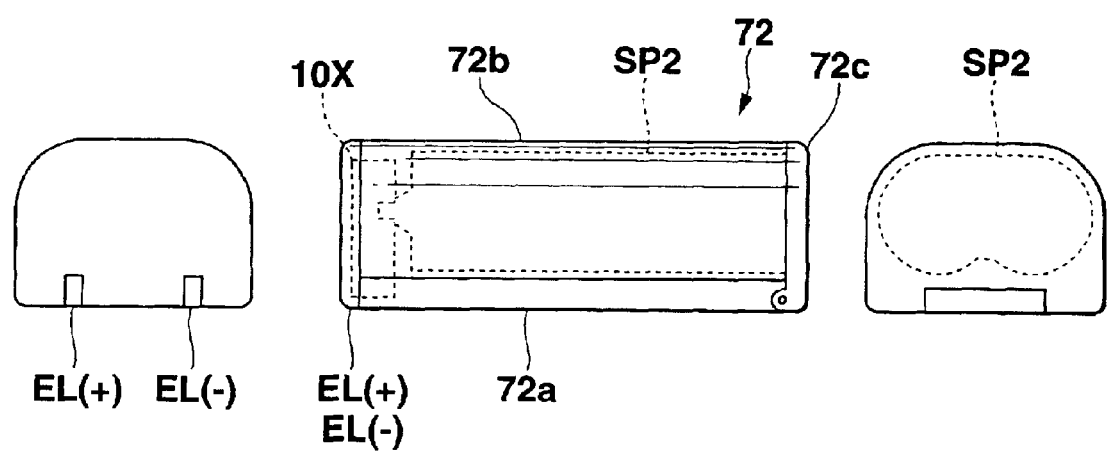
FIG.32D   FIG.32E   FIG.32F

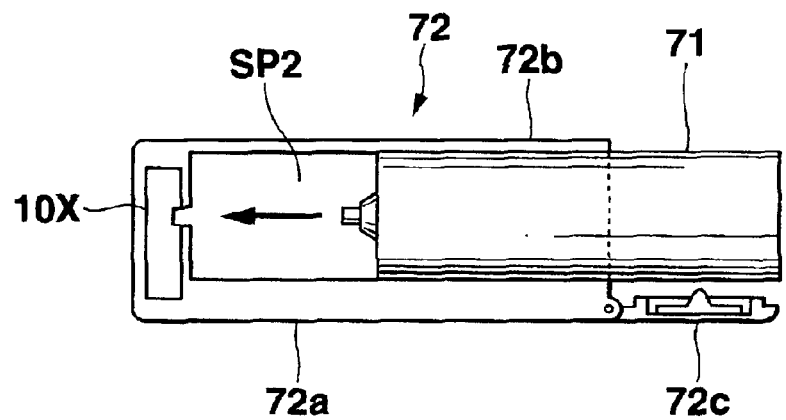
FIG.33A
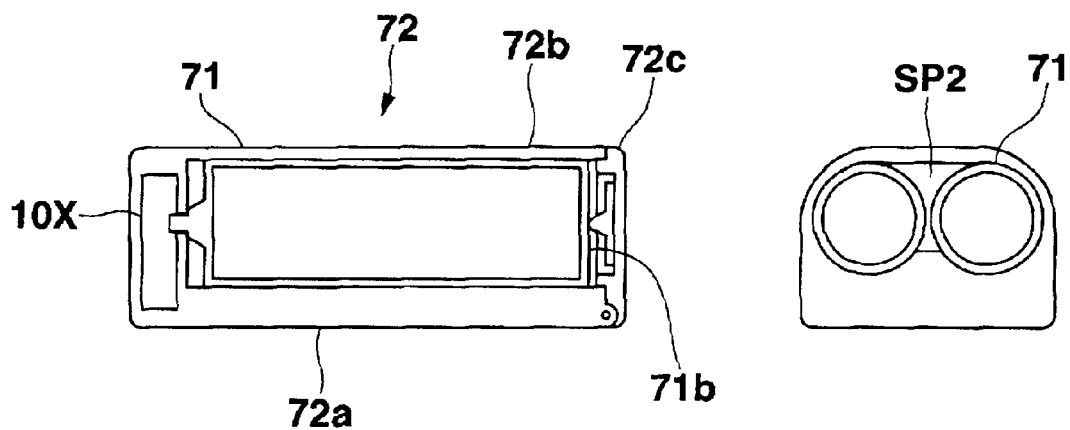
FIG.33B  FIG.33C

POWER SUPPLY SYSTEM AND DEVICE DRIVEN BY POWER SUPPLY SYSTEM

CROSS-REFERENCE TO RELATED APPLICATIONS

This application is based upon and claims the benefit of priority from the prior Japanese Patent Applications No. 2001-6127, filed Jan. 15, 2001, No. 2001-309800, filed Oct. 5, 2001; and No. 2001-363082, filed Nov. 28, 2001, the entire contents of all of which are incorporated herein by reference.

BACKGROUND OF THE INVENTION

1. Field of the Invention

The present invention relates to a power supply system, and more particularly to a power supply system applicable as a portable power supply system and having a power generation function capable of effectively utilizing an energy resource to generate, and to an electric device provided with the power supply system.

2. Description of the Related Art

In all household and industrial fields, various kinds of chemical cells are used. For example, a primary cell such as an alkaline dry cell or a manganese dry cell is often used in watches, cameras, toys, and portable acoustic devices, and it has a characteristic that its quantity of production is large from the global viewpoint and it is inexpensive and readily available.

A secondary cell such as a lead storage battery, a nickel-cadmium storage battery, a nickel-hydrogen storage battery, a lithium ion battery is often used in mobile phones or personal digital assistances (PDA) which are in widespread use in recent portable devices such as a digital video camera or a digital still camera, and it has a characteristic which is superior in the economical efficiency because it can be repeatedly charged and discharged. Among secondary cells, the lead storage battery is utilized as a start-up power supply for vehicles or marine vessels or an emergency power supply in industrial facilities or medical facilities and the like.

In recent years, with the rising interest in environmental concerns or energy problems, problems concerning waste materials generated after use of chemical cells such as described above or those concerning the energy conversion efficiency have come under close scrutiny.

The primary cell has its inexpensive product price and is readily available as described above, and there are many devices which utilize this cell as a power supply. Further, basically, when the primary cell is once discharged, the battery capacity can not be recovered, namely, it can be used only once (which is a so-called disposable battery). A quantity of waste materials per year, therefore, exceeds, several millions tons. Here, there is static information mentioning that a ratio of the entire chemical cells which are collected for recycling is only approximately 20% and remaining approximately 80% is thrown away in the natural world or subjected to landfill disposal. Thus, there is fear of environmental destruction and disfigurement of the natural environment by heavy metal such as mercury or indium included in such uncollected batteries.

Verifying the above-described chemical battery in the light of the efficiency of use of an energy resource, since the primary cell is produced by utilizing the energy which is approximately 300-fold of the dischargeable energy, the efficiency of use of the energy is less than 1%. Even in case of the secondary cell which can be repeatedly charged and discharged and is superior in the economical efficiency, when the secondary cell is charged from a domestic power supply (convenience outlet) or the like, the efficiency of use of the energy drops to approximately 12% due to the efficiency of power generation in an electric power plant or the transmission loss. Therefore, it can not be said that the energy resource is necessarily efficiency utilized.

Thus, the attention is recently drawn on various kinds of new power supply systems or power generation systems (which will be generically referred to as a "power supply system" hereinafter) including a fuel battery which has less influence (burden) on the environment and is capable of realizing the extremely high energy utilization efficiency of, e.g., approximately 30 to 40%. Furthermore, for the purpose of application to a drive power supply for vehicles or a power supply system for business use, a cogeneration system for domestic use and others, or substitution for the above-described chemical cell, study and development for practical application are carried out extensively.

In the future, however, in order to reduce the size and weight of a power supply system having a high energy utilization efficiency such as a fuel cell and apply this system as a substitute (compatible product) for a transportable or portable power supply, for example a chemical cell as described above, there are following problems.

Specifically, for example, in an existing chemical cell, basically, since a predetermined voltage and an electric current are supplied and a load can be driven by only connecting positive and negative electrode terminals to the load, there is an advantage that such a chemical cell can be easily handled.

On the contrary, since most of the power supply systems having the high energy utilization efficiency including a fuel cell basically have a function as power generating means using a predetermined power generation fuel (for example, a power generator which directly or indirectly converts the chemical energy of the fuel into electric power), they are largely different from the above-described chemical cell in the structure or the electrical characteristic.

That is, in the power supply system, as similar to the general-purpose chemical cell, predetermined electric power can not be supplied or shut off by only connecting or disconnecting the electrode terminals (terminals corresponding to the positive electrode terminal and the negative electrode terminal in the general-purpose chemical cell) used for supplying electric power with respect to the load. Therefore, the power supply system disadvantageously requires a complicated structure or control processing in order to drive or stop the load and the power supply system. Further, in case of applying such a power supply system as a portable power supply, since a quantity of the power generation fuel which can be carried or transported is restricted, the power generation fuel must be controlled to be efficiently consumed and the operating time (duration of life) as the power supply system must be further prolonged.

BRIEF SUMMARY OF THE INVENTION

According to the present invention, a power supply system which generates predetermined electric power by using a power generation fuel can be easily handled by connecting a load with an electrode terminal directly, as similar to the general-purpose chemical cell. Also, in the present invention there are advantages that loss of the power generation fuel may be controlled, thereby improving the utilization efficiency of an energy resource and making the operating time more prolonged.

The power supply system according to the present invention, to obtain above-mentioned advantages, uses the power generation fuel and generates supply electric power, and comprises at least a fuel charged portion in which the power generation fuel is charged, power generating means for generating the supply electric power by using the power generation fuel supplied from the fuel charged portion and including a fuel reforming type fuel cell for example, output controlling means for operating or stopping the power generating means, start-up controlling means for supplying start-up electric power used for operating the output controlling means to the output controlling means.

The start-up controlling means supplies electric power independent from the operation of the power generating means to the output controlling means as the start-up electric power at the time of starting up the power generating means, and supplies electric power based on the power generation electric power generated by the power generating means to the output control portion as the start-up electric power after starting up the power generating means. The start-up controlling means may include a primary cell which holds predetermined electric power independently from the operation of the power generating means as the start-up electric power or a start-up power supply portion which holds the electric power charged and held by the electric power supplied from outside, and supplies the electric power to the output controlling means as the start-up electric power at the time of starting up the power generating means. In addition, the start-up controlling means may include an auxiliary electric power holding portion which charges a part of the power generation electric power generated by the power generating means, and supplies charge electric power of the auxiliary electric power holding portion to the output controlling means as the start-up electric power after starting up the power generating means.

Hereby, the operation in the power supply system which generates supply electric power by using the power generation fuel may be controlled by a simple control to perform or stop the operation of the power generation means, and the cost of the power supply system can be decreased. Only at an initial stage of the start-up operation in the power generation means, the start-up electric power is supplied from the start-up power supply portion. Then, the power generating operation is kept by supplying the feedback electric power based on the power generating electric power as the start-up electric power, thereby performing the start-up operation excellently for a long period by using a primary cell having very small capacitance as the part of the start-up power supply portion.

Furthermore, the power supply system which generates supply electric power by using the power generation fuel according to the other aspect of the present invention comprises at least, in an electric power generation portion, electric power holding means for holding electric charge based on the power generation electric power generated by the power generating means, supply electric power generating means for generating the supply electric power based on held electric power held in the electric power holding means, system controlling means for controlling operation or stop of the power generating means and charge or stop of the electric power holding portion in accordance with a change of the held electric power.

Hereby, the operation of the power supply system can be controlled only for operation or stop of the power generation means according to a condition of held electric power held in the electric power holding means, thereby simplifying the construction and the operation control of the device. Also, in the operation of the power supply system, constant supply electric power may be output based on the electric power held in the electric power holding means kept under predetermined pressure, and so unnecessary power generation operation of the power generation means may be avoided and loss of the power generation fuel may be controlled, thereby improving the energy utilization efficiency highly. As result, the present invention provides the power supply system that can operate for a long time.

Furthermore, the present invention may apply as the electric power holding means a structure that is constituted by one or more capacitance elements, or a structure in which a plurality of capacitance elements are connected with a predetermined relationship, for example a structure that is able to switch the connection in series or in parallel.

Hereby, in comparison with the case applying as the electric power holding means the general-purpose secondary cell and the like, the weight of the device can be decreased remarkably, and the load which is connected to the power supply system may be driven by the supply electric power based on the held electric power. Thereby, even if driving condition changes rapidly, constant electric power may be supplied relatively. Also, even if the power generation fuel is consumed absolutely and so the fuel charged portion is removed and changed to another one, the electric power stored in the electric power holding portion can be output constantly for a moment, thereby keeping the generation of supply electric power and then the driving of the load.

In addition, in the power supply system according to the present invention, the whole power supply system or at least the fuel charged portion may be detachably constituted with respect to the electric device which includes the load operating by supply electric power supplied from the power supply system. The fuel charged portion is detachably constituted with respect is to the electric power generation portion.

The electric power generation portion is modularized for example. The electric power supply portion has the physical outer profile that is constituted to have size and dimensions equivalent to one of different general-purpose chemical cells, and has a double-electrode terminal structure.

Hereby, when the power generation fuel charged in the fuel charged portion is consumed or decreased, the fuel charged portion may be removed from the power generation portion and changed to new fuel charged portion. As a result, it is possible to use the power generation module constantly, and to simply use the whole power supply system or the fuel charged portion like general-purpose chemical cell. The change and recovery of the fuel charged portion will be possible, and so in the whole power supply system a waste amount may be decreased. In the outer profile, also, the high compatibility with the general-purpose chemical cell may be kept, whereby the power supply system that has very high energy conversion efficiency can be popularized in the existing market of the chemical cell, without difficulty.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 28A to 28F are views for schematically showing a designated example of outside shapes applicable to the power supply system according to the present invention, respectively;

FIGS. 29A to 29C are conceptual views schematically showing a correspondence relationship between outside shapes applicable to the power supply system according to the present invention and outside shapes of a general-purpose chemical cell, respectively;

FIGS. 32A to 32F are views for schematically showing outside shapes of a fuel pack and a holder portion of the power supply system according to the second embodiment of the detachable structure according to the present invention, respectively;

FIGS. 33A to 33C are schematic views showing a detachable structure of a power generation module and a fuel pack of the power supply system according to the second embodiment of the detachable structure according to the present invention respectively;

DETAILED DESCRIPTION OF THE INVENTION

Embodiments of a power supply system according to the present invention will now be described hereinafter with reference to the accompanying drawings.

The entire outline of a structure to which the power supply system according to the present invention is applied will be first explained in conjunction with the drawings.

Figure 1A:
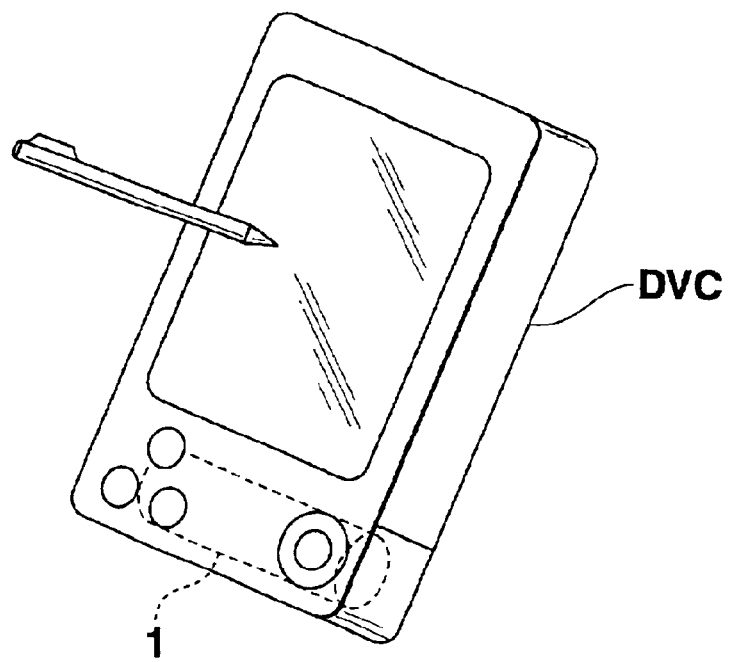
FIGS. 1A and 1B are conceptual view for schematically showing application of a power supply system according to one embodiment of the present invention.
Figure 1B:
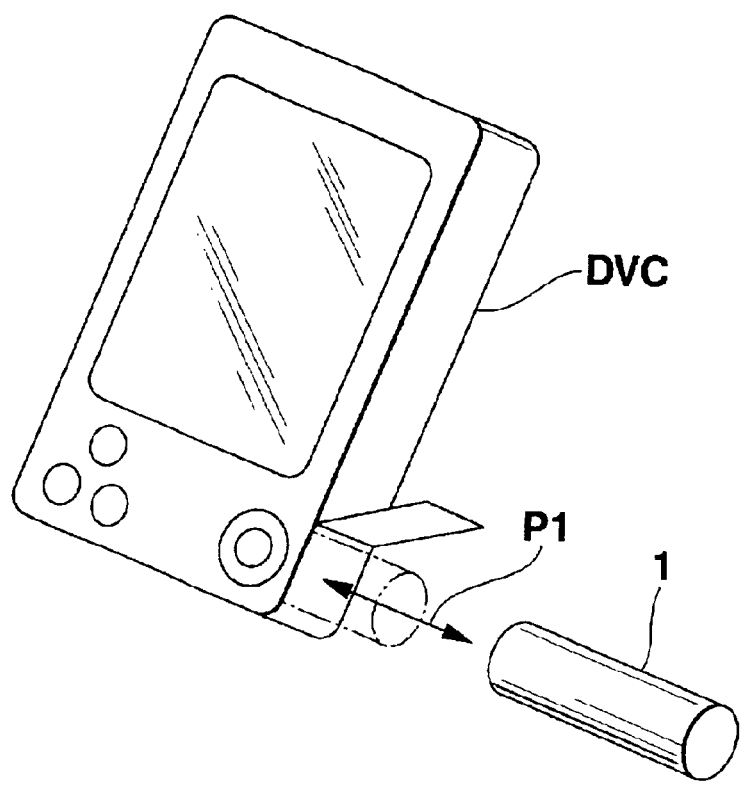

FIGS. 1A and 1B are conceptual views showing an example of the application conformation of the power supply system according to the present invention.

For example, the power supply system 1 according to the present invention is formed as a module, and a part or the whole thereof can be arbitrarily attached to and removed from (see an arrow P1) an existing electric/electronic device (FIGS. 1A and 1B show a personal digital assistant: which will be generally referred to as a "device" hereinafter) DVC which operates by a general-purpose primary cell or a secondary cell, as well as a specific electric/electronic device, as shown in FIGS. 1A and 1B. The power supply system 1 is configured so that a part or the whole thereof can be independently portable. To the power supply system 1 is provided electrodes having a positive electrode and a negative electrode for supplying electric power to the device DVC at a predetermined position (for example, a position equivalent to the general-purpose primary cell or secondary cell as will be described later).

The basic structure of the power supply system according to the present invention will now be described.

FIGS. 2A to 2D are block diagrams showing basic structure concept of the power supply system according to the present invention.

Figure 2A:
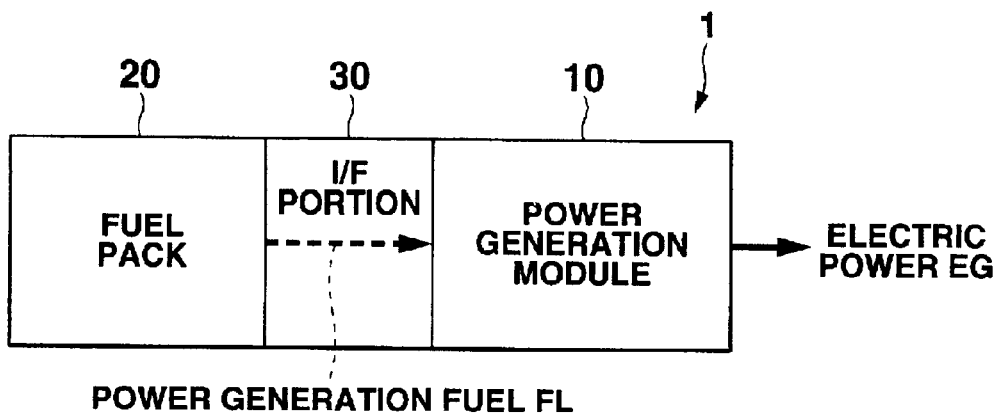
FIGS. 2A to 2D are block diagrams showing basic structures of the power supply system according to the present invention respectively.
Figure 2B:
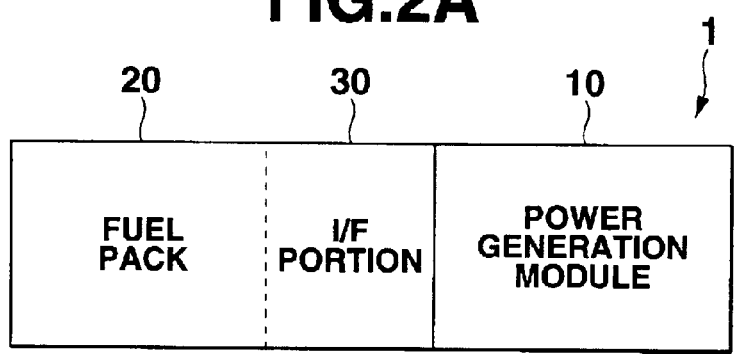
Figure 2C:
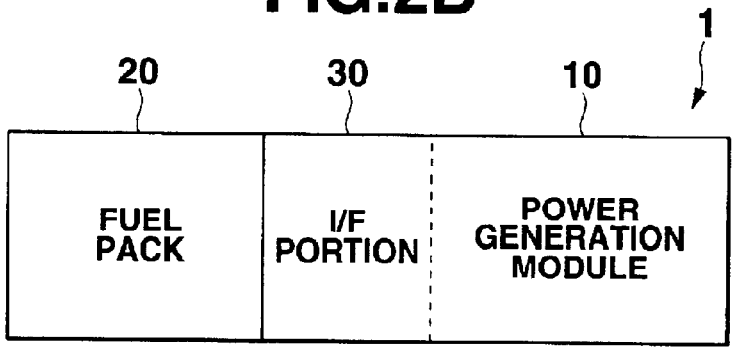
Figure 2D:
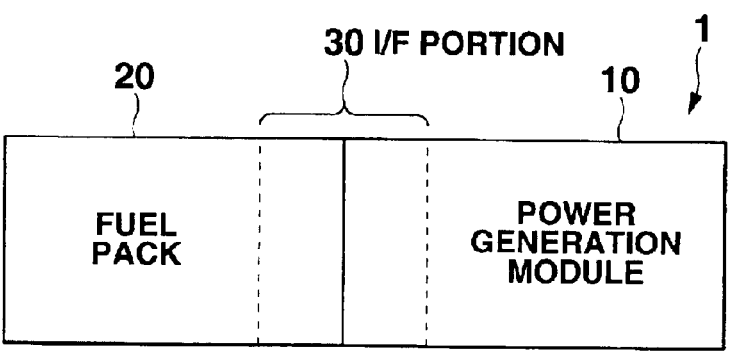

As shown in FIG. 2A, the power supply system 1 according to the present invention roughly includes: a fuel pack (fuel charging portion) 20 in which a power generation fuel FL consisting of a liquid fuel and/or a gas fuel is charged; a power generation portion or module 10 for generating electric power EG (power generation) based on at least the power generation fuel FL supplied from the fuel pack 20; and an interface portion (which will be abbreviated as an "I/F portion" hereinafter) 30 provided with a fuel feed path or the like for supplying the power generation fuel FL charged in the fuel pack 20 to the power generation portion 10, and physically connecting the fuel pack 20 and the power generation portion 10 with each other. The respective constituent parts are configured so that they can be coupled with and separated from each other (attachable and detachable) in an arbitrary conformation, or they are integrally configured. Also, as shown in FIG. 2A, the I/F portion 30 may be structured independently from the fuel pack 20 and the power generation portion 10, or structured integrally with either the fuel pack 20 or the power generation portion 10 as shown in FIGS. 2B and 2C. Alternatively, as shown in FIG. 2D, each divided part of the I/F portion 30 may be configured to be provided internally to each of the fuel pack 20 and the power generation portion 10.

Furthermore, in each embodiment described hereafter, the power generation portion 10 is a portion of the power supply system except for the fuel pack 20 and the I/F portion 30. It is described as divided part purely for the purpose of its description. For example, as described hereafter, the power generation portion 10 may be formed as module, but the present invention is not restricted thereto, and may have a structure of each embodiment described hereafter as the power supply system.

The structure of each block will now be concretely described.

[First Embodiment]

(A) Electric Power Generation Portion

Figure 3:
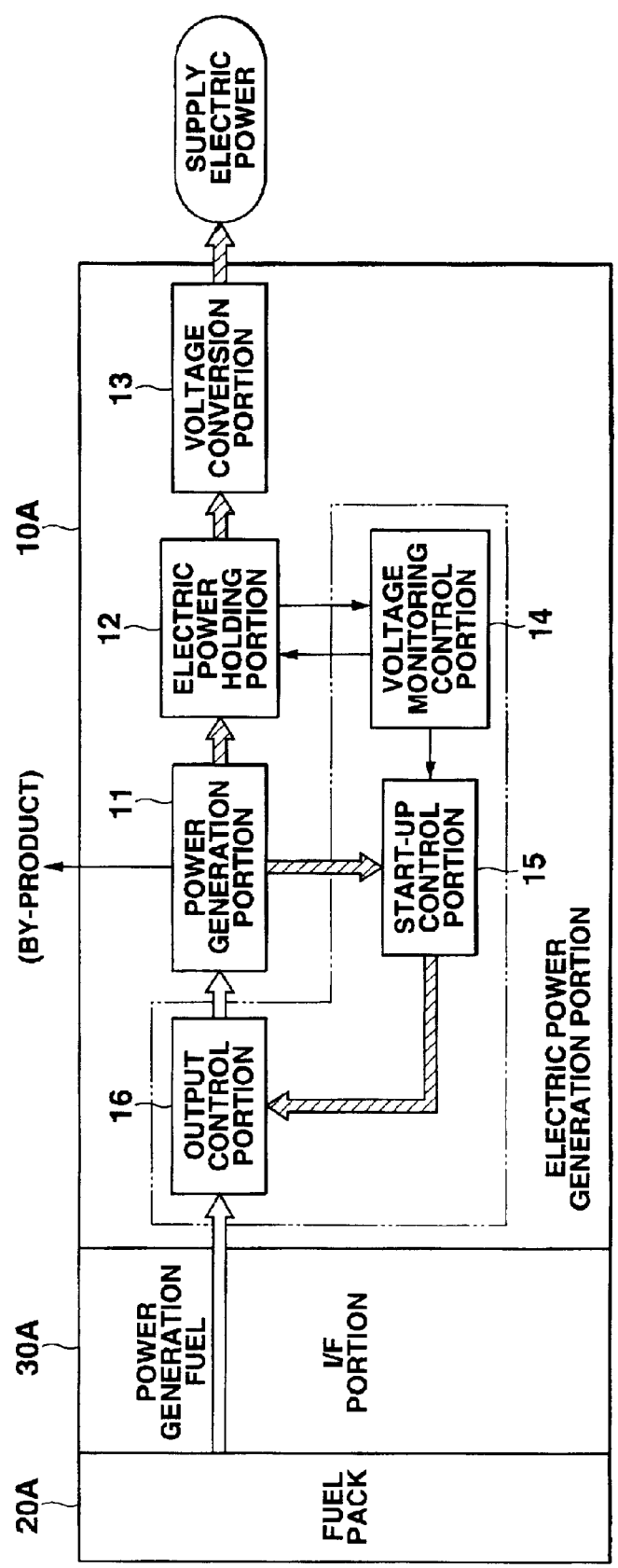
FIG. 3 is a block diagram showing a first embodiment of an electric power generation portion applied to the power supply system according to the present invention.

FIG. 3 is a block diagram showing a first embodiment of an electric power generation portion which is applied to the power supply system according to the present invention. Here, the power supply system has a double-electrode terminal structure provided with only a positive electrode terminal and a negative electrode terminal which output predetermined supply electric power, is connected to a predetermined device through these terminals, and outputs predetermined electric power used for driving the device (load).

The electric power generation portion according to this embodiment includes electric power holding means having a function for storing electric power generated by power generating means, and has a structure that supply electric power having a predetermined voltage based on electric power stored (held) in the electric power holding means is generated and it is supplied to the device (load) as load drive electric power. The following gives the concrete description.

As shown in FIG. 3, the electric power generation portion 10A according to this embodiment is configured to generally include: a power generation portion (power generating means) 11 which uses a power generation fuel FL supplied from a fuel pack 20A through an I/F portion 30A and generates predetermined electric power; electric power holding portion (electric power holding means) 12 including a secondary cell, a capacitor or the like which temporarily holds electric power (generated power) generated in the power generation portion 11 and then continuously outputs electric power having a constant voltage; a voltage conversion portion 13 which converts a voltage component of the electric power outputted from the electric power holding portion 12 into a predetermined voltage suitable for driving the device to which the power supply system is connected and outputs it to the non-illustrated device as supply electric power; a voltage monitor/control portion 14 which monitors a change in the voltage component of the electric power (held electric power) held in the electric power holding portion and generates and outputs a control signal used for controlling an operation state in the electric power generation portion 11 in accordance with the change and a storage state (charge state) of the electric power in the electric power holding portion 12; a start-up control portion (start-up controlling means) 15 which supplies start-up electric power used for shifting (start-up) the power generation portion 11 to a power generation state based on the control signal from the voltage monitor/control portion 14; and an output control portion (output controlling means) 16 which operates with the start-up electric power from the start-up control portion 15, controls supply and shutoff of the power generation fuel FL to the power generation portion 11 and controls the operation state (the power generation operation and the stop operation) in the power generation portion 11.

Here, the voltage monitor/control portion 14, the start-up control portion 15 and the output control portion 16 in this embodiment constitute system controlling means according to the present invention.

Furthermore, in the electric power generation portion 10A according to this embodiment, the electric power generated by the power generation portion 11 is held (stored) in the electric power holding portion 12, and then commonly supplied to the controller and the load of a non-illustrated device through predetermined electrode terminals as supply electric power having a constant voltage component. Also, the voltage component of the held electric power which can be the supply electric power in the electric power holding portion 12 is monitored, for example, constantly or with an arbitrary timing by the voltage monitor/control portion 14.

Each structure will now be described concretely hereinafter.

<Power Generation Portion>

As shown in FIG. 3, the power generation portion 11 applied to the electric power generation portion 10A according to this embodiment has a structure that the power generation fuel FL is supplied from the fuel pack 20A through the output control portion 16 based on the operation (ON operation) of the output control portion 16 involved by supply of the start-up electric power from the later-descried start-up control portion 15 and the physical or chemical energy that the power generation fuel FL has is used in order to generate predetermined electric power.

Figure 4:
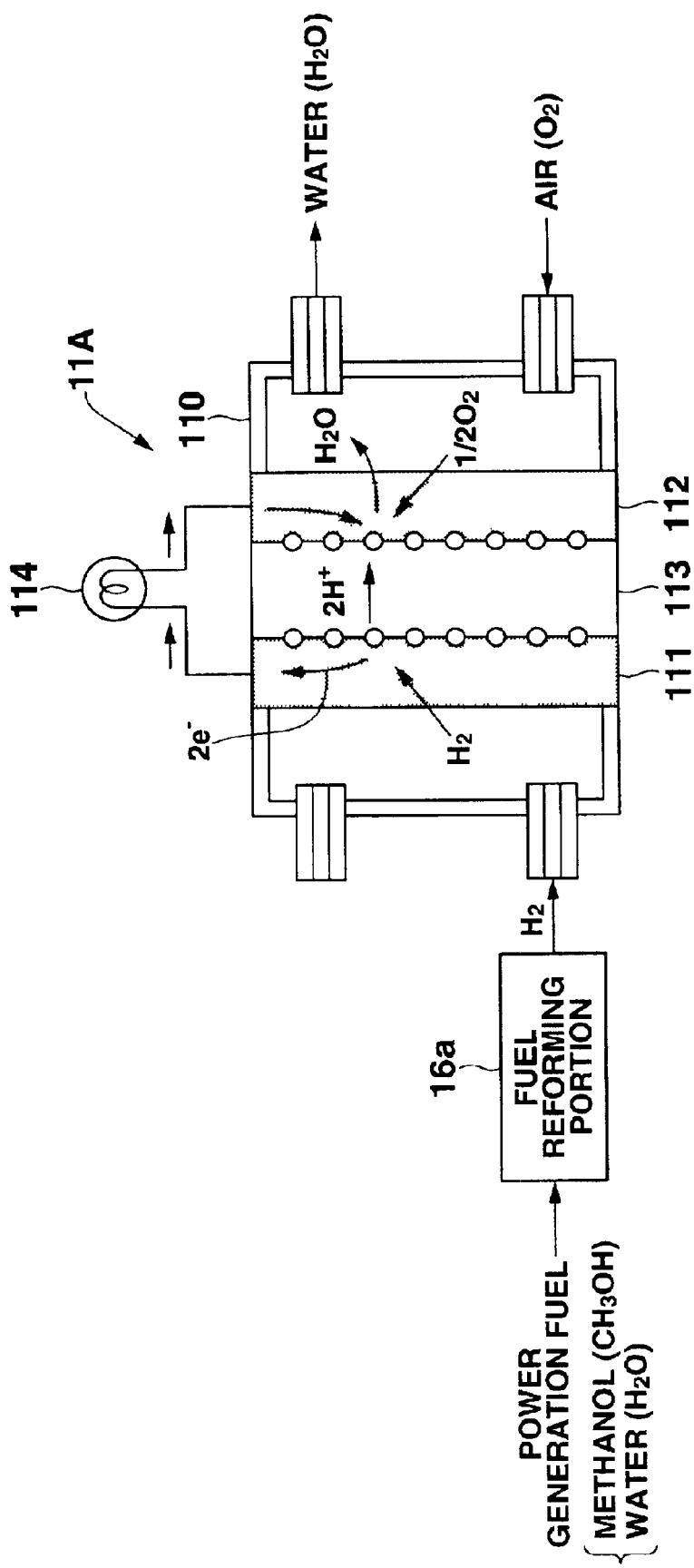
FIG. 4 is a view for schematically showing a structural example of a power generation portion applicable to a first embodiment of the electric power generation portion applied to a power supply system according to the present invention.
Figure 5:
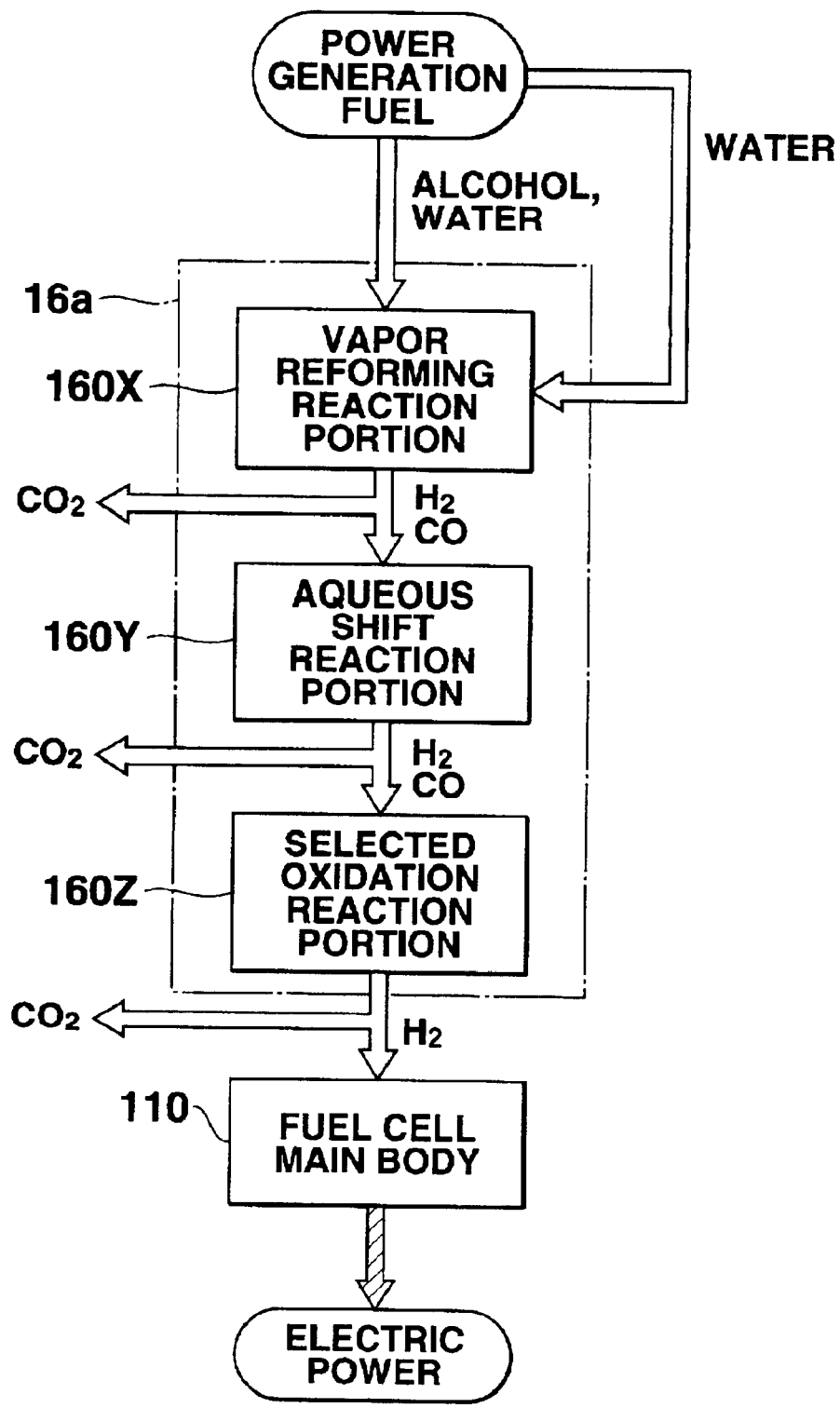
FIG. 5 is a block diagram for schematically showing a structure of a fuel reforming portion applied to a power generation portion according to the embodiment.

FIG. 4 is a view schematically showing a structural example of the power generation portion applicable to the power generation portion according to this embodiment. FIG. 5 is a schematic view of a structure of a fuel reforming portion applied to the power generation portion according to this embodiment. Here, the example will be appropriately described in conjunction with the structure of the above-described power supply system (FIG. 3).

In this structural example, as a concrete example, the power generation portion 11 has a structure of a proton-exchange membrane fuel cell adopting the fuel reforming system by which the power generation fuel FL supplied through the output control portion 16 from the fuel pack 20A is used and the electric power is generated by the electrochemical reaction.

Incidentally, although a fuel reforming portion shown in FIG. 5 will be described with the structure of the power generation portion 11 for the sake of explanation, the fuel reforming portion constitutes a part of the later-described output control portion in the light of the configuration of the electric power generation portion according to the present invention.

As shown in FIG. 4, the power generation portion 11A is configured to include a fuel cell main body (fuel cell) 110 which utilizes a specific fuel component (hydrogen) contained in the power generation fuel FL extracted by the fuel reforming portion (fuel reformer) 16a which performs a predetermined reforming reaction with respect to the power generation fuel FL supplied from the fuel pack 20A and generates electric power used for driving a predetermined load (corresponding to each portion in a device DVC or a power generation module 10A) by the electrochemical reaction.

Here, as shown in FIG. 5, the fuel reforming portion 16a includes: a vapor reforming reaction portion 160X which generates hydrogen, carbon dioxide as a by-product and a small amount of carbon monoxide from the power generation fuel FL which consists of alcohol and water and is supplied from the fuel pack 20A through a vapor reforming reaction process; an aqueous shift reaction portion 160Y which causes carbon monoxide supplied from the vapor reforming reaction portion 160 to react with water contained in the power generation fuel or water emitted from the fuel cell main body 110 as a by-product as will be described later through the aqueous shift reaction process and generates carbon dioxide and hydrogen; and a selected oxidation reaction portion 160A which causes carbon monoxide which has not reacted in the aqueous shift reaction portion 160Y but remained to react with oxygen and generates carbon dioxide through the selected oxidation reaction process. The fuel reforming portion 16a has a function to supply hydrogen obtained by reforming the power generation fuel FL charged in the fuel pack 20A to the fuel cell main body 110 and perform detoxication of a small amount of generated carbon monoxide. That is, the fuel cell main body 110 generates predetermined electric power which can be the supply electric power for the device DVC and the operating electric power for each portion in the power generation module 10A from hydrogen gas having the high density generated in the vapor reforming reaction portion 160X and the aqueous shift reaction portion 160Y.

The function of each part constituting the fuel reforming portion 16a is followed, as shown in FIG. 5, for example, in case of generating hydrogen gas ($H_2$) with methanol ($CH_3OH$) and water ($H_2O$) being used as the power generation fuel FL, in a vapor step in a vapor reforming reaction portion 16OX, methanol ($CH_3OH$) and water ($H_2O$) are first vaporized by setting methanol and water as the liquid fuel in the atmosphere under a temperature condition of approximately a boiling point by the heater controlled by electric power supplied from the start-up control portion 15.

Then, in the vapor reforming reaction process, by setting an atmosphere under a temperature condition of approximately 300° C. for vaporized methanol ($CH_3OH$) and water ($H_2O$) by using the heater, the thermal energy of 49.4 kJ/mol is absorbed, and hydrogen ($H_2$) and a small amount of carbon dioxide ($CO_2$) are generated as indicated by the following chemical equation (1). In the vapor reforming process, a small amount of carbon monoxide (CO) may be generated as a by-product besides hydrogen ($H_2$) and carbon dioxide ($CO_2$).

$$CH_3OH + H_2O \rightarrow 3H_2 + CO_2 \qquad (1)$$

Here, as shown in FIG. 5, an aqueous shift reaction portion 160Y and a selected oxidation reaction portion 160Z for eliminating carbon monoxide (CO) generated as a by-product in the vapor reforming reaction may be provided at the rear stage of the vapor reforming reaction portion 160X so that carbon monoxide (CO) can be converted into carbon dioxide ($CO_2$) and hydrogen ($H_2$) through the respective processes consisting of the aqueous shift reaction and the selected oxidation reaction, thereby suppressing emission of harmful substances. Specifically, in the aqueous shift reaction process in the aqueousshift reaction portion 210Y, the thermal energy of 40.2 kJ/mol is generated by causing water (vapor; $H_2O$) to react with carbon monoxide (CO), and carbon dioxide ($CO_2$) and hydrogen ($H_2$) are generated as indicated by the following chemical equation (2).

$$CO+H_2O \rightarrow CO_2+H_2 \qquad (2)$$

Then, in the aqueous shift reaction, the thermal energy of 283.5 kJ/mol is generated by causing oxygen ($O_2$) to react with carbon monoxide (CO) which has not been converted into carbon dioxide ($CO_2$) and hydrogen ($H_2$) by the selected oxidation reaction in the selected oxidation reaction portion 160Z, and carbon dioxide ($CO_2$) is generated as indicated by the following chemical equation (3).

$$CO+(\tfrac{1}{2})O_2 \rightarrow CO_2 \qquad (3)$$

Here, for example, a small amount of product (mainly carbon dioxide) other than hydrogen generated by a series of fuel reforming reactions mentioned above is emitted into air through an emission hole provided to the power generation module 10A described hereafter.

The concrete structure of the fuel reforming portion 16a having such a function will be explained later in the following concrete structural example together with other structures.

As shown in FIG. 4, the fuel cell body 110 generally includes: a fuel electrode (cathode) 111 consisting of a carbon electrode to which catalyst fine particles of, e.g., platinum, palladium, platinum-ruthenium adhere; an air electrode (anode) 112 consisting of a carbon electrode to which catalyst fine particles of, e.g., platinum adhere; and a film-like ion conductive membrane (exchange membrane) 113 interposed between the fuel electrode 111 and the air electrode 112. Here, hydrogen gas ($H_2$) extracted by the fuel reforming portion 16a is supplied to the fuel electrode 111, meanwhile oxygen gas ($O_2$) in air is supplied to the air electrode 212. As a result, power generation is carried out by the following electro-chemical reaction, thereby generating predetermined electric power for driving the load 114. Further, as shown hereafter, a part of electric power generated in the fuel cell body 110 is supplied to the output control portion 16 (a fuel control portion 16b, a heater control portion 16d) through the start-up control portion 15 as the start-up electric power according to needs (reference to FIG. 6).

Specifically, as an example of the electrochemical reaction in the power generation portion 11 (a fuel cell body 110) according to this structural example, when hydrogen gas ($H_2$) is supplied to the fuel electrode 111, the electron ($e^-$) is separated by the catalysis at the fuel electrode 111, the hydrogen ion (proton; $H^+$) is generated and passes to the air electrode 112 side through the ion conductive membrane 113, and the electron ($e^-$) is taken out by the carbon electrode constituting the fuel electrode 111 and supplied to the load 114, as indicated by the following chemical equation (4).

$$3H_2 \rightarrow 6H^+ + 6e^- \qquad (4)$$

When air is supplied to the air electrode 212, the electron ($e^-$) which has passed through the load 114 by the catalysis at the air electrode 112, the hydrogen ion ($H^+$) which has passed through the ion conductive membrane 113, and the oxygen gas ($O_2$) in air react with each other, and water ($H_2O$) is thereby generated, as indicated by the following chemical equation (5).

$$6H^+ + (\tfrac{3}{2})O_2 + 6e^- \rightarrow 3H_2O \qquad (5)$$

Such a series of the electrochemical reactions (chemical equations (4) and (5)) proceeds in the relatively low temperature environment of approximately 60 to 80° C., and the by-product other than the electric power (load drive electric power) is basically only water ($H_2O$). Here, by collecting water ($H_2O$) as a by-product generated at the air electrode 212 and supplying a necessary amount of water to the fuel reforming portion 16a provided to the output control portion 16, water can be reused for the fuel reforming reaction or the aqueous shift reaction of the power generation fuel FL, an amount of water ($H_2O$) stored (charged) in the fuel pack 20A in advance for the fuel reforming reaction can be greatly reduced, and a collection amount of water collected in the fuel pack 20A or the like as by-products can be considerably decreased With application of the fuel reforming type fuel cell having such a structure to the power generation portion, operation states (power generating operation, stop operation) in the power generation portion can be set by simple control for performing or stopping the supply of the power generation fuel FL to the fuel cell body. Furthermore, with application of the structure as the fuel cell, since electric power can be directly produced from the power generation fuel FL by the electrochemical reaction, the very high power generation efficiency can be realized, and the power generation fuel FL can be effectively used, and the power generation module 10A including the power generation portion 11 can be minimized in case that it is formed as module.

In this structural example, although description has been given on only the case that methanol is applied as the power generation fuel FL supplied from the fuel pack 20A, the present invention is not restricted thereto, and a liquid fuel or a liquefied fuel or a gas fuel including at least a hydrogen element can be applied excellently. It is, therefore, possible to excellently apply an alcohol-based liquid fuel, concretely methanol, ethanol or butanol, a liquefied fuel consisting of hydrocarbon which can be vaporized at an ordinary temperature under an ordinary pressure such as dimethyl ether, isobutene or natural gas, a gas fuel such as hydrogen gas, or the like.

Here, in case of using liquefied hydrogen or hydrogen gas as it is as the power generation fuel FL, it is possible to adopt the structure by which the power generation fuel FL is directly supplied to the fuel cell body 110 without requiring a fuel reforming portion 16a such as described in this structural example.

Moreover, although only the fuel reforming type fuel cell has been described as a structure of the power generation portion 11, the present invention is not restricted thereto. A well-known fuel direct supply type fuel cell may be applied, and the liquid fuel, the liquefied fuel, the gas fuel or the like may be utilized as it is in order to generate electric power. In addition, as with power generation utilizing any other electrochemical reaction or heat generation, a difference in temperature involved by the endothermic reaction, a conversion effect of the pressure energy or the thermal energy, and the principle of electro-magnetic induction, it is possible to apply well-known power generating means which can use the liquid fuel or the liquefied fuel or the gas fuel directly or indirectly supplied from the fuel pack 20A and generate predetermined electric power.

<Output Control Portion>

As shown in FIG. 3, the output control portion 16 applied to the electric power generation portion 10A according to this embodiment is configured to control the operation state (the power generation operation and the stop operation) by supplying or shutting off at least the power generation fuel FL charged in the fuel pack 20A to the power generation portion 11 based on the operation control signal from the later-described voltage monitor/control portion 14 and based on the start-up electric power supplied from the start-up control portion 15.

Figure 6:
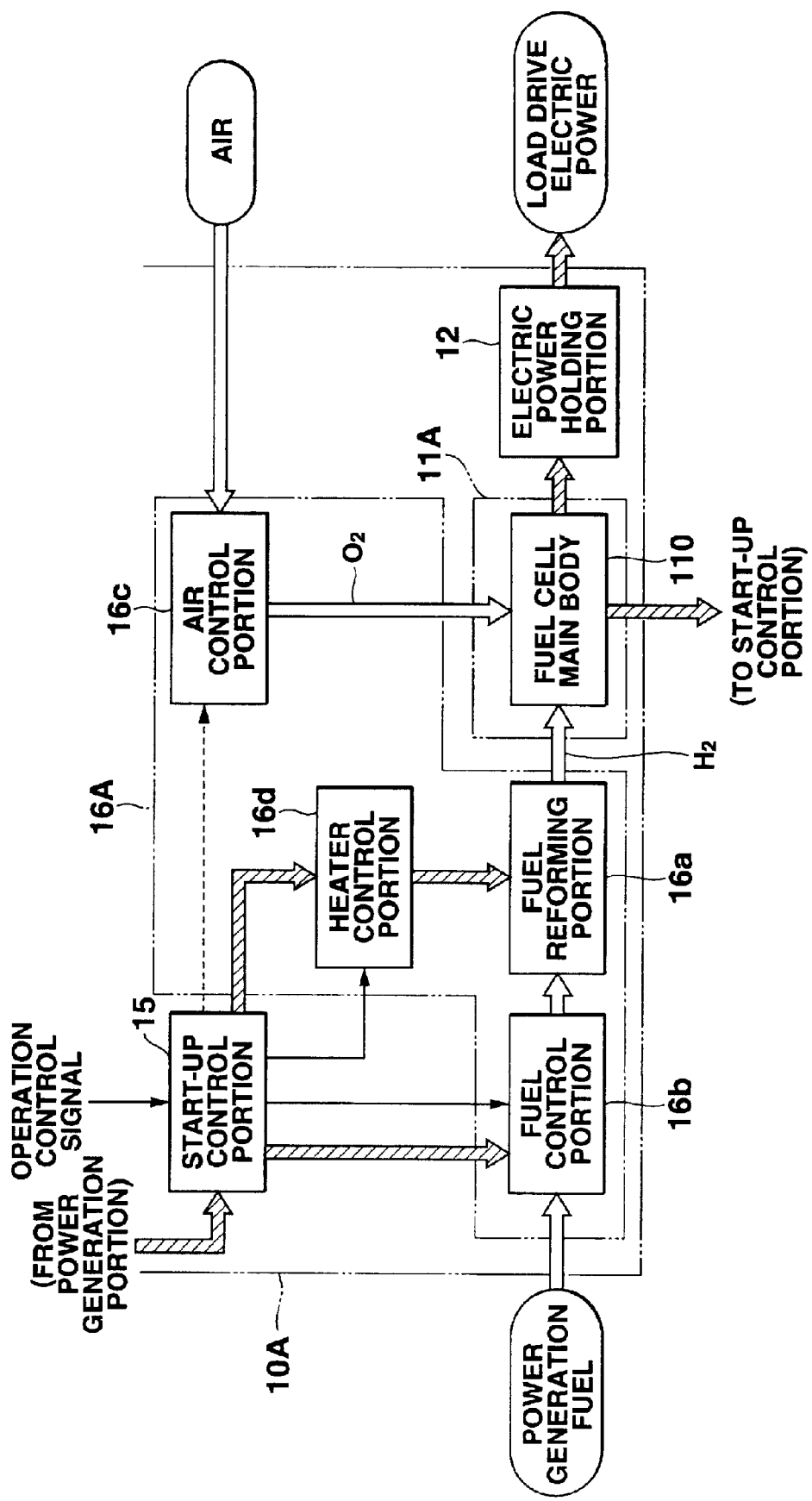
FIG. 6 is a block diagram for schematically showing a structure of an output control portion applicable to a first embodiment of a power generation portion applied to the power supply system according to the present invention.

FIG. 6 is a block diagram showing a schematic structure of the output control portion applied to the electric power generation portion according to this embodiment. Here, as a structure of the power generation portion 11, description will be given as to a structure of the output control portion when applying the above-described fuel reforming type fuel cell (see FIG. 3).

As shown in FIG. 6, to the output control portion 16A according to this embodiment, specifically, it is possible to apply a structure including: a fuel control portion 16b which supplies a predetermined amount of power generation fuel FL (substantially, hydrogen gas supplied to the fuel cell main body 110) to the power generation portion 11 based on the start-up electric power supplied from the start-up control portion 15; a fuel reforming portion 16a (see FIG. 4) which generates a specific fuel component (hydrogen gas) from the power generation fuel FL supplied through the fuel control portion 16b by a series of fuel reforming reactions such as indicated by the above chemical equations (1) to (3) and supplies the obtained fuel component to a fuel electrode 111 of the fuel cell main body 110; an air control portion 16c which supplies a fixed amount of air (oxygen gas supplied to the fuel cell main body 110) to an air electrode 112 of the fuel cell main body 110; and a heater control portion 16d which mainly sets temperature conditions for various kinds of chemical reactions in the fuel reforming portion 16a.

Here, based on the start-up electric power supplied from the start-up control portion 15, in the fuel cell main body 110, the fuel control portion 16b performs control to fetch the power generation fuel FL (the liquid fuel, the liquefied fuel or the gas fuel), water and the like which can be hydrogen gas ($H_2$) whose amount is required for generating constant electric power from the fuel pack 20A, reform them into hydrogen gas ($H_2$) by the fuel reforming portion 16a and supplies a fixed amount of hydrogen gas to the fuel electrode 111 of the fuel cell main body 110. In addition, the air control portion 16c carries out control to fetch oxygen gas ($O_2$) whose amount is required according to the electrochemical reaction using the hydrogen gas (see the chemical equations (3) and (5)) from air and supply it to the air electrode 112 of the fuel cell main body 110. By using such a fuel control portion 16b, an air control portion 16c and a heater control portion 16d to adjust supply and shutoff of hydrogen gas ($H_2$), oxygen gas ($O_2$) and the thermal energy with respect to the power generation portion 11, stages of progress of the electrochemical reaction in the power generation portion 11 (fuel cell main body 110) are controlled, and the power generation operation and the stop operation of predetermined electric power can be controlled.

Here, the air control portion 16c may be configured to constantly supply air without controlling supply and shutoff of oxygen gas with respect to the air electrode 112 of the fuel cell main body 110 as long as the air control portion 16c can supply air which corresponds to a maximum amount of consumption of oxygen per unit time in the power generation portion 11. That is, in the structure of the electric power generation portion 10A shown in FIG. 6, the output control portion 16A may set stages of progress of the electrochemical reaction by control over supply of the power generation fuel FL by the fuel control portion 16b and control over supply of the thermal energy by the heater control portion 16d, and an air hole (see FIG. 34) such as will be described later may be provided in place of the air control portion 16c so that not less than a necessary minimum amount of air (oxygen) used for the electrochemical reaction in the power generation portion 11 can be constantly supplied through the air hole.

<Start-up Control Portion>

The start-up control portion 15 applied to the electric power generation portion 10A according to this embodiment carries out start-up control to supply the start-up electric power to the above-described output control portion 16 (the fuel control portion 16b and the heater control portion 16d) and shift the power generation portion 11 from the standby mode to the power generation mode based on the operation control signal outputted in accordance with a change in held electric power in the later-described electric power holding portion 12.

Figure 7A:
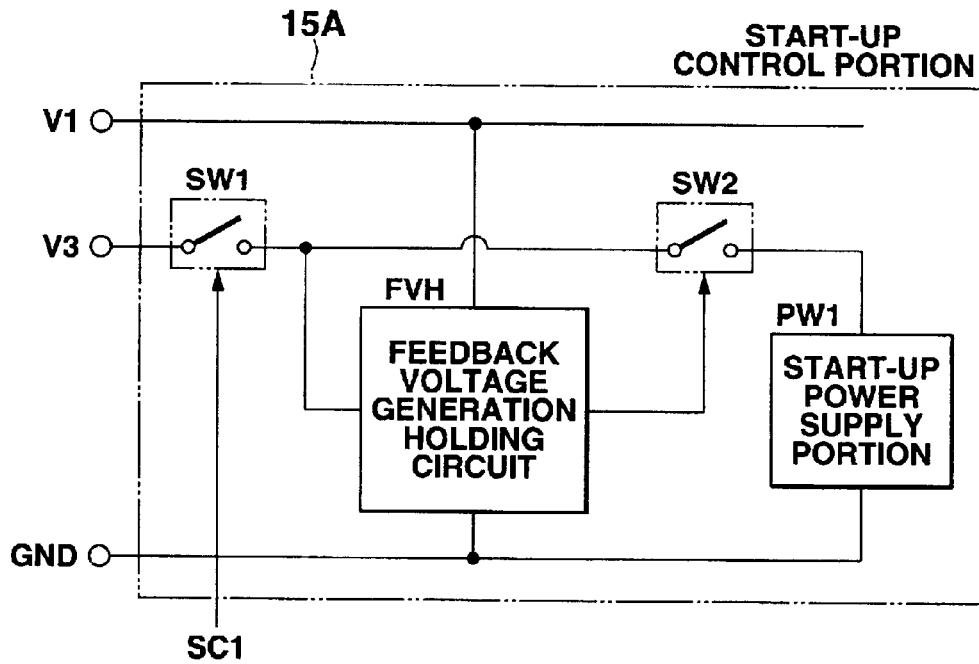
FIGS. 7A and 7B area circuit block diagram and a designated circuit view for showing structural examples of a start-up control portion applicable to the first embodiment of an electric power generation portion applied to the power supply system according to the present invention, respectively.

FIG. 7A is a circuit block diagram showing a structural example of the start-up control portion applied to the electric power generation portion according to this embodiment.

As shown in FIG. 7A, the start-up control portion 15A according to this embodiment is configured to include: a feedback voltage generation holding circuit FVH which operates with a voltage V1 based on the electric power supplied from the power generation portion 11 as a high-potential side power supply and a ground potential GND as a low-potential side power supply, generates at least electric power having a predetermined voltage (feedback voltage) used for maintaining the power generation operation of the power generation portion 11 based on the voltage V1, and supplies the generated electric power to the output control portion 16; a start-up power supply portion PW1 which is constituted by a primary cell or the like and supplies the start-up electric power having a predetermined voltage Vbat to the output control portion 16 during the start-up operation of the power generation portion 11; a switch SW1 which is turned ON/OFF based on an operation control signal (first control signal) SC1 outputted from the later-described voltage monitor/control portion 14, switches either a feedback voltage from the feedback voltage generation holding circuit FVH or the start-up electric power (voltage Vbat) from the start-up power supply portion PW1 and supplies it to the output control portion 16; and a switch SW2 which is turned ON/OFF based on the control signal outputted from the feedback voltage generation holding circuit FVH in accordance with the electric power supplied from the power generation portion 11 and controls supply or shutoff of the start-up electric power from the start-up power supply portion PW1 to the output control portion 16.

Figure 7B:
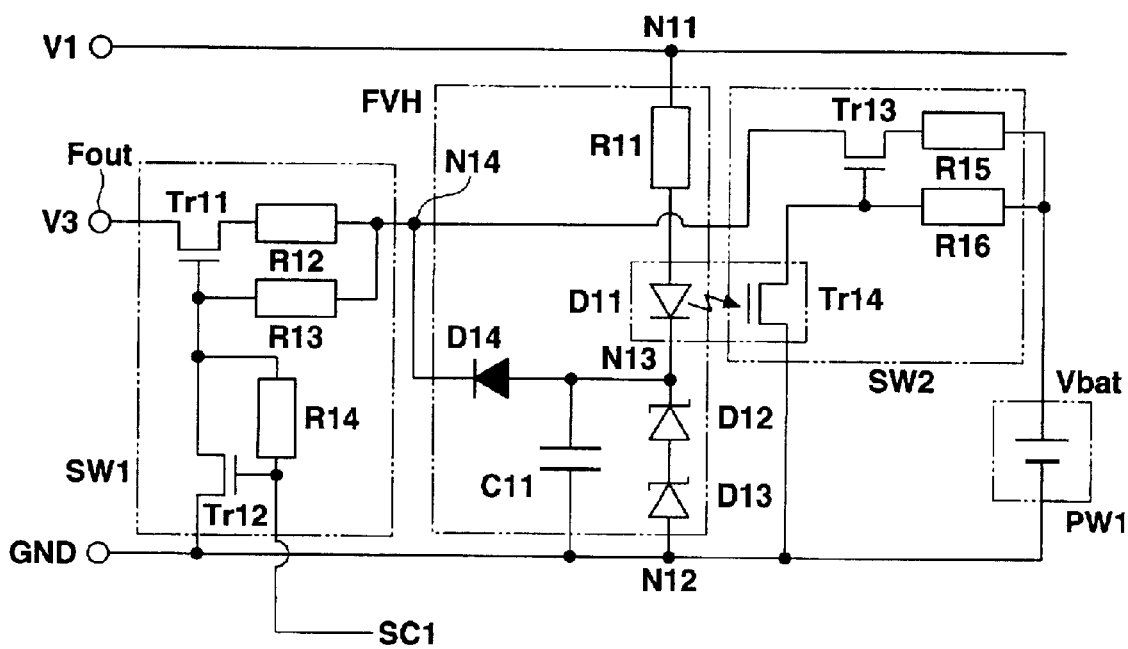

As a further concrete circuit configuration of the start-up control portion 15A, as illustrated in FIG. 7B for example, it is possible to apply a configuration as the feedback voltage generation holding circuit FVH provided with a resistance R11, a photodiode D11 and an auxiliary capacitor (auxiliary electric power holding portion) C11 connected in series between a contact point N11 on the high-potential side to which the electric power (voltage V1) generated by the power generation portion 11 is supplied and a contact point N12 on the low-potential side to which the ground potential GND is supplied, Zener diodes D12 and D13 connected in series between a connection contact point N 13 between the photodiode D11 and the auxiliary capacitor C11 and the contact point N12 on the low-potential side, and a diode D14 connected between the connection contact point N13 and a contact point N14 of the switch SW1 on one end side.

As a circuit configuration of the switch SW1, as shown in FIG. 7B for example, it is possible to apply a structure provided with an electric current limit resistance R12 and a switching field effect transistor (which will be referred to as a "switching transistor" hereinafter) Tr11 connected in series between the contact point N14 of the feedback voltage generation holding circuit FVH and an output contact point Fout with respect to the output control portion 16, a voltage detection resistance R13 connected between a gate of the switching transistor Tr11 and the contact point N14, a switch control field effect transistor (which will be referred to as a "control transistor" hereinafter) Tr12 connected between the gate of the switching transistor Tr11 and the contact point N12 on the low-potential side, and a voltage detection resistance R14 connected between the gate of the switching transistor Tr11 and a gate of the control transistor Tr12.

Additionally, in regard to a configuration of the switch SW2, as substantially similar to the switch SW1, it is possible to apply a structure provided with an electric current limit resistance R15 and a switch transistor Tr13 connected in series between the start-up power supply portion PW1 and the contact point N14 of the switch SW1 on one end side, a voltage detection resistance R16 connected between a gate of the switch transistor Tr13 and the start-up power supply portion PW1, and a control transistor Tr14 connected between the gate of the switch transistor Tr13 and the contact point N12 on the low-potential side.

Here, all of the switch transistor Tr11, the control transistor Tr12 and the switch transistor Tr13 are field effect transistors which are turned OFF when a gate signal voltage is at the low level and turned ON when the same is at the high level. Here, the control transistor Tr12 is also turned on when the gate signal voltage is at the floating level. Further, the control transistor Tr14 and the photodiode D11 are arranged so as to be opposed to each other, have a photo coupler structure that the control transistor Tr14 is turned ON/OFF in accordance with the operation state of the photodiode D11. When the electric current flows to the photodiode D11 and the photodiode D11 enters the light emitting mode, the control transistor Tr14 is turned ON. Furthermore, an operation control signal SC1 outputted from the non-illustrated voltage monitor/control portion 14 is supplied to the gate of the control transistor Tr12.

In the start-up control portion 15A having such a circuit configuration, the initial state is defined as the state that no electric charge is stored in the auxiliary capacitor C11 of the feedback voltage generation holding circuit FVH and the operation control signal SC1 used for operating the power generation portion 11 is not outputted from the voltage monitor/control portion 14 (specifically, when the level of the signal supplied as the operation control signal SC1 is at the floating level).

Since the start-up electric power is not supplied from the start-up control portion 15A to the output control portion 16 at this moment, the power generation portion 11 is in the power generation stop state, and the electric power is not supplied to the contact point N11 on the high-potential side. Therefore, the electric current does not flow to the resistance R11 and the photodiode D11 connected between the contact point N11 on the high-potential side and the connection contact point N13, and the control transistor Tr14 constituting the photo coupler keeps the OFF state. As a result, the gate signal on the high level is applied to the gate of the switch transistor Tr13 constituting the switch SW2 and the ON state is maintained. Also, the voltage Vbat of the start-up power supply portion PW1 is applied to the contact point N14 through the switch transistor Tr13.

On the other hand, when the operation control signal SC1 on the floating level is applied to the gate of the control transistor Tr12 constituting the switch SW1, the control transistor Tr12 keeps the ON state. Therefore, the gate signal on the low level (ground potential GND) is applied to the gate of the switch transistor TR11, and the OFF state is maintained. Thus, the voltage of the contact point N14 is not outputted to the output contact point Fout.

In such an initial state, when the operation control signal (specifically, a signal on the low level) SC1 used for changing the power generation portion 11 to the power generation mode is outputted from the voltage monitor/control portion 14, the control transistor Tr12 of the switch SW1 is changed over to the OFF state, and the gate signal on the high level is applied to the gate of the switch transistor Tr11, thereby changing over the switch transistor Tr11 to the ON state. Consequently, the voltage Vbat which has been applied to the contact point N14 from the start-up power supply portion PW1 is outputted as the start-up electric power (voltage V3) to the output control portion 16 through the switch transistor Tr11 and the output contact point Fout, supply of the power generation fuel FL to the power generation portion 11 is started, and the power generation portion 11 enters the power generation mode.

Then, when the electric power (voltage V1) generated by the power generation portion 11 is supplied to the contact point N11 on the high-potential side, a difference in potential is generated between the contact point N11 and the contact N12 on the low-potential side, and the electric current flows through the voltage detection resistance R11, the photodiode D11 and the auxiliary capacitor C11. As a result, the divided voltage (feedback voltage) obtained by the voltage detection resistance R11, the photodiode D11 and the auxiliary capacitor C11 at the connection contact point N13 is applied to the contact point N14 through the diode D14, and the photodiode D11 performs the light emitting operation, thereby turning ON the control transistor Tr14. Also, the gate signal at the low level (ground potential GND) is applied to the gate of the switch transistor Tr13, the switch transistor Tr13 is changed over to the OFF state, and application of the voltage Vbat to the contact point N14 is intercepted. As a result, the feedback voltage from the feedback voltage generation holding circuit FVH applied to the contact point N14 is outputted to the output control portion 16 through the switch transistor Tr11 and the output contact point Fout, and the power generation operation in the power generation portion 11 continues. Furthermore, at this moment, the auxiliary capacitor (held electric power holding portion) C11 is charged based on a difference in potential between the connection contact point N13 and the contact point N12 on the low-potential side.

Moreover, with power generation portion 11 continuing the power generation operation, when the operation control signal (specifically, a signal on the high level) SC1 used for changing the power generation portion 11 to the power generation stop mode (standby mode) is outputted from the voltage monitor/control portion 14, the control transistor Tr12 of the switch SW1 is changed over to the ON state, and the gate signal on the low level is applied to the gate of the switch transistor Tr11. Consequently, the switch transistor Tr11 is changed over to the OFF state. As a result, output of the feedback voltage from the feedback voltage generation holding circuit FVH applied to the contact point N14 is intercepted, supply of the power generation fuel FL to the power generation portion 11 is stopped, and the power generation portion 11 is changed to the power generation stop state.

Incidentally, as described above, in cases where the power generation portion 11 which in the power generation mode is controlled to stop by the operation control signal SC1 and shifted to the standby mode and thereafter the power generation portion 11 is again started up, either the voltage Vbat of the start-up power supply portion PW1 or the charge voltage of the auxiliary capacitor C11 is supplied as the start-up electric power to the output control portion 16 with supply of the operation control signal SC1 on the low level. That is, since the electric power is not supplied from the power generation portion 11 to the contact point N11 on the high-potential side when the power generation portion 11 is in the standby mode, the electric current does not flow to the voltage detection resistance R11 and the photodiode D11, and the control transistor Tr14 is turned OFF while the switch SW2 is turned on, thereby applying the voltage Vbat from the start-up power supply portion PW1 to the contact point N14. Here, when the charge voltage of the auxiliary capacitor C11 of the feedback voltage generation holding circuit FVH corresponds to or exceeds the voltage of the start-up electric power supplied to the output control portion 16 (that is, the voltage Vbat supplied from the start-up power supply portion PW1), the charge voltage of the auxiliary capacitor C11 is supplied to the output control portion 16 through the diode D14 and the switch SW1. On the other hand, when the charge voltage of the auxiliary capacitor C11 is less than the voltage of the start-up electric power, the voltage Vbat from the start-up power supply portion PW1 is supplied to the output control portion 16 as it is.

That is, in the feedback voltage generation holding circuit FVH according to this structural example, the start-up electric power is supplied from the start-up power supply portion PW1 substantially only in the initial stage in the first start-up operation of the power generation portion 11, and thereafter the feedback voltage based on the electric power generated by the power generation portion 11 or the charge voltage of the auxiliary capacitor is supplied to the output control portion 16 as electric power for continuing the power generation operation or electric power for restart. Therefore, even if the primary cell or the like is applied as the start-up power supply, consumption of the power supply can be greatly suppressed, and the excellent start-up operation can be carried out for a long time.

Incidentally, in the above-described structural example, although there is exemplified the structure that the start-up power supply portion consisting of the primary cell or the like is provided in the electric power generation portion, the present invention is not restricted thereto. For example, if an electronic device to which this power supply system is provided has a small primary cell for memory backup, this cell may be commonly used as the start-up power supply portion.

<Electric Power Holding Portion>

The electric power holding portion 12 applied to the electric power generation portion 10A according to this embodiment holds (stores or charges) the electric charge based on the electric power having the voltage V1 generated by the above-described power generation portion 11, and performs the charge and discharge operation for outputting the electric power having a predetermined voltage (charge voltage) V2 based on the held electric charge to the later-described voltage conversion portion 13.

Figure 8A:
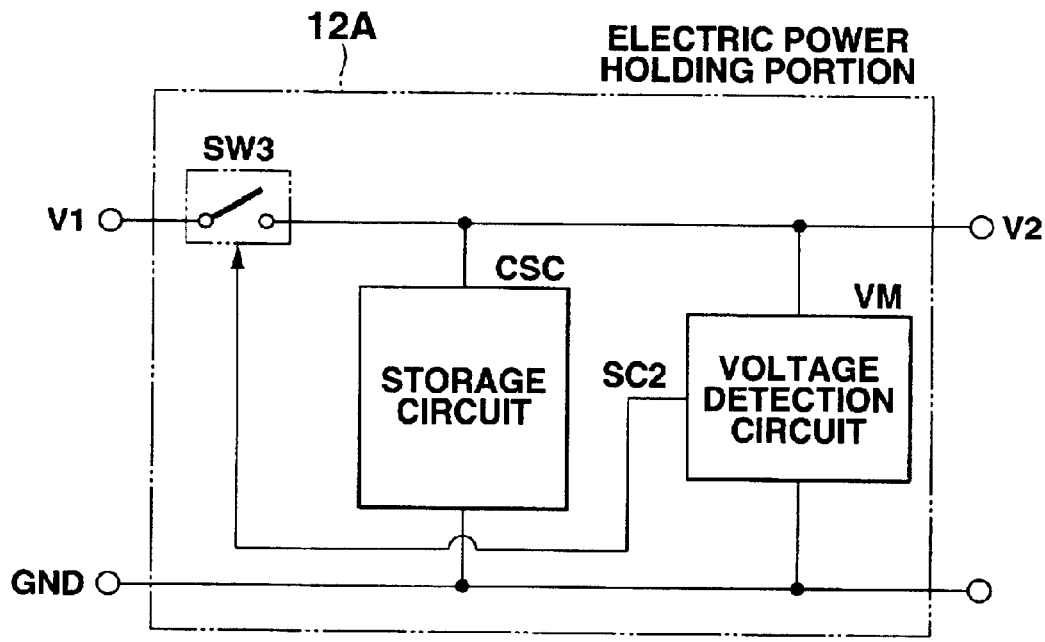
FIGS. 8A and 8B are a circuit block diagram and a designated circuit view for showing structural examples of an electric power holding portion applicable to a first embodiment of an electric power generation portion applied to the power supply system according to the present invention, respectively.

FIG. 8A is a circuit block diagram showing a structural example of the electric power holding portion applied to the electric power generation portion according to this embodiment.

As shown in FIG. 8A, the electric power holding portion 12A according to this embodiment is configured to include: a storage circuit CSC which stores the electric charge according to the voltage V1 and discharges it with the voltage V1 based on the electric power supplied from the power generation portion 11 as a high-potential side power supply and the ground potential GND as a low-potential side power supply; a voltage detection circuit VM which detects a storage state (held electric power: charge voltage in this example) of the electric charge to the storage circuit CSC; and a switch SW3 which is turned ON/OFF based on an operation control signal (second control signal) SC2 outputted from the voltage detection circuit VM and controls supply (charge) or shutoff (charge stop) of the electric power to the storage circuit CSC.

Figure 8B:
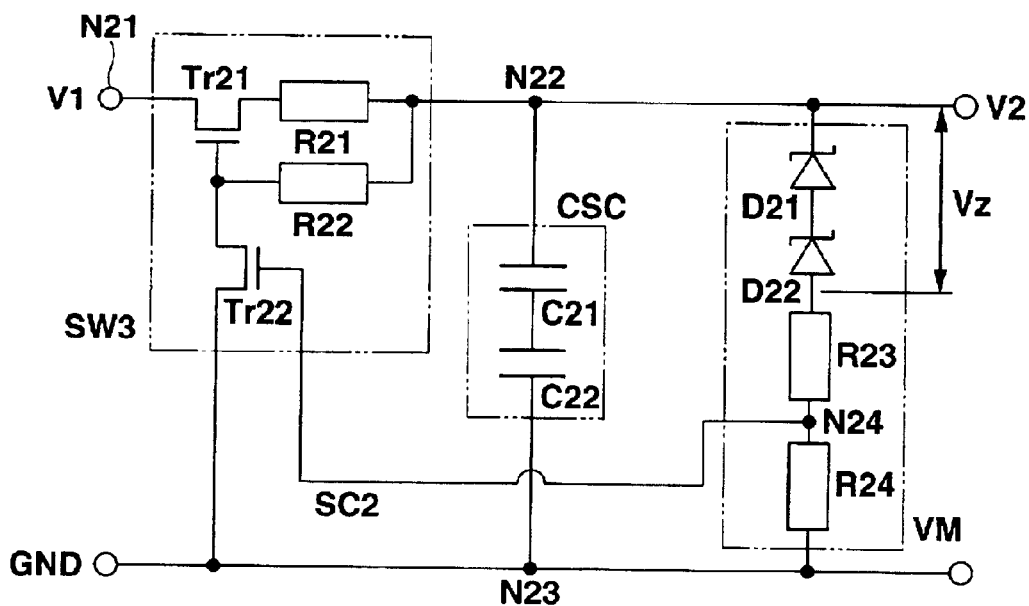

In regard to a further concrete circuit configuration of the electric power holding portion 12A, as shown in FIG. 8B for example, it is possible to apply as the switch SW3 a structure provided with a switch transistor Tr21 and an electric current limit resistance R21 connected in series between an input contact point N21 (which is the same contact point as the contact point N11 shown in FIG. 7B) to which the electric power (voltage V1) generated by the power generation portion 11 is supplied and the contact point N22, a voltage detection resistance R22 connected between the gate of the switch transistor Tr21 and the contact point N22, and a control transistor Tr22 connected between the gate of the switch transistor Tr21 and a contact point N23 (which is the same contact point as the contact point N12 shown in FIG. 7B) on the low-potential side.

Further, as the storage circuit CSC, as shown in FIG. 8B for example, it is possible to apply a structure that a plurality of (two in this example) capacitors C21 and C22 are connected in series between the contact point N22 and the contact point N23 on the low-potential side. Incidentally, the structure of the storage circuit CSC is not restricted to this structural example, and any other structure may be employed as long as the electric charge based on the electric power supplied from the power generation portion 11 can be held (stored or charged) and a voltage which fluctuates in a substantially fixed or arbitrary voltage range. Therefore, for example, the storage circuit CSC may include only a single capacitor or have a structure as a capacitor bank which switches the connection state of a plurality of capacitors between serial and parallel with a predetermined timing.

As a circuit configuration of the voltage detection circuit VM, as shown in FIG. 8B for example, it is possible to apply a structure that Zener diodes D21 and D22 and voltage dividing resistances R23 and R24 are connected in series between an input contact point N21 on the high-potential side and a contact point N22 on the low-potential side.

Here, both the switch transistor Tr21 and the control transistor Tr22 constituting the switch SW3 are field effect transistors which are turned OFF when the gate signal voltage is at the low level and turned ON when the gate signal voltage is at the high level. The divided voltage at the connection contact point N24 of the voltage dividing resistances R23 and R24 constituting the voltage detection circuit VM is supplied as the operation control signal SC2 to the gate of the control transistor Tr22.

In the electric power holding portion 12A having such a circuit configuration, when the charge voltage (or discharge voltage; voltage at the contact point N22) based on the electric charge stored in the capacitors C21 and C22 constituting the storage circuit CSC is constantly detected by the voltage detection circuit VM, a signal level of the operation control signal SC2 outputted to the switch SW3 is controlled in accordance with a change in the charge voltage V2. That is, when the charge voltage V2 of the storage circuit CSC is lower than a Zener voltage Vz of the Zener diodes D21 and D22 of the voltage detection circuit VM, the voltage at the connection contact point N24 of the voltage dividing resistances R23 and R24 falls to the low level. By turning OFF the control transistor Tr22 of the switch SW3, the switch transistor Tr21 is turned ON by applying the high-level gate signal to the gate thereof, and the electric charge based on the electric power supplied to the input contact point N21 from the power generation portion 11 is charged in the storage circuit CSC.

On the other hand, when the charge voltage V2 of the storage circuit CSC is higher than the Zener voltage Vz of the Zener diodes D21 and D22 of the voltage detection circuit VM, the voltage in the connection contact point N24 rises to the high level. By switching the control transistor Tr22 of the switch SW$_3$ to the ON state, the switch transistor Tr21 is turned OFF by applying the low-level gate signal to the gate thereof, and supply of the electric power to the storage circuit CSC is shut off, thereby stopping the charge operation of the storage circuit CSC.

As a result, the charge voltage in the electric power holding portion 12A (storage circuit CSC) is constantly monitored, and the state of holding (storing or charging) the electric power with respect to the storage circuit CSC is controlled in such a manner that it can constantly converge in a predetermined voltage range.

<Voltage Conversion Portion>

The voltage conversion portion 13 applied to the electric power generation portion 10A according to this embodiment performs the voltage conversion operation which converts electric power having the charge voltage V2 in the electric power holding portion 12 such as described above into electric power (supply electric power) having a constant output voltage Vout suitable for driving the non-illustrated device (load).

Figure 9:
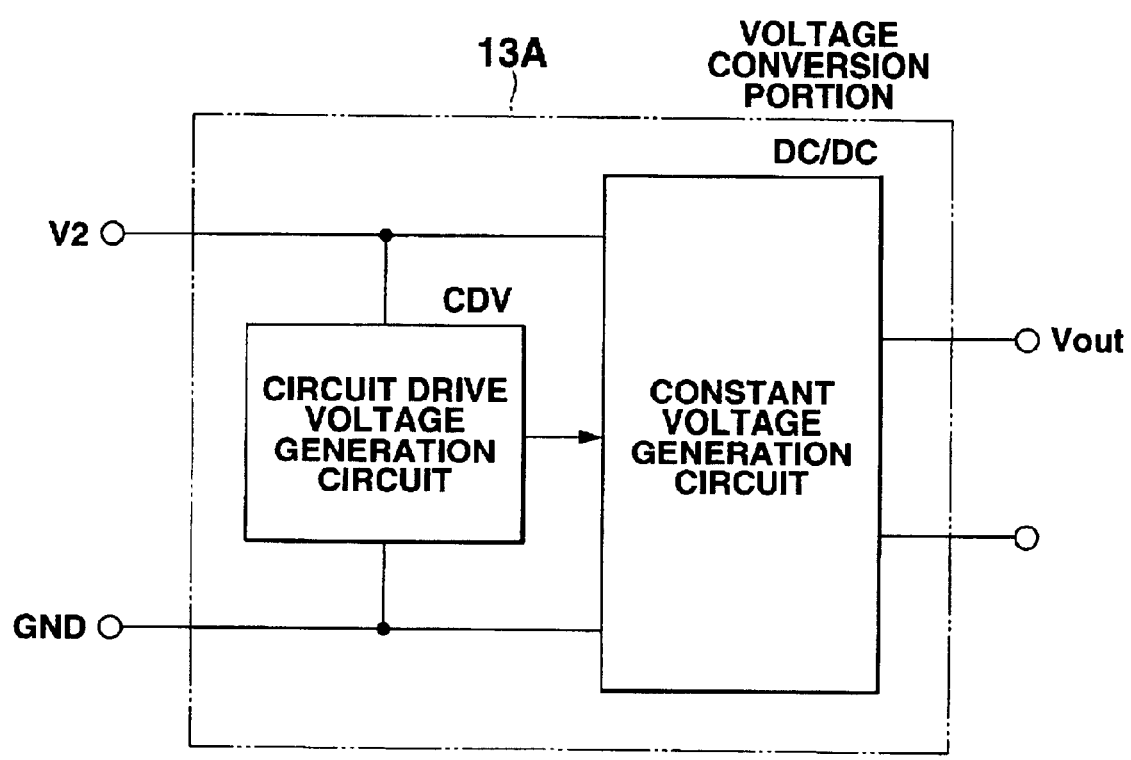
FIG. 9 is a circuit block diagram for showing a structural example of the voltage conversion portion applicable to a first embodiment of an electric power generation portion applied to the power supply system according to the present invention.
Figure 10:
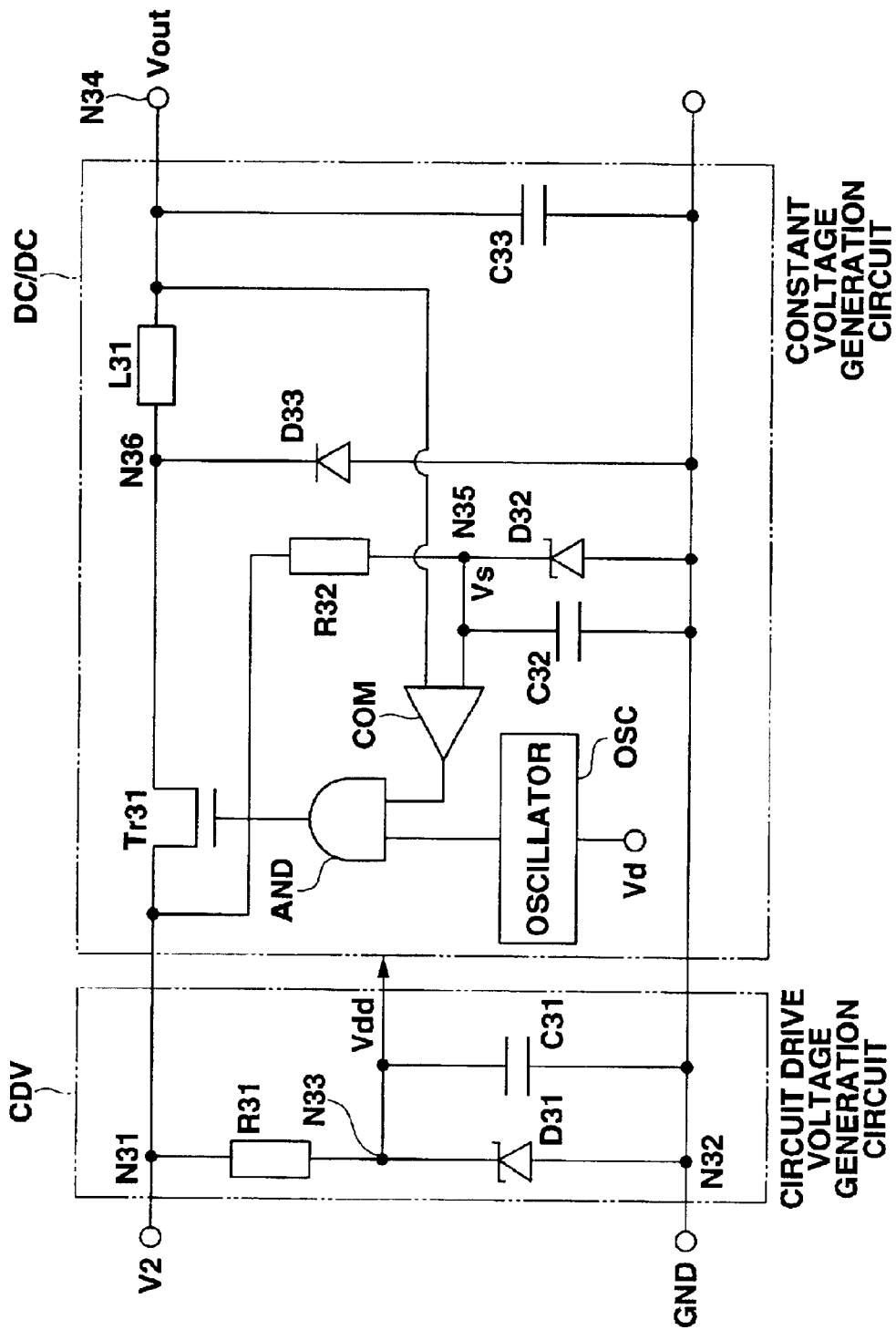
FIG. 10 is a circuit view showing a designated structural example of a voltage conversion portion applicable to a first embodiment of an electric power generation portion applied to the power supply system according to the present invention.

FIG. 9 is a circuit block diagram showing a structural example of the voltage conversion portion applied to the electric power generation portion according to this embodiment, and FIG. 10 is a circuit structural view showing a concrete structural example of the voltage conversion portion.

As shown in FIG. 9, the voltage conversion portion 13A according to this embodiment is configured to include: a circuit drive voltage generation circuit CDV which generates a predetermined drive voltage Vdd based on the above-described charge voltage V2 in the electric power holding portion 12; and a constant voltage generation circuit DC/DC having a function of a so-called DC—DC converter which operates based on the drive voltage Vdd generated by the circuit drive voltage generation circuit CDV, converts the charge voltage V2 in the electric power holding portion 12 into a constant voltage which is higher than the ground potential GND which is the low-potential side power supply and outputs the obtained voltage as an output voltage Vout.

In regard to a further concrete circuit configuration of the voltage conversion portion 13A, as shown in FIG. 10 for example, it is possible to apply as the circuit drive voltage generation circuit CDV a structure including: a voltage dividing resistance R31 and a Zener diode D31 connected in series between a contact point N31 on the high-potential side to which the charge voltage V2 in the electric power holding portion 12 is supplied and a contact point N32 (the same contact point as the contact point N12 shown in FIG. 7B) on the low-potential side to which the ground potential GND is supplied; and a capacitor C31 connected between a connection contact point N33 between the voltage dividing resistance R31 and the Zener diode D31 and the contact point N32 on the low-potential side.

In regard to a circuit configuration of the constant voltage generation circuit DC/DC, as shown in FIG. 10 for example, it is possible to apply a structure in which there are provided a switch transistor Tr31 and an inductance L31 connected in series between a contact point N31 on the high-potential side and an output contact point N34 which outputs the output voltage Vout; a resistance element R32 and a Zener diode D32 connected in series between the contact point N31 and the contact point N32; a capacitor C32 connected between a connection contact point N35 between the resistance element R32 and the Zener diode D32 and the contact point N32; a comparator COM having a + side input end connected to the connection contact point N35 and a − side input end connected to the output contact point N34; a switch control logic gate AND having one input end connected to an output end of the comparator COM, the other input end connected to an oscillator OSC, and an output end connected to a gate of the switch transistor Tr31; a diode D33 connected between a connection contact point N36 between the switch transistor Tr31 and the inductance L31 and the contact point N32; and a capacitor connected between the output contact point N34 and the contact point N32.

In the voltage conversion portion 13A having such a configuration, when the charge voltage V2 in the electric power holding portion 12 is applied to the circuit drive voltage generation circuit CDV, the voltage of the connection contact point N33 is determined in accordance with the division ratio of the resistance element R31 and the Zener diode D31 and the charge state of the capacitor C31, and this determined voltage is supplied to the constant voltage generation circuit DC/DC as the drive voltage Vdd. Here, as to the drive voltage Vdd, a substantially constant voltage is generated with respect to the ground potential GND which is the low-potential side power supply irrespective of changes in the charge voltage V2 in the electric power holding portion 12.

On the other hand, in the constant voltage generation circuit DC/DC, the comparator COM performs processing for comparing the output voltage Vout of the output contact point N34 with a reference voltage Vs which is divided and generated at the connection contact point N35. When the output voltage Vout is lower than the reference voltage Vs, a high-level signal is inputted to one input end of the logic gate AND, and a pulse signal having a predetermined cycle and signal waveform is inputted to the other input end from the oscillator OSC. As a result, the high-level gate signal is applied to the gate of the switch transistor Tr31 from the logic gate AND, and the switch transistor TR31 is intermittently turned ON. Consequently, when the potential (output voltage Vout) of the output contact point N34 is lowered, the charge voltage V2 on the contact point N31 side is intermittently supplied through the switch transistor Tr31, and the output voltage Vout having a substantially constant potential is generated and outputted. Incidentally, since the capacitor C33 is connected between the output contact point N34 and the contact point N32 and the electric charge supplied through the inductance L31 is thereby stored, the output voltage Vout outputted through the output contact point N34 is controlled to be further constant.

<Voltage Monitor/Control Portion>

The voltage monitor/control portion 14 applied to the electric power generation portion according to this embodiment performs the operation control. According to this operation control, the voltage monitor/control portion 14 detects a voltage (charge voltage V2) outputted from the above-described electric power holding portion 12 to the voltage conversion portion 13. When the detected voltage becomes not more than a predetermined voltage value, the voltage monitor/control portion 14 outputs with each predetermined timing the operation control signal SC1 for changing (start-up) the power generation portion 11 to the power generation mode to the start-up control portion 15 mentioned above. Also, it outputs the operation control signal SC2 for holding (storing or charging) the electric power generated by the power generation portion 11 to the above-described electric power holding portion 12.

Here, as a concrete circuit which detects the charge voltage (voltage component in the held electric power) in the electric power holding portion 12, for example, it is possible to excellently apply a circuit consisting of series connection of the Zener diodes D21 and D22 and the voltage dividing resistances R23 and R24 such as described in connection with the voltage detection circuit (see FIG. 8B) constituting the above-mentioned electric power holding portion 12. Therefore, in this embodiment, the voltage detection circuit VM of the electric power holding portion 12 can also have the voltage detection function part of the voltage monitor/control portion 14. It is to be noted that the voltage monitor/control portion 14 includes at least a signal control function for controlling an output timing, a signal level or the like of the operation control signals SC1 and SC2 as well as the above-described voltage detection function.

(B) Fuel Pack

The fuel pack 20A applied to the power supply system according to the present invention is, for example, a fuel storage container with the high sealing property, in which the power generation fuel FL consisting of a liquid fuel, a liquefied fuel or a gas fuel containing hydrogen in its compositional components is filled and charged. As shown in FIG. 3, the fuel pack 20A has a structure to be coupled with the power generation portion 10A through the I/F portion 30A in the attachable and detachable manner or a structure to be integrally coupled with the same. The power generation fuel FL charged in the fuel pack 20A is taken into the power generation portion 10A through the fuel feed path provided to the later-described I/F portion 30A, and the power generation fuel FL whose amount is required for generating electric power having a predetermined voltage is supplied to the power generation portion 11 by the above-described output control portion 16 at any given time.

In particular, in case of applying, as the power supply system 1, the structure in which the power generation portion 10A and the fuel pack 20A can be attached and detached without restraint, the power generation fuel FL is supplied to the power generation portion 10A only when the fuel pack 20A is coupled with the power generation portion 10A. In this case, when the fuel pack 20A is not coupled with the power generation portion 10A, the fuel pack 20A is provided with, e.g., fuel leak preventing means having a control valve or the like which closes by a fuel charge pressure inside the fuel pack 20A or a physical pressure of a spring or the like in order to prevent the power generation fuel FL charged therein from leaking to the outside of the fuel pack 20A. When the fuel pack 20A is coupled with the power generation portion 10A through the I/F portion 30A and means (leak prevention releasing means) which is provided to the I/F portion 30A and releases the leak prevention function by the fuel leak preventing means is thereby brought into contact with or presses the fuel pack 20A, thus the closed state of the control valve is released and the power generation fuel FL charged in the fuel pack 20A is supplied to the power generation portion 10A through the I/F portion 30A, for example.

In the fuel pack 20A having such a structure, when the fuel pack 20A is separated from the power generation portion 10A before the power generation fuel FL charged in the fuel pack 20A is run out, the power generation fuel FL can be prevented from leaking by again activating the leak prevention function of the fuel leak preventing means (for example, by bringing the leak prevention releasing means into the non-contact state to cause the control valve to again close), and the fuel pack 20A can be carried independently. Furthermore, the fuel leak preventing means will be described in detail at a part of structural example aftermentioned.

It is preferable for the fuel pack 20A to have a function as the above-described fuel storage container and be made up of a material which basically exists in the nature world under a specific environmental condition and can be converted into substances which constitute the nature or substances which cause no environmental pollution.

That is, the fuel pack 20A can be made up of a polymeric material (plastic) or the like having characteristics consisting of various kinds of decomposition reactions that the material can be converted into substances, which is not harmful to the nature world (substances which basically exist in the nature world and constitute the nature, for example, water and carbon dioxide or the like), by action of microbes or enzyme in the soil, irradiation of sunbeams, rain water, atmospheric air or the like even if all or part of the fuel pack 20A is jettisoned in the nature world or subjected to landfill disposal, for example, decomposition characteristics of the biodegradability, the photolytic property, the hydrolyzability, the oxidative degradability or the like.

The fuel pack 20A may be constituted by a material by which harmful substances such as a chlorinated organic compound (dioxin group; polychlorinated dibenzo-p-dioxin, polychlorinated dibenzofuran), hydrochloric gas or heavy metal, or environmental pollutants are not generated or generation of such substances are suppressed even if artificial heating/incineration processing or agent/chemical processing is carried out. It is needless to say that a material (for example, the polymeric material) constituting the fuel pack 20A can not be decomposed at least in a short time by contact with the charged power generation fuel FL and does not degenerate the charged power generation fuel FL at least in a short time to such an extent that it can not be used as a fuel. Also, it is needless to say that fuel pack 20A constituted by the polymeric material has the sufficient strength with respect to external physical stress.

As described above, taking into consideration the state that the collect rate of the chemical cell for recycling is only approximately 20% and remaining 80% is jettisoned in the natural world or subjected to landfill disposal, it is desirable to apply a material having the decomposition property, and biodegradable plastic in particular as a material of the fuel pack 20A. Specifically, it is possible to excellently apply a polymeric material containing a chemical synthesis type organic compound synthesized from a petroleum or vegetable raw material (polylactic acid, aliphatic polyester, copolyester or the like), microbial bio-polyester, a natural product utilizing polymeric material including farina, cellulose, chitin, chitosan or the like extracted from a vegetable raw material such as a corn or a sugar cane, or others.

As the power generation fuel FL used in the power supply system 1 according to this embodiment, it is preferable that it can not be a contaminant for the natural environment even if the fuel pack 20A having the power generation fuel FL charged therein is jettisoned in the natural world or subjected to landfill disposal and leaks into air, soil or water, that electric power can be generated with the high energy conversion efficiency in the power generation portion 11 of the power generation portion 10A, and that it is a fuel substance which can maintain a stable liquid state or an air state under predetermined charge conditions (pressure, temperature or the like) and can be supplied to the power generation portion 10A. Specifically, it is possible to excellently apply an alcohol-based liquid fuel such as methanol mentioned above, ethanol or butanol, a liquefied fuel consisting of hydrocarbon such as dimethyl ether, isobutane or natural gas which are gas at an ordinary temperature under an ordinary pressure, or a gas fuel such as hydrogen gas. Incidentally, as will be described later, the safety of the power supply system can be increased by providing the structure of, e.g., fuel stabilizing means for stabilizing the charged state of the power generation fuel in the fuel pack.

According to the fuel pack 20A and the power generation fuel FL having such a structure, even if all or a part of the power supply system 1 according to this embodiment (the fuel pack 20 or the power generation fuel FL or the like) is jettisoned in the natural world or artificially subjected to landfill disposal, incineration or chemical processing, pollution of air, soil or water quality to the natural environment, or generation of environmental hormone can be greatly suppressed, thereby contributing to prevention of environmental destruction, suppression of disfigurement of the natural environment, and prevention of the adverse effect to human bodies.

In case of constituting the fuel pack 20A so that it can be attached to and detached from the power generation portion 10A without restraint, when an amount of the remaining power generation fuel FL charged is reduced or this fuel is run out, the power generation fuel FL can be replenished into fuel pack 20A, or the fuel pack 20A can be replaced or reused (recycling). This can, therefore, contribute to great reduction in a quantity of the fuel pack 20A or the power generation portion 10A to be jettisoned. Furthermore, since a new fuel pack 20A can be replaced and attached to a single power generation portion 10A and this module can be attached to the device DVC and used, it is possible to provide the power supply system which can be easily used as similar to a general-purpose chemical cell.

In case of generating electric power in the power generation portion 11 of the power generation portion 10A, even if by-product is generated besides electric power and this by-product adversely affects the surroundings or if it may possibly exert its influence on functions, for example, it may cause the malfunction of the device DVC, it is possible to apply the structure for collecting the by-product and holding it in the fuel pack 20A.

(C) I/F portion

As shown in FIG. 2, The I/F portion 30A applied to the power supply system according to the present invention has a function for physically coupling the power generation portion 10A and the fuel pack 20A with each other, and supplying the power generation fuel FL charged in the fuel pack 20A in a predetermined state to the power generation portion 10A through the fuel feed path. Here, as described above, in case of applying, as the power supply system 1, the structure in which the power generation portion 10A and the fuel pack 20A can be attached and detached without restraint, as will be indicated at structural example (reference to FIG. 34) described later, the I/F portion 30A includes leak prevention releasing means (fuel feed pipe 52f) for releasing the leak prevention function of fuel leak preventing means (fuel feed valve 24A) provided to the fuel pack 20A in addition to the fuel feed path. Moreover, as will described above, in case of applying the structure for collecting a by-product generated in the power generation portion 11 of the power generation portion 10A, the I/F portion 30A is configured to include a by-product collection path 52e for feeding the by-product into the fuel pack 20A.

Specifically, the I/F portion 30A supplies to the power generation portion 10A (the power generation portion 11) the power generation fuel FL charged in the fuel pack 20A under predetermined conditions (temperature, pressure and others) as a liquid fuel, a liquefied fuel or a gas fuel (fuel gas) obtained by vaporizing the fuel, through the fuel feed path. In the power supply system in which the power generation portion 10A and the fuel pack 20A are integrally configured through the I/F portion 30A, therefore, the power generation fuel FL charged in the fuel pack 20A can be constantly supplied to the power generation portion 10A through the fuel feed path. On the other hand, in the power supply system in which the power generation portion 10A and the fuel pack 20A can be attached and detached through the I/F portion 30A without restrain, the leak prevention function of the fuel leak preventing means provided to the fuel pack 20A is released by the leak prevention releasing means when the fuel pack 20A is coupled with the power generation portion 10A, and the power generation fuel FL can be supplied to the power generation portion 10A through the fuel feed path.

<Overall Operation of First Embodiment>

The overall operation of the power supply system having the above-described structure will now be described with reference to the drawings.

Figure 11:
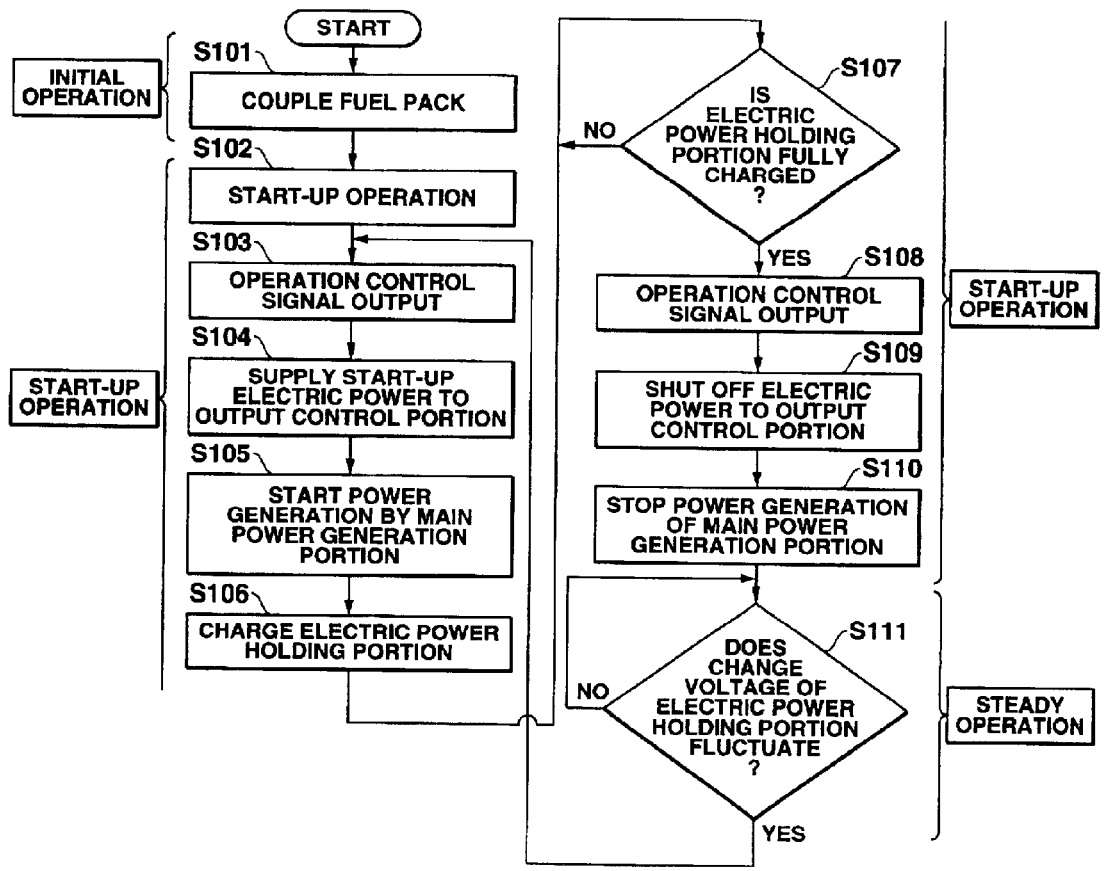
FIG. 11 is a flowchart showing a schematic operation of the power supply system according to a first embodiment of an electric power generation portion applied to the power supply system according to the present invention
Figure 12:
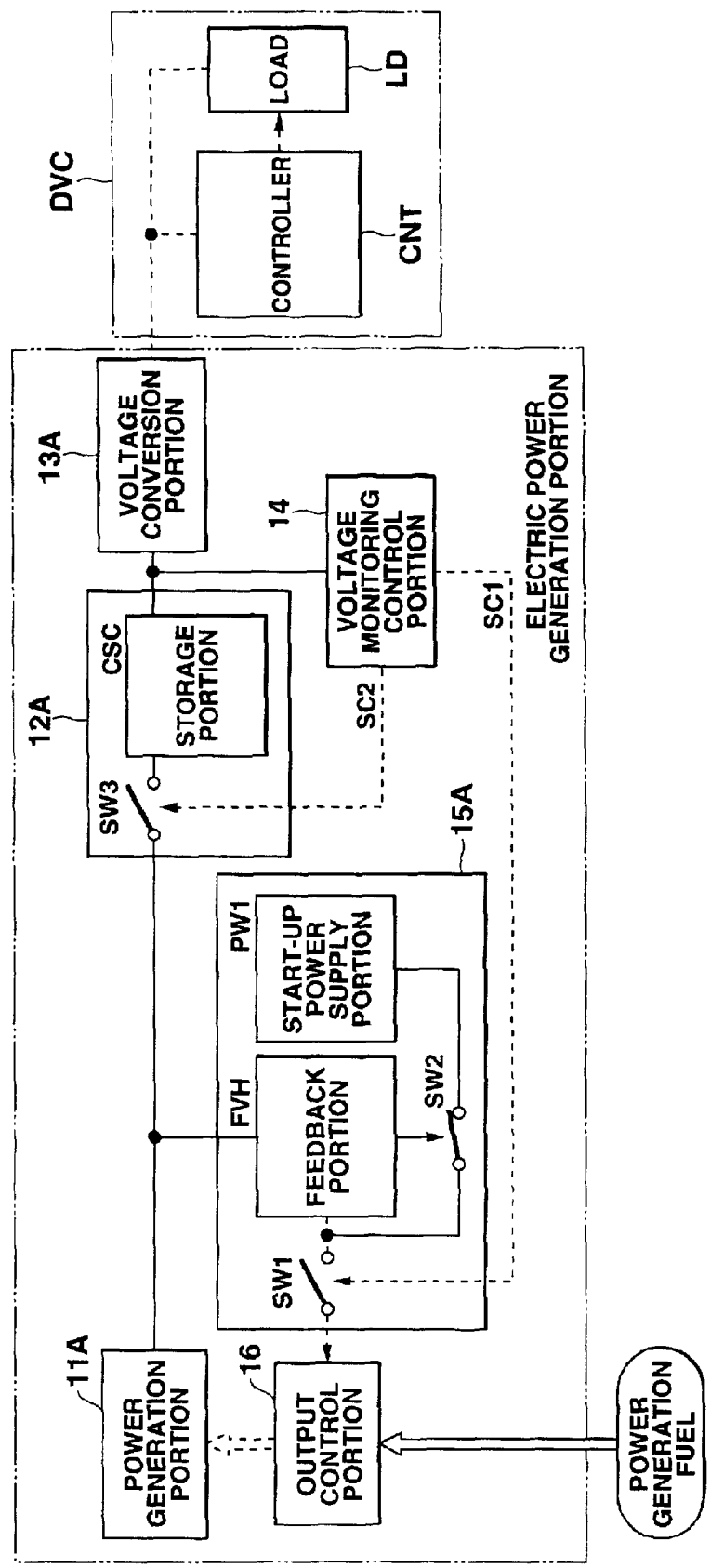
FIG. 12 is an operation conceptual view showing an initial operation of the power supply system according to a first embodiment of an electric power generation portion applied to the power supply system according to the present invention.
Figure 13:
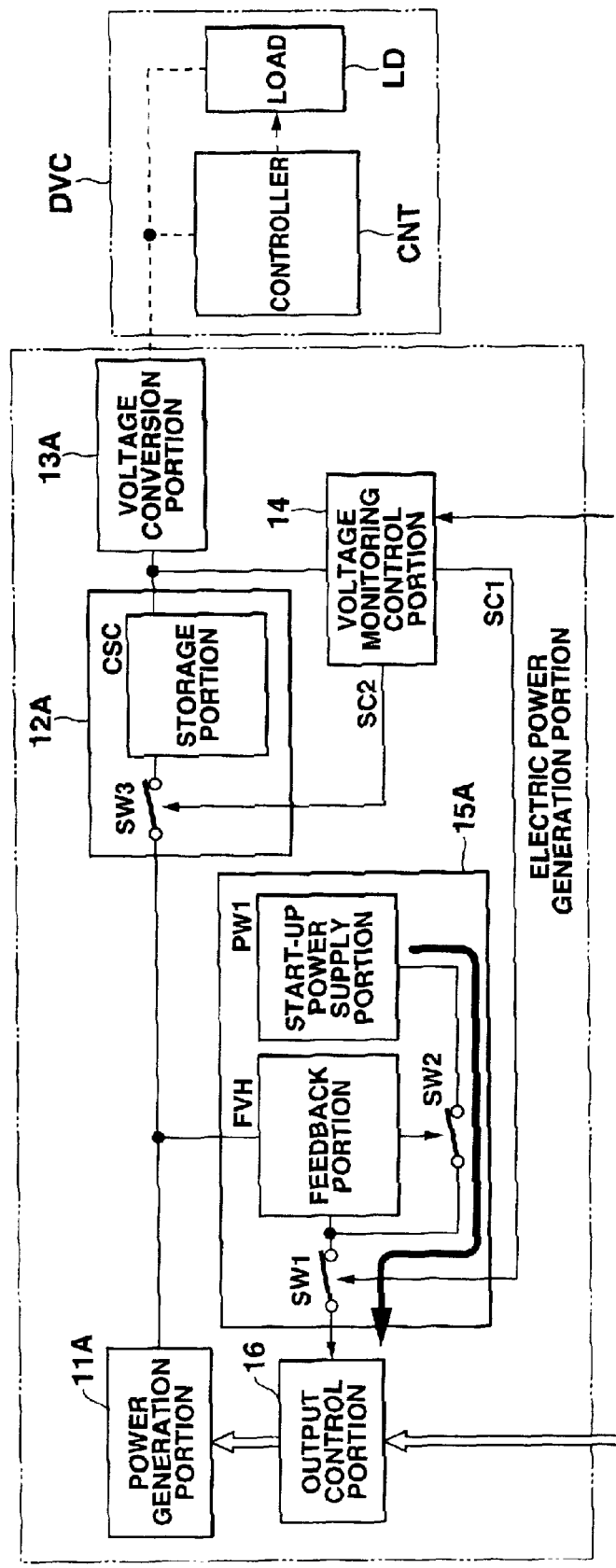
FIG. 13 is an operation conceptual view showing a start-up operation of the power supply system according to a first embodiment of an electric power generation portion applied to the power supply system according to the present invention.
Figure 14:
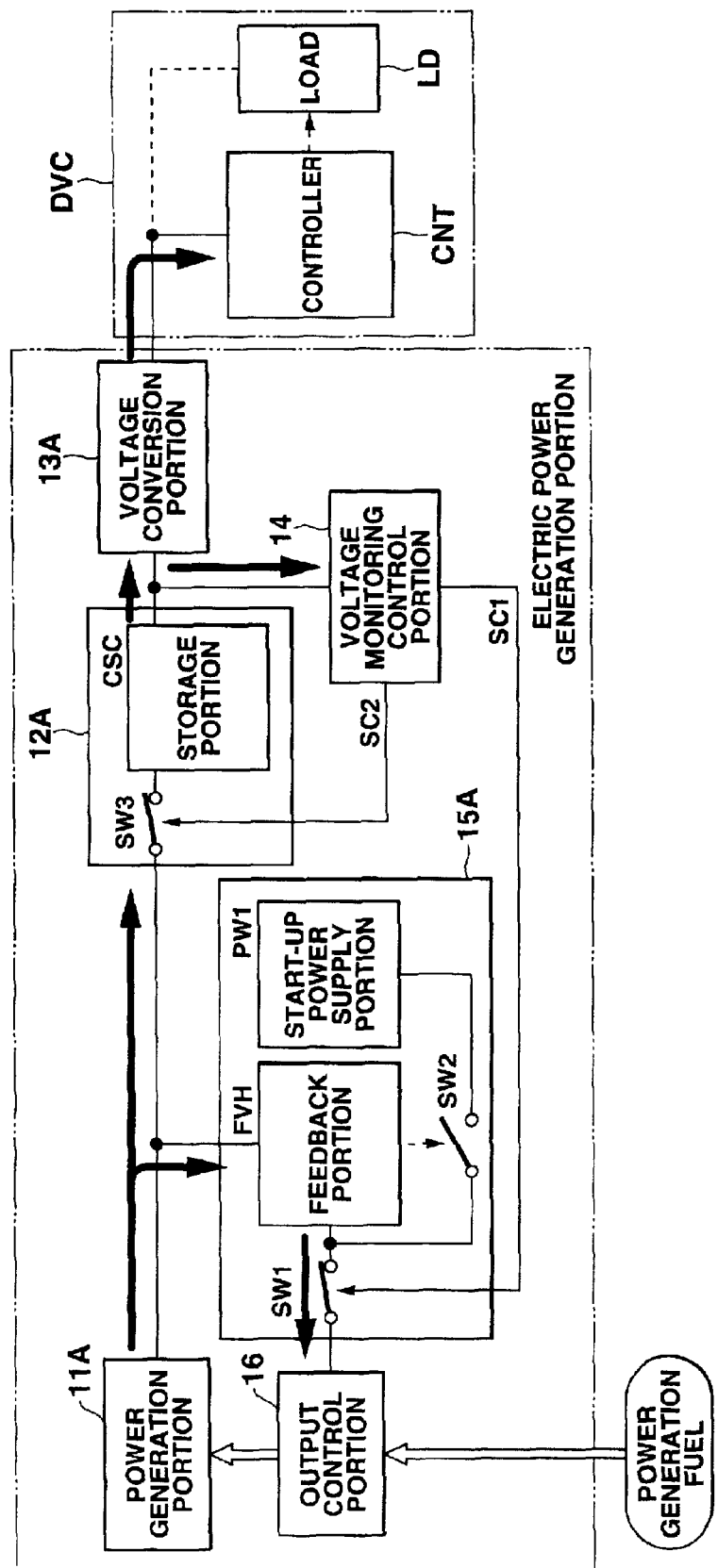
FIG. 14 is an operation conceptual view showing a state after a start-up operation of the power supply system according to a first embodiment of an electric power generation portion applied to the power supply system according to the present invention.
Figure 15:
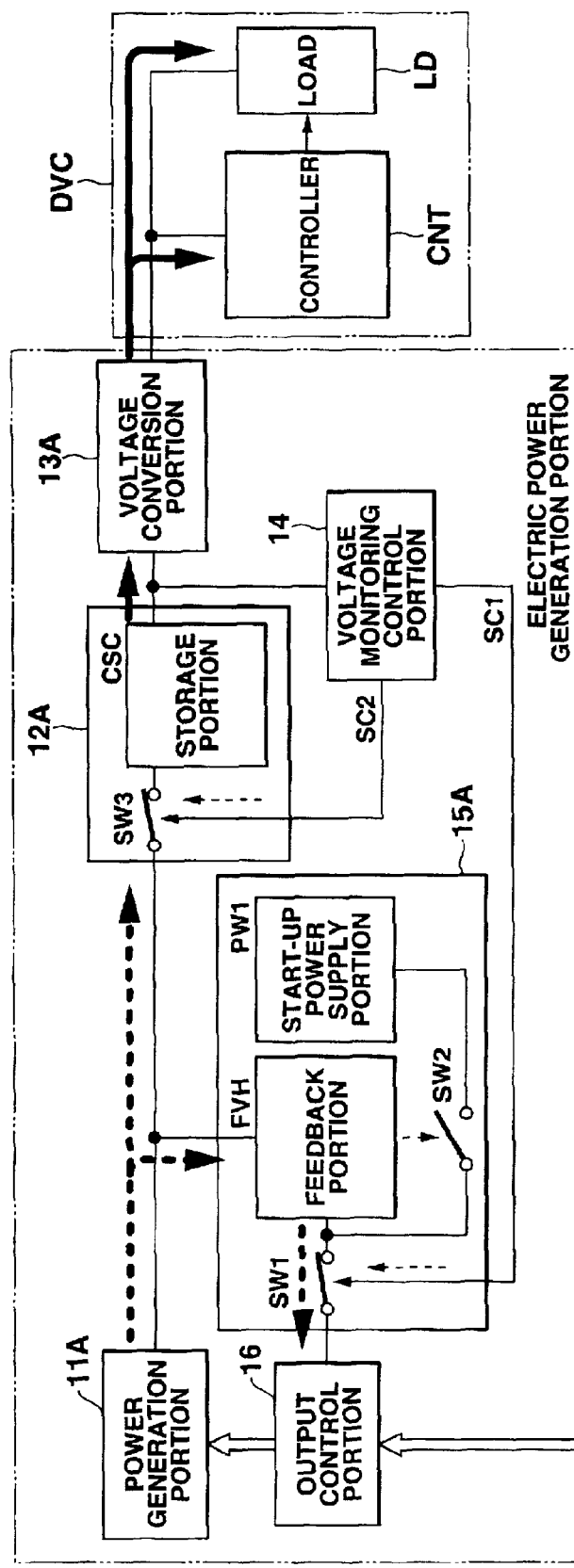
FIG. 15 is an operation conceptual view showing a state during a steady operation of the power supply system according to a first embodiment of an electric power generation portion applied to the power supply system according to the present invention.

FIG. 11 is a flowchart showing a schematic operation of the power supply system according to this embodiment. Furthermore, FIG. 12 is an operation conceptual view showing an initial operation of the power supply system according to this embodiment, FIG. 13 is an operation conceptual view showing a start-up operation of the power supply system according to this embodiment, FIG. 14 is an operation conceptual view showing the state after starting up the power supply system according to this embodiment, and FIG. 15 is an operation conceptual view showing the state at the time of a steady operation of the power supply system according to this embodiment. Here, the operation will be described while appropriately making reference to the structure of the above-described electric power generation portion (FIGS. 3 to 10). It is to be noted that the feedback voltage generation holding circuit constituting the start-up control portion will be referred to as a feedback portion in the drawing for the sake of illustration.

As shown in FIG. 11, the power supply system 1 having the structure according to this embodiment is controlled to execute: an initial operation (step S101) by which the fuel pack 20A is coupled with the electric power generation portion 10A through the I/F portion 30A so that the power generation fuel FL charged in the fuel pack 20A can be supplied to the power generation module 10A; a start-up operation (steps S102 to S110) by which the output control portion 16 is operated by supplying the start-up electric power from the start-up control portion 15 to the output control portion 16, predetermined electric power is generated by supplying the power generation fuel FL charged in the fuel pack 20A to the power generation portion 11 and the generated electric power is supplied to the electric power holding portion 12 and the start-up control portion 15; and a steady operation (step S111) by which the power generation portion 11 is appropriately controlled to be switched between the power generation mode and the power generation stop mode based on changes in the held voltage of the electric power holding portion 12 involved by the drive state of the load, and an output voltage having a substantially constant voltage is outputted.

Each operation will now be described in detail hereinafter with reference to FIGS. 12 to 15.

(A) Initial Operation

At first, in the initial operation, when the fuel pack 20A is coupled through the I/F portion 30A to the electric power generation portion 10A in which the electric charge is not stored in the storage circuit CSC of the electric power holding portion 12 and the auxiliary capacitor C11 of the start-up control portion 15 at all (initial state), the leak prevention function of fuel leak preventing means provided to the fuel pack 20A is released, and the power generation fuel FL charged in the fuel pack 20A moves in a fuel feed path by the capillary phenomenon of the fuel feed path and is supplied to the output control portion 16. Then, as shown in FIG. 12, the power generation fuel FL is held so as to be capable of being supplied to the power generation portion 11A (step S101). Incidentally, since the start-up electric power is not supplied from the start-up control portion 15A to the output control portion 16 in this state, supply of the power generation fuel FL to the power generation portion 11A is in the shutoff state.

(B) Start-up Operation

Subsequently, in the start-up operation from the initial state, as shown in FIG. 13, the operation control signals SC1 and SC2 are outputted from the voltage monitor/control portion 14 (step S103) by performing a predetermined start-up operation (step S102), and the switch SW1 of the start-up control portion 15A and the switch SW3 of the electric power holding portion 12A are switched to the ON state. As a result, the start-up electric power is supplied to the output control portion 16 from the start-up power supply portion PW1 provided to the start-up control portion 15A (step S104), and thereby the output control portion 16 is operated. Also, the power generation fuel FL is supplied to the power generation portion 11A and predetermined electric power is generated (step S105).

Here, as shown in FIG. 14, the electric power generated by the power generation portion 11A is supplied to the electric power holding portion 12A and held (stored or charged) by the storage circuit CSC (step S106), and the voltage monitor/control portion 14 monitors the charge voltage of the held electric power. Also, a part of the electric power generated by the power generation portion 11A is supplied to the feedback voltage generation holding circuit (written as a feedback portion in the drawing) of the start-up control portion 15A, and generation of the feedback voltage, turning OFF the switch SW2 and charge of the auxiliary capacitor C11 are carried out. As a result, when the electric power generated in the power generation portion 11A reaches a predetermined voltage V1, the feedback voltage is generated based on the electric power (voltage V1) outputted from the power generation portion 11A, and it is supplied to the output control portion 16 as the electric power for continuing the power generation operation. Moreover, supply of the start-up electric power from the start-up power supply portion PW1 to the output control portion 16 is shut off.

Incidentally, as the start-up operation for starting up the electric power generation portion 10A from the initial state, at least an operation performing control to turn ON the switch SW1 of the start-up control portion 15 and the switch SW3 of the electric power holding portion 12A can suffice as described above. For example, the voltage monitor/control portion 14 may be controlled to forcibly output the low-level operation control signals SC1 and SC2 when a user of the power supply system according to the present invention operates a non-illustrated start-up switch or the like by the manual operation. Alternatively, there may be provided a mechanism which forcibly turns ON the switches SW1 and SW2 only in the instant of coupling the fuel pack 20A with the electric power generation portion 10A.

Then, when the storage circuit CSC of the electric power holding portion 12A is charged with the electric power generated by the power generation portion 11A and its charge voltage reaches a predetermined value corresponding to the fully charged state (step S107), the voltage monitor/control portion 14 outputs the high-level operation control signals SC1 and SC2 to the start-up control portion 15A and the electric power holding portion 12A (step S108), and the switches SW1 and SW3 are controlled to be turned OFF. As a result, supply of the electric power for continuing the power generation operation to the output control portion 16 is shut off (step S109), and the power generation operation in the power generation portion 11A is stopped (step S110). Also, supply of the electric power to the electric power holding portion 12A is shut off, and the charge operation in the storage circuit CSC is stopped, thereby completing shift (start-up) from the initial state to the steady state. At this moment, when the power supply system is attached to the device DVC, the electric power according to the charge voltage V2 of the storage circuit CSC is subjected to voltage conversion by the voltage conversion portion 13A, and it is supplied as the supply electric power having a constant output voltage Vout to the controller CNT (or the controller CNT and the load LD) of the device DVC. Additionally, the charge voltage V2 of the storage circuit CSC is constantly monitored by the voltage monitor/control portion 14 (step S111).

(C) Steady Operation

Subsequently, in the steady operation, as shown in FIG. 15, the following control is carried out. For example, when the charge voltage in the storage circuit CSC of the electric power holding portion 12 becomes not more than a lower limit threshold value in a predetermined voltage range by, e.g., continuing driving the load LD in the device DVC, the voltage monitor/control portion 14 detects reduction in the charge voltage, and the low-level operation control signal SC1 is outputted to the start-up control portion 15A in order to turn ON the switch SW1. Further, the power generation portion 11A is again changed (restart-up) from the standby mode to the power generation mode, and the low-level operation control signal SC2 is outputted to the electric power holding portion in order to turn ON the switch SW2. The electric power generated and outputted by the power generation portion 11A is charged (recharged) in the storage circuit CSC.

On the other hand, when the charge voltage of the storage circuit CSC falls within a predetermined voltage range, it is determined that the electric charge corresponding to predetermined supply electric power is stored in the storage circuit CSC, only the operation for discharging the electric charge stored in the storage circuit CSC is performed without executing the power generation operation of the power generation portion 11A, and predetermined supply electric power is continuously supplied to the device DVC.

Incidentally, in this restart-up operation, a predetermined voltage is charged in the auxiliary capacitor C11 constituting the feedback voltage generation holding circuit FVH of the start-up control portion 15A based on the electric power (voltage V1) generated by the power generation portion 11A in the previous start-up operation. When the charge voltage corresponds to or exceeds a voltage Vbat of the start-up power supply portion PW1, the start-up electric power based on the charge voltage of the auxiliary capacitor C11 is supplied to the output control portion 16. On the other hand, when the charge voltage is less than the voltage Vbat of the start-up power supply portion PW1, the switch SW2 in the start-up control portion 15A is controlled to be switched so that the start-up electric power based on the voltage Vbat by the start-up power supply portion PW1 can be supplied to the output control portion 16. Such a restart-up operation is similarly executed even when the power generation fuel FL charged in the fuel pack 20A is used up and the fuel pack is replaced with a new one. According to this, the start-up operation using the start-up electric power supplied from the start-up power supply portion PW1 is executed substantially only in the first start-up operation from the initial state. In the subsequent restart-up operation, since the electric power based on the voltage charged in the auxiliary capacitor C11 can be utilized as the start-up electric power, the start-up power supply portion PW1 provided to the start-up control portion 15 can be constituted by power supply means such as a primary cell which is relatively small in size and has a small cell capacity.

As described above, according to the power supply system of this embodiment, substantially constant electric power can be outputted to the device by appropriately repeating the power generation and stop operations of the power generation portion and the charge and charge stop operations of the electric power holding portion in accordance with the held electric power (charge state) in the electric power holding portion after the start-up operation from the initial state while the power generation fuel remains in the fuel pack without receiving supply of the fuel or the like from the outside of the power supply system. Therefore, the power supply system having the electrical characteristic substantially equal to that of the general-purpose chemical cell can be realized and the existing load (device) can be excellently driven. Also, as compared with the power supply system having the structure for continuously causing the power generation portion to perform the power generation operation, waste of the power generation fuel can be greatly suppressed, and the energy resource can be efficiently utilized. Thus, it is possible to provide the power supply system having the extremely high energy utilization efficiency while assuring the compatibility with respect to the general-purpose chemical cell. Furthermore, in this case, since the power generation and stop operations of the power generation portion and the charge and charge stop operations of the electric power holding portion can be realized by a simple signal control method which simply turns ON/OFF the switch controlling the supply state of the power generation fuel to the power generation fuel or the switch controlling the supply state of the electric power to the electric power holding portion, the device structure of the electric power generation portion can be simplified, and the size of the apparatus scale or the product cost can be reduced.

Moreover, according to the power supply system of this embodiment, since this power supply system has the structure that the electric power generated by the power generation portion is temporarily stored in the electric power holding portion and it is then supplied to the device (load), it is possible to supply the electric power which is relatively stable with respect to sudden fluctuation in the drive state of the load connected to the power supply system. In addition, even if the power generation fuel in the fuel pack is used up and the power generation operation is not carried out in the power generation portion, the electric power stored in the electric power holding portion can be continuously outputted for a while. Therefore, the drive state of the device can be maintained even during the operation for detaching and replacing the fuel pack. Additionally, by applying, for example, an electric double layer capacitor as the storage circuit constituting the electric power holding portion, the weight of the apparatus can be considerably reduced as compared with cases where, for example, a secondary cell is applied as charge storing means.

Further, in the power supply system according to this embodiment, as will be described later, the power supply system can be reduced in size and weight by applying, for example, a micromachine manufacturing technique in order to modularize the electric power generation portion, and integrate and form this portion in a small space. For example, by constituting the power supply system so as to have the shape and dimension equivalent to those of the general-purpose chemical cell based on standards such as Japanese Industrial Standards (JIS) as with an AA battery, it is possible to realize the high compatibility with the general-purpose chemical cell in both the outside shape and the electrical characteristic (voltage/electric current characteristic), and popularization in an existing cell marketplace can be further facilitated. As a result, since it is possible to popularize the power supply system which greatly suppress emission of harmful substances of, e.g., a fuel cell and to which power generating means capable of realizing the high energy utilization efficiency is applied in place of the existing chemical-cell having many problems in, for example, environmental concerns or the energy utilization efficiency, the energy resource utilization efficiency can be improved while suppressing the influence on the environment.

[Second Embodiment]

Description will now be given hereinafter as to a second embodiment of the electric power generation portion applied to the power supply system according to the present invention reference to the drawings.

Figure 16:
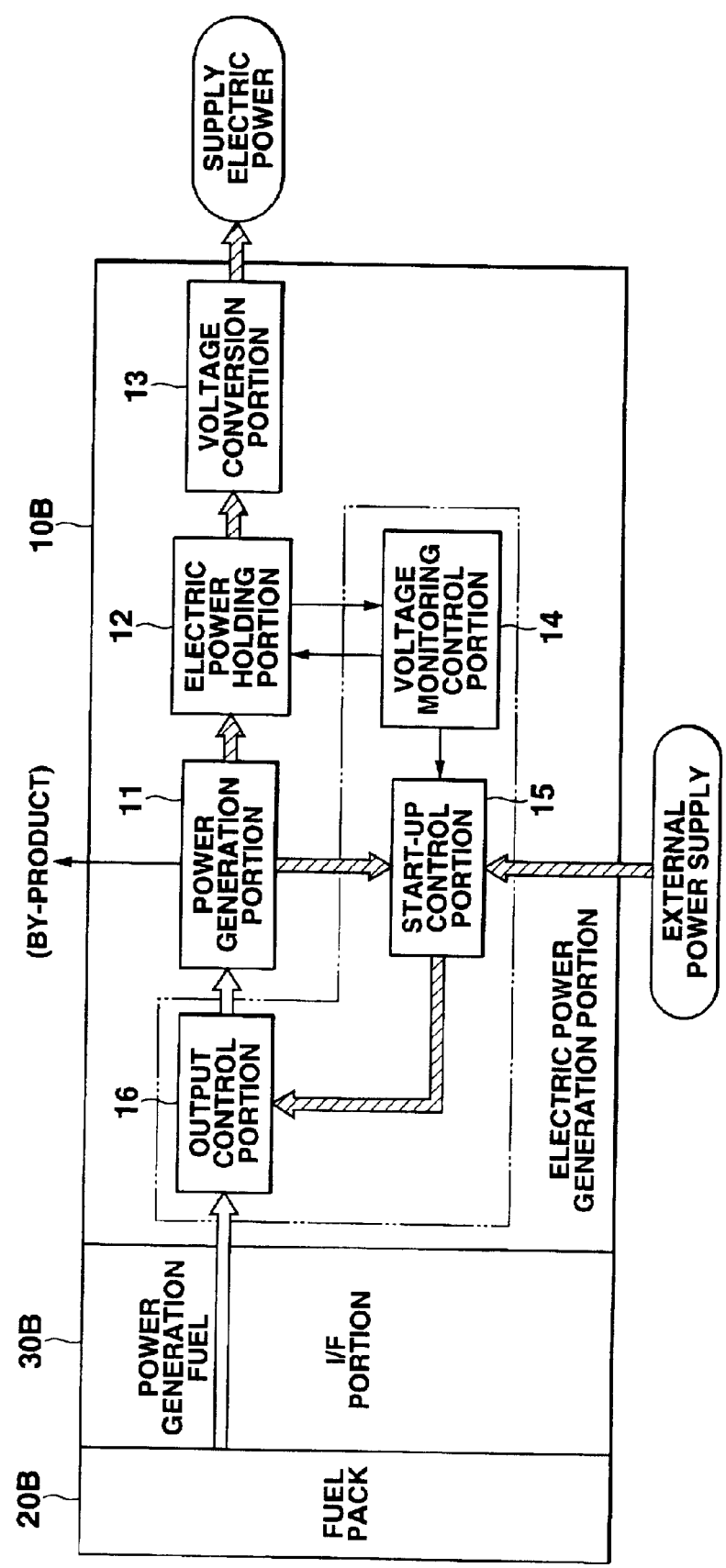
FIG. 16 is a block diagram showing a second embodiment of an electric power generation portion applied to the power supply system according to the present invention.
Figure 17:
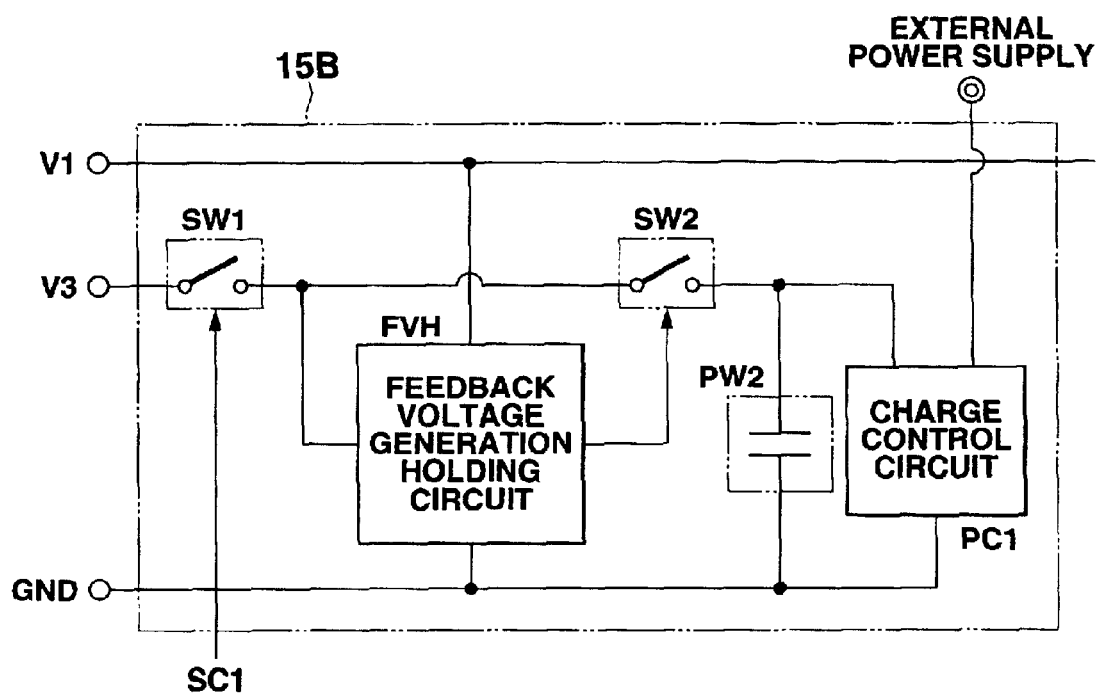
FIG. 17 is a circuit block diagram showing a structural example of a start-up control portion applicable to the second embodiment of the electric power generation portion applied to the power supply system according to the present invention.
Figure 18:
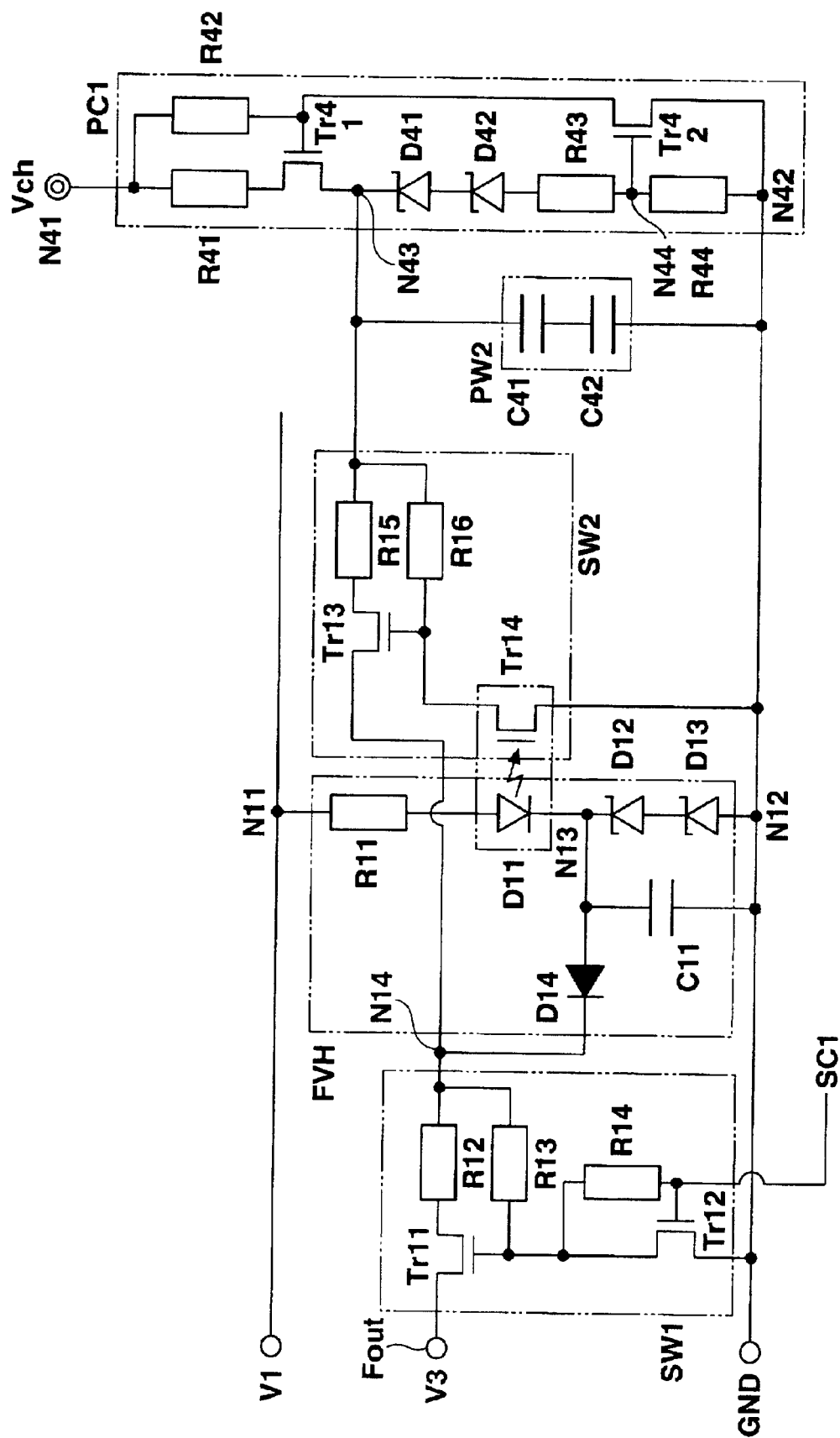
FIG. 18 is a circuit view showing a designated structural example the a start-up control portion applicable to the second embodiment of the electric power generation portion applied to the power supply system according to the present invention.

FIG. 16 is a block diagram showing the second embodiment of the electric power generation portion applied to the power supply system according to the present invention. Further, FIG. 17 is a circuit block diagram showing a structural example of the start-up control portion applied to the electric power generation portion according to this embodiment, and FIG. 18 is a circuit structural view showing a concrete structural example of the start-up control portion. Here, like reference numerals denote structures equivalent to those described in connection with the first embodiment, thereby omitting their explanation.

The above has described the case where the structure including the power supply means such as a primary cell which does not require electric power supply from the outside is applied as the start-up power supply portion PW1 constituting the start-up control portion 15 in the electric power generation portion 10A according to the first embodiment. In the electric power generation portion according to this embodiment, however, as shown in FIG. 16, there is provided the structure that the start-up control portion 15 includes charge storing means capable of charging with electric power (external supply electric power) supplied from the outside of the electric power generation portion 10B.

That is, as shown in FIG. 17, specifically, the start-up control portion 15b applied to this embodiment is configured to include: a feedback voltage generation holding circuit FVH having the structure equivalent to that of the start-up control portion 15A (see FIG. 7) described in connection with the first embodiment; a start-up power supply portion PW2 consisting of a capacitor as well as the switches SW1 and SW2; and a charge control circuit PC1 used for charging the start-up power supply portion PW2 with electric power supplied from an external power supply.

As a concrete circuit configuration of the start-up power supply portion PW2 and the charge control circuit PC1, as shown in FIG. 18, it is possible to apply the structure in which there are provided: an electric current limit resistance R41, a switch transistor Tr41 and start-up capacitors C41 and C42 constituting the start-up power supply portion PW2 connected in series between an input contact point N41 to which electric power (voltage Vch) from the external power supply is supplied and a contact point N42 (the same contact point as the contact point N12 shown in FIG. 17) to which the ground potential GND is supplied; a voltage detection resistance R42 connected between a gate of the switch transistor Tr41 and the input contact point N41; Zener diodes D41 and D41 and voltage dividing resistances R43 and R44 connected in series between a connection contact point N43 between the switch transistor Tr41 and the start-up capacitor C41 and the contact point N42 on the low-potential side; and a control transistor Tr42 connected between the gate of the switch transistor Tr41 and the contact point N42 on the low-potential side.

Here, the divided voltage at the connection contact point N44 of the voltage dividing resistances R43 and R44 is supplied to the gate of the control transistor Tr42. Furthermore, the connection contact point N43 is connected to one end side of the switch SW2, and the electric power based on the charge voltage (corresponding to the voltage Vbat) of the start-up capacitors C41 and C42 is supplied as the start-up electric power.

That is, the charge control circuit PC1 is configured to include a switching function realized by the electric current limit resistance R41, the switch transistor Tr41, the voltage detection resistance R42 and the control transistor Tr42 and a voltage detection function realized by the Zener diodes D41 and D42 and the voltage dividing resistances R43 and R44.

The main operation of the power supply system having the above-described structure will now be described with reference to the drawings.

Figure 19:
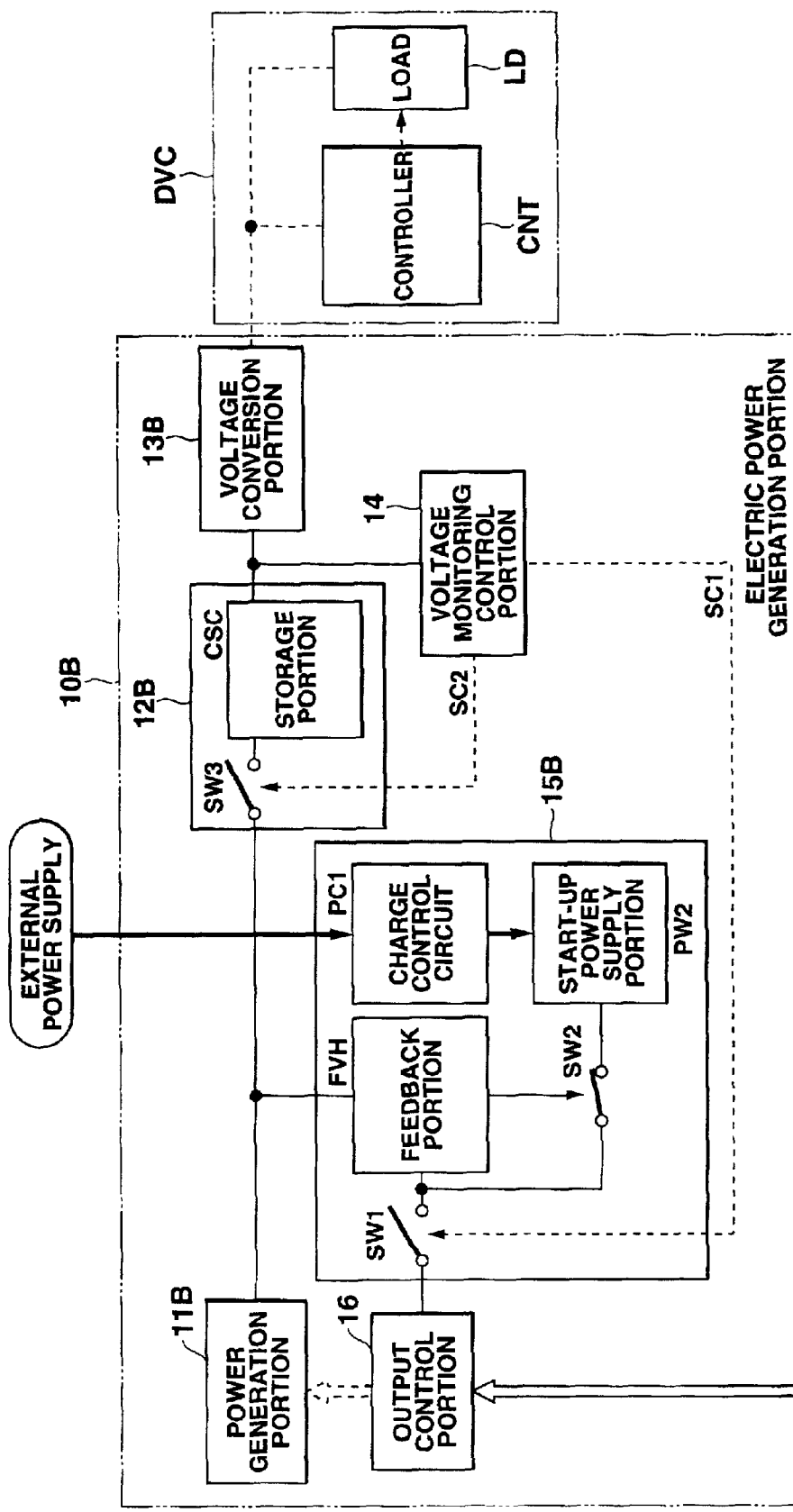
FIG. 19 is an operation conceptual view showing an initial operation of the power supply system according to the second embodiment the an electric power generation portion applied to the power supply system according to the present invention.
Figure 20:
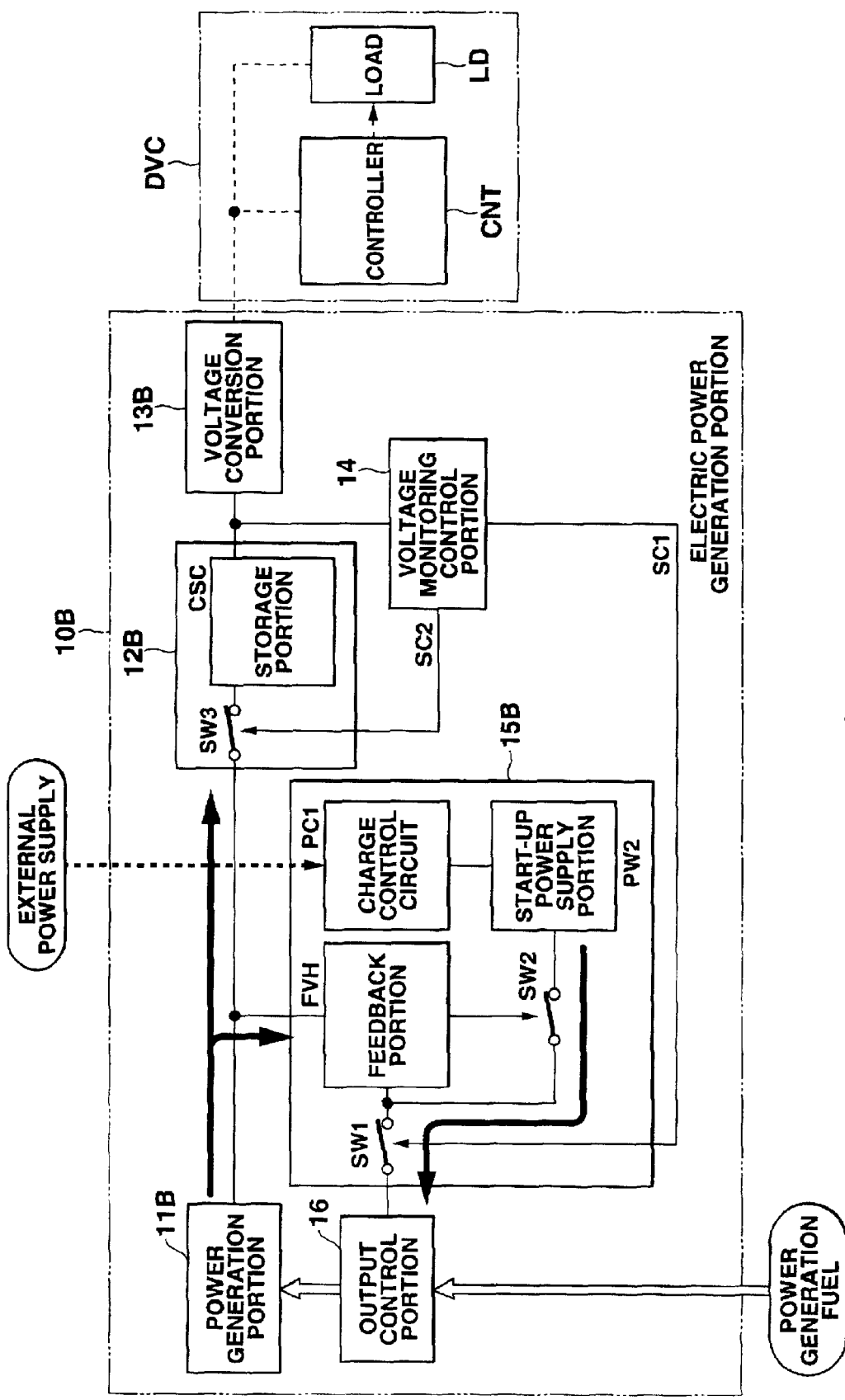
FIG. 20 is an operation conceptual view showing a start-up operation of the power supply system according to the second embodiment of the electric power generation portion applied to the power supply system according to the present invention.

FIG. 19 is an operation conceptual view showing an initial operation of the power supply system according to this embodiment, and FIG. 20 is an operation conceptual view showing a start-up operation of the power supply system according to this embodiment. Here, explanation of the operations equivalent to those in the first embodiment mentioned above will be simplified or omitted.

In regard to the initial operation of the power supply system according to this embodiment, as shown in FIG. 19, in the start-up control portion, the start-up operation from the initial state of the electric power generation portion 10B is first carried out. That is, prior to the operation using the start-up switch by a user of the power supply system, coupling the fuel pack to the electric power generation portion 10B or the like, the charge control circuit PC1 performs the operation for charging the start-up capacitors C41 and C42 constituting the start-up power supply portion PW2 with the electric power corresponding to the start-up electric power based on predetermined electric power (voltage Vch) supplied from an external power supply provided to the outside of the power supply system, for example, a general commercial power source or a commercially available dry cell. As a result, as shown in FIG. 20, when the low-level operation control signal SC1 is outputted to the switch SW1 in order to start up the power generation portion 11B, the start-up electric power based on the charge voltage (voltage of the connection contact point N43) of the start-up capacitors C41 and C42 is supplied to the output control portion 16 through the switches SW2 and SW1. Therefore, in this embodiment, since it is not necessary to provide the power supply means, e.g., a primary cell as the start-up power supply of the electric power generation portion 10B, the electric power generation portion can be utilized for a long time without taking duration of life of the cell in the start-up power supply portion into consideration.

Incidentally, in case of restarting up the power generation portion 11B, as similar to the first embodiment mentioned above, if the charge voltage in the auxiliary capacitor C11 of the feedback voltage generation holding circuit FVH corresponds to or exceeds the voltage (Vbat) of the start-up electric power, the electric power based on the charge voltage of the auxiliary capacitor C11 is supplied as the start-up electric power to the output control portion 16. If the charge voltage is less than the voltage of the start-up electric power, the electric power based on the charge voltage of the start-up capacitors C41 and C42 of the start-up power supply portion PW2 is supplied as the start-up electric power to the output control portion 16.

[Third Embodiment]

Description will now be given as to the third embodiment of the electric power generation portion applied to the power supply system according to the present invention with reference to the drawings.

Figure 21A:
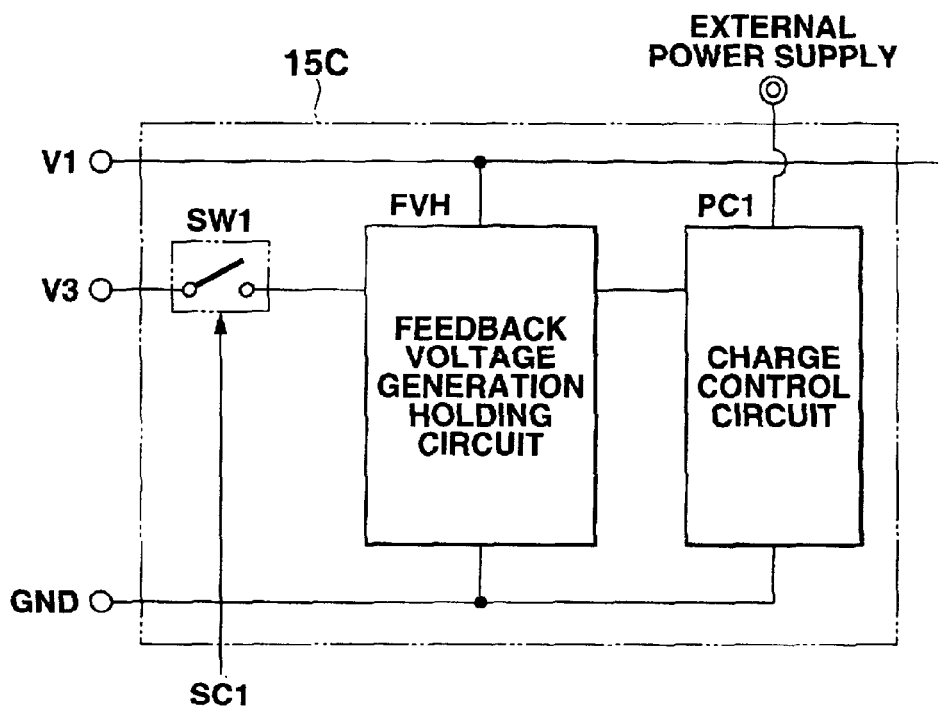
FIGS. 21A and 21B are a circuit block diagram and a designated circuit view showing structural examples of a start-up control portion applicable to a third embodiment of an electric power generation portion applied to the power supply system according to the present invention, respectively.

FIG. 21A is a circuit block diagram showing a structural example of the start-up control portion applied to the third embodiment of the electric power generation portion applied to the power supply system according to the present invention. Here, like reference numerals denote structures equivalent to those in the structural examples in the first and second embodiments mentioned above, thereby simplifying or omitting their explanation.

In regard to the start-up control portion 15B according to the structural example (see FIGS. 17 and 18) according to the second embodiment, description has been given as to the case where the structure including the start-up capacitors C41 and C42 charged with the electric power supplied from the outside is applied as the start-up power supply portion PW2. In the start-up control portion applied to the electric power generation portion according to this structural example, however, there is provided charge storing means which is configured to also serve as the start-up capacitors C41 and C42 as well as the auxiliary capacitor C11 (see FIG. 7B) provided to the feedback voltage generation holding circuit FVH described in connection with the first embodiment mentioned above.

That is, as shown in FIG. 21A, the start-up control portion 15C applied to this structural example is configured to include the switch SW1 and the charge control circuit PC1 having the structure equivalent to that of the start-up control portion (see FIGS. 7A and 17) described in the structural example of the first and second embodiments mentioned above, as well as the feedback voltage generation holding circuit FVH including common (single) charge storing means for supplying the start-up electric power and the electric power used for continuing the power generation operation.

Figure 21B:
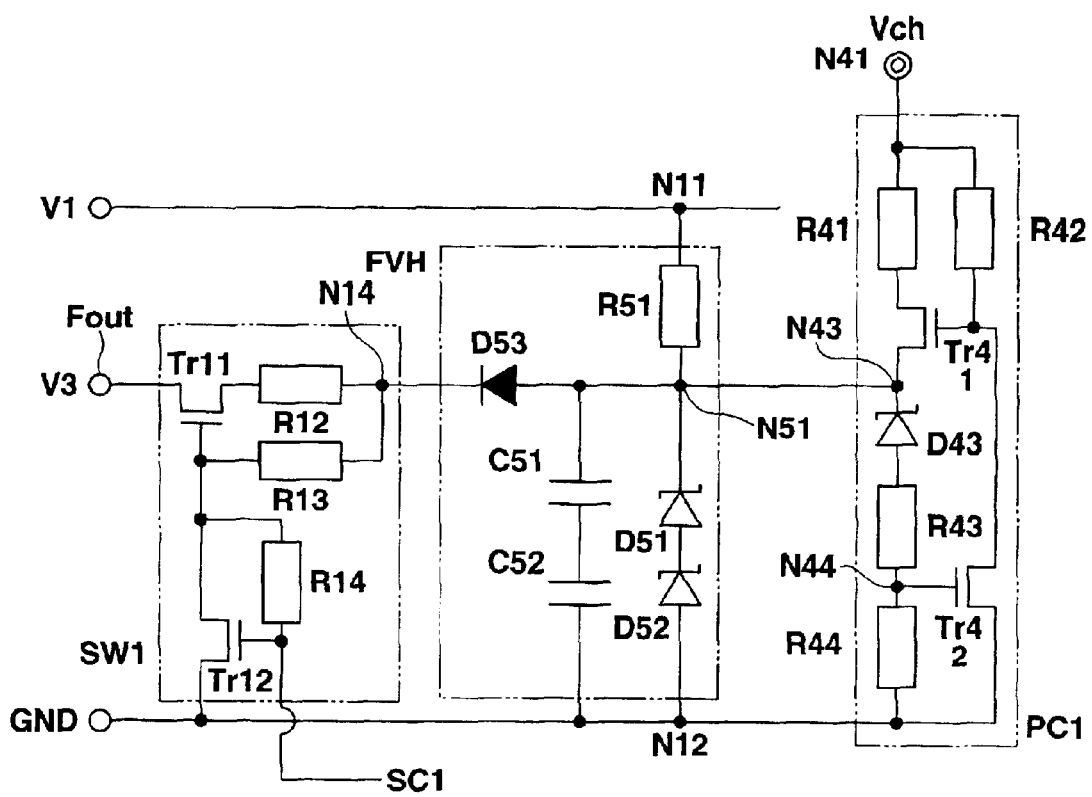

As a concrete circuit configuration of the feedback voltage generation holding circuit FVH according to this structural example, for example, as shown in FIG. 21B, it is possible to apply the structure in which there are provided: a resistance R51 and common capacitors C51 and C52 connected in series between the contact point N11 on the high-potential side to which electric power (voltage V1) generated by the power generation portion 11 is supplied and the contact point N12 on the low-potential side to which the ground potential GND is supplied; Zener diodes D51 and D52 connected in series between a connection contact point N51 between the resistance R51 and the common capacitor (auxiliary electric power holding portion) C51 and the contact point N12 on the low-potential side; and a diode D53 connected between the connection contact point N51 and the contact point N14 on one end side of the switch SW1.

Moreover, in regard to the charge control circuit PC1, as shown in FIG. 21B for example, as substantially similar to the structural example of the second embodiment, it is possible to apply the structure in which there are provided: an electric current limit resistance R41, a switch transistor Tr41, a Zener diode D43 and voltage dividing resistances R43 and R44 connected in series between an input contact point N41 to which electric power (voltage Vch) from an external power supply is supplied and a contact point N42 on the low-potential side; a voltage detection resistance R42 connected between a gate of the switch transistor Tr41 and the input contact point N41; and a control transistor Tr42 connected between the gate of the switch transistor Tr41 and the contact point N12 on the low-potential side.

Here, the divided voltage at the connection contact point N44 of the voltage dividing resistances R43 and R44 is supplied to a gate of the control transistor Tr42. In addition, the connection contact point N43 between the switch transistor Tr41 and the Zener diode D43 is connected to a connection contact point N51 of the feedback voltage generation holding circuit FVH, and either the voltage (feedback voltage) at the connection contact point N51 generated by the feedback voltage generation holding circuit FVH based on the electric power (voltage V1) supplied from the power generation portion 11 or the voltage at the connection contact point N43 based on the electric power (voltage Vch) supplied from the external power supply is applied to the common capacitors C51 and C52, thereby performing charging.

The main operation of the power supply system having the above-described structure will now be described with reference to the drawings.

Figure 22:
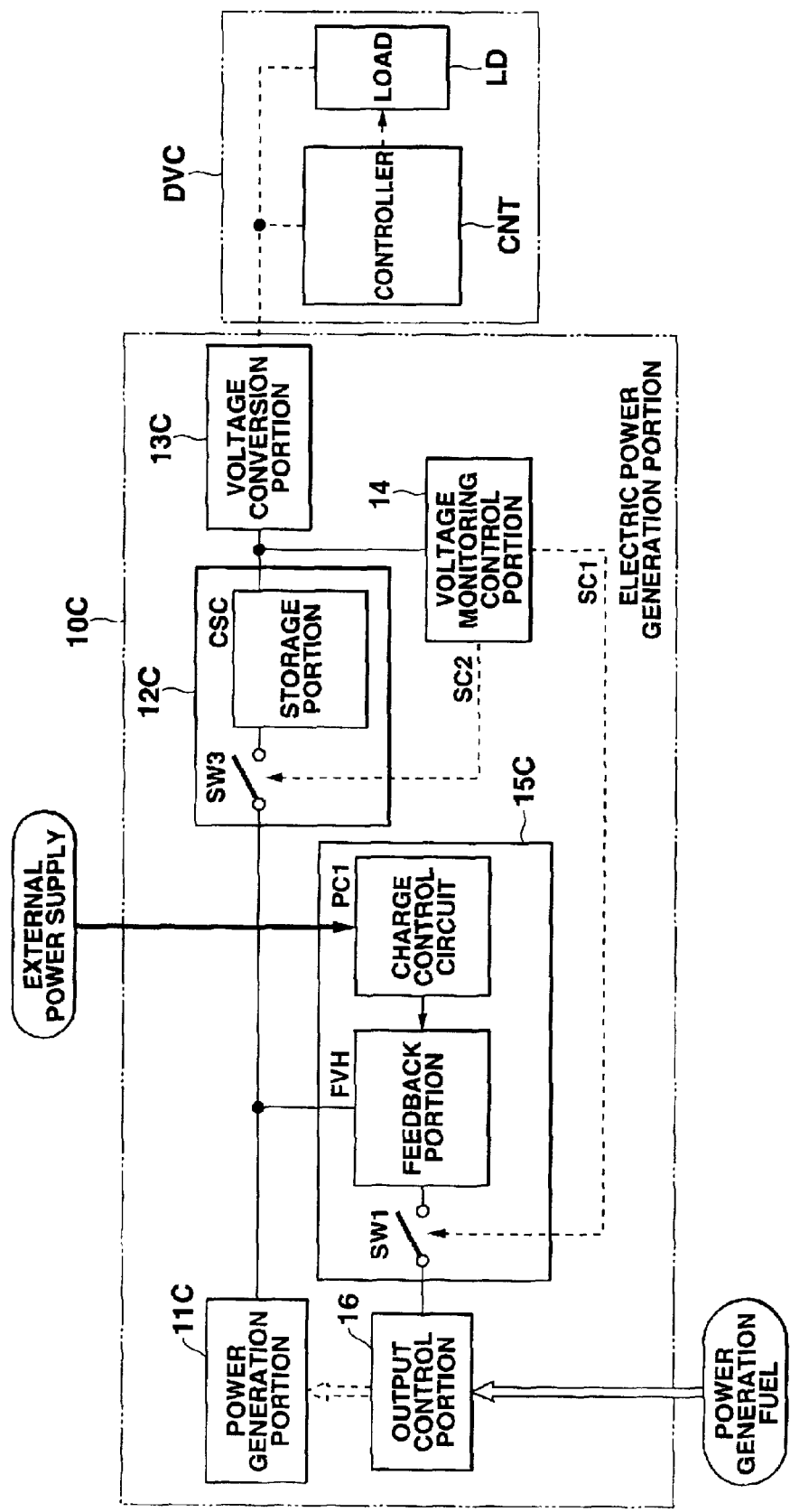
FIG. 22 is an operation conceptual view showing an initial operation of the supply system according to the third embodiment of the electric power generation portion applied to the power supply system according to the present invention.
Figure 23:
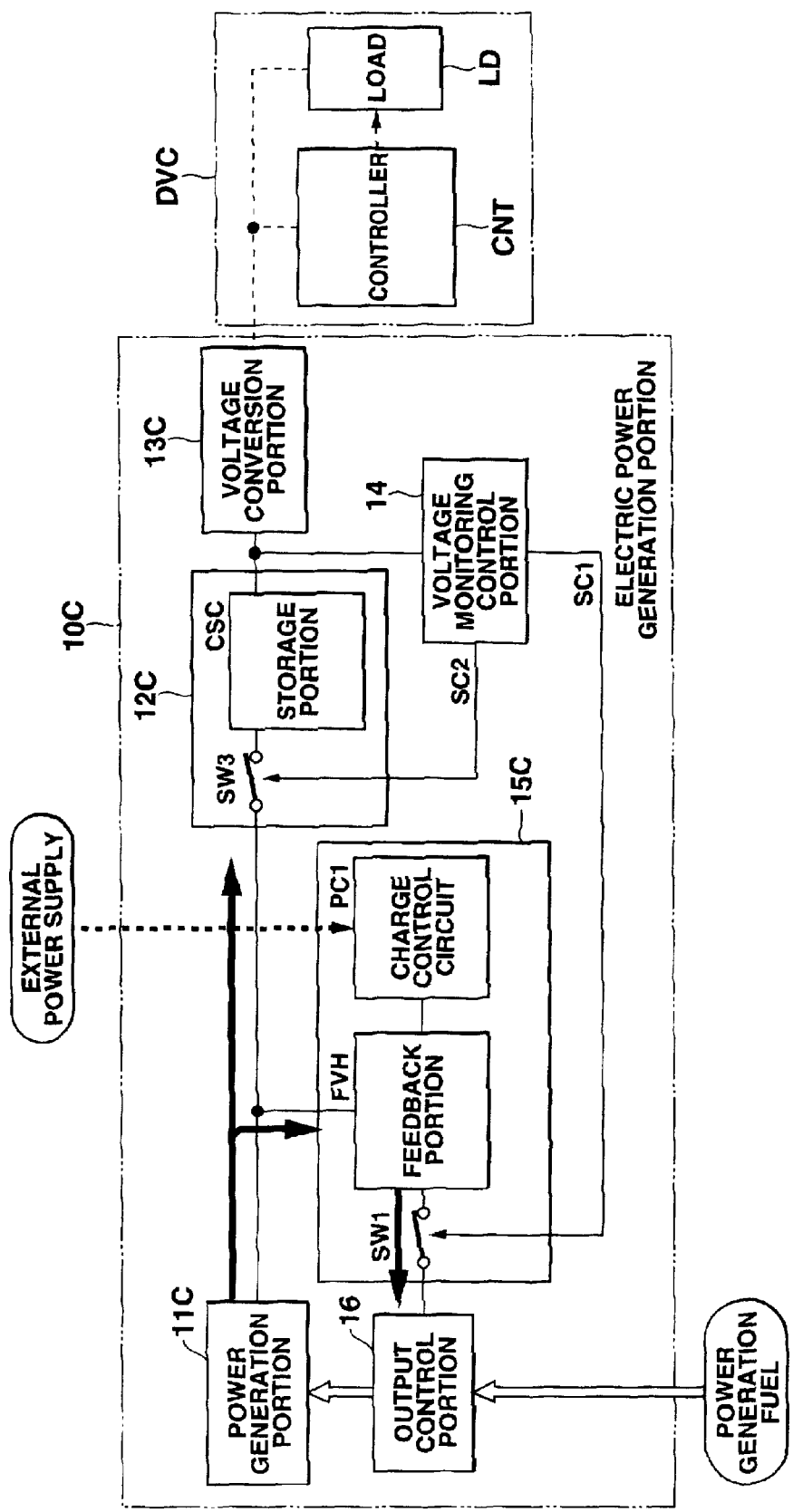
FIG. 23 is an operation conceptual view showing a start-up operation of the power supply system according to the third embodiment of the electric power generation portion applied to the power supply system according to the present invention

FIG. 22 is an operation conceptual view showing an initial operation of the power supply system according to this embodiment, and FIG. 23 is an operation conceptual view showing a start-up operation of the power supply system according to this embodiment. Here, explanation of the operations equivalent to those in the first or second embodiment mentioned above will be simplified or omitted.

In regard to the initial operation of the power supply system according to this embodiment, as shown in FIG. 22, in the start-up control portion, prior to the start-up operation from the initial state of the electric power generation portion 10C, the charge control circuit PC1 performs the operation for charging the common capacitors C51 and C52 provided to the feedback voltage generation holding circuit FVH with the electric power corresponding to the start-up electric power based on predetermined electric power (voltage Vch) supplied from the external power supply provided to the outside of the power supply system. As a result, as shown in FIG. 23, when the low-level operation control signal SC1 is outputted to the switch SW1 in order to start up the power generation portion 11, the start-up electric power based on the charge voltage (voltage at the connection contact point N51) of the common capacitors C51 and C52 is supplied to the output control portion 16 through the switch SW1. In this embodiment, therefore, since it is not necessary to provide the power supply means, e.g., a primary cell as the start-up power supply of the electric power generation portion, the electric power generation portion can be utilized for a long time without taking duration of life of the cell in the start-up power supply into consideration. Also, omitting the structure of, e.g., the switch SW2 can simplify the circuit configuration of the electric power generation portion and reduce the apparatus scale.

Incidentally, in this embodiment, in case of restarting up the power generation portion, the start-up electric power based on the charge voltage of the common capacitors C51 and C52 of the feedback voltage generation holding circuit FVH is uniquely supplied to the output control portion 16. Here, if the charge voltage is less than the voltage Vbat corresponding to the start-up electric power, the start-up operation of the output control portion and the power generation portion is not carried out. In such a case, however, a user of the power supply system can normally operate the electric power generation portion by supplying the electric power (voltage Vch) from the external power supply through the input contact point N41 and charging the common capacitor C52.

[Fourth Embodiment]

A fourth embodiment of the electric power generation portion applied to the power supply system according to the present invention will now be described with reference to the drawings.

Figure 24:
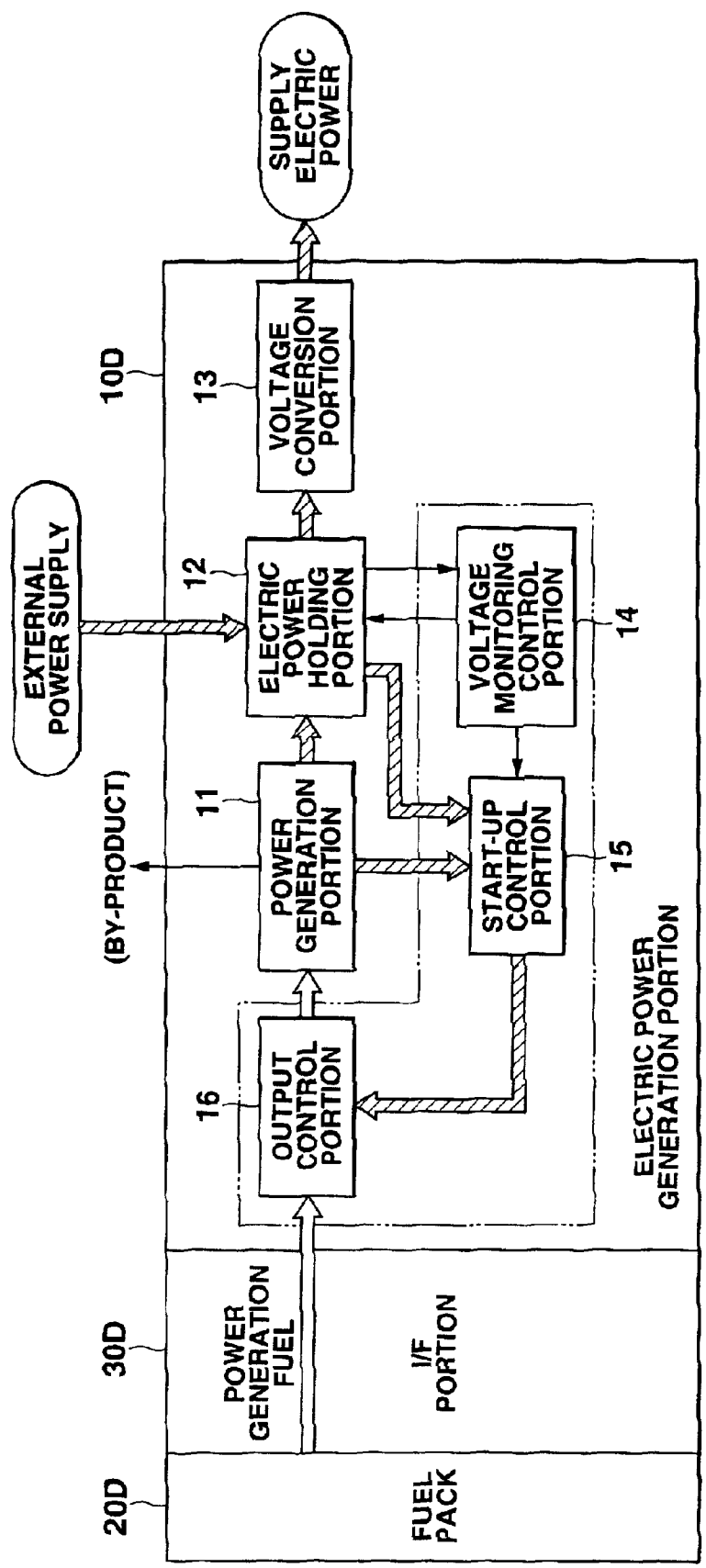
FIG. 24 is a block diagram showing a fourth embodiment of an electric power generation portion applied to the power supply system according to the present invention.

FIG. 24 is a block diagram showing the fourth embodiment of the electric power generation portion applied to the power supply system according to the present invention. Here, like reference numerals denote structures equivalent to those in the first or second embodiment mentioned above, thereby simplifying or omitting their explanation.

In the second and third embodiments (see FIGS. 17 and 21A) mentioned above, description has been given as to the case where there is applied the structure including the charge storing means (capacitors C41 and C42 or C51 and C52) capable of charging with the electric power (external supply electric power) supplied from the outside of the electric power generation portion as the start-up power supply portion constituting the start-up control portion. As shown in FIG. 24, the electric power generation portion 10D according to this embodiment is, however, configured to supply a part of the electric power held in the electric power holding portion 12 to the output control portion 16 through the start-up control portion 15 as the stat-up electric power.

Figure 25:
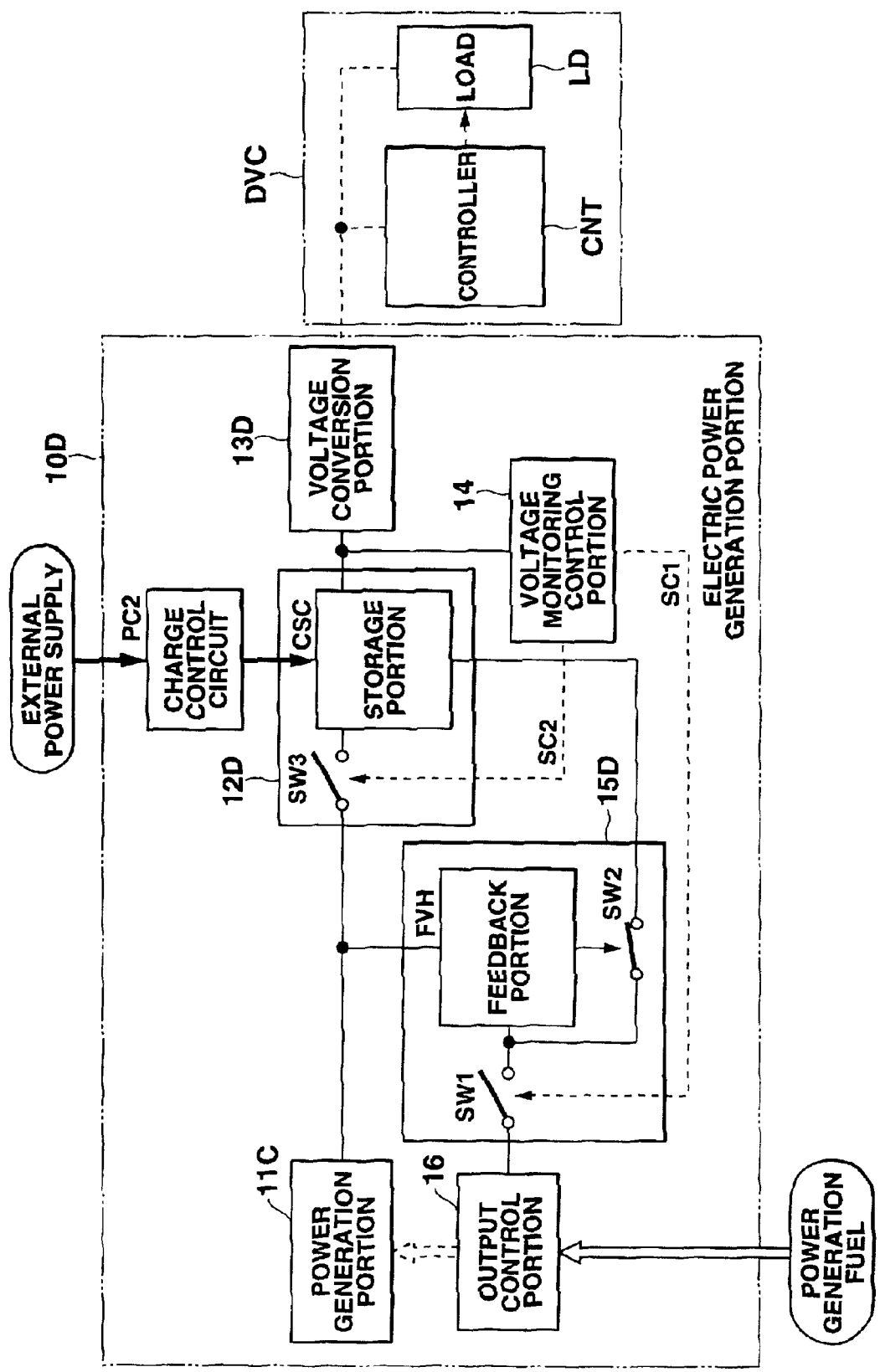
FIG. 25 is an operation conceptual view showing an initial operation of the power supply system according to a fourth embodiment of an electric power generation portion applied to the power supply system according to the present invention.

That is, specifically, as shown in FIG. 25, the electric power holding portion 12D applied to this embodiment has a circuit configuration (the switch SW3, the storage circuit CSC, the voltage detection circuit VM; it is to be noted that the voltage detection circuit VM is omitted in FIG. 25) equivalent to that of the electric power holding portion 12A shown in FIG. 8, as well as the structure in which the charge control portion PC2 having a circuit configuration equivalent to that of the charge control circuit PC1 shown in FIG. 18 is additionally provided to the storage circuit CSC. The electric power holding portion 12D is configured to supply the electric power supplied from the outside of the electric power generation portion 10D to the start-up control portion 15D as the start-up electric power.

The main operation of the power supply system having the above-described structure will now be described with reference to the drawings.

Figure 26:
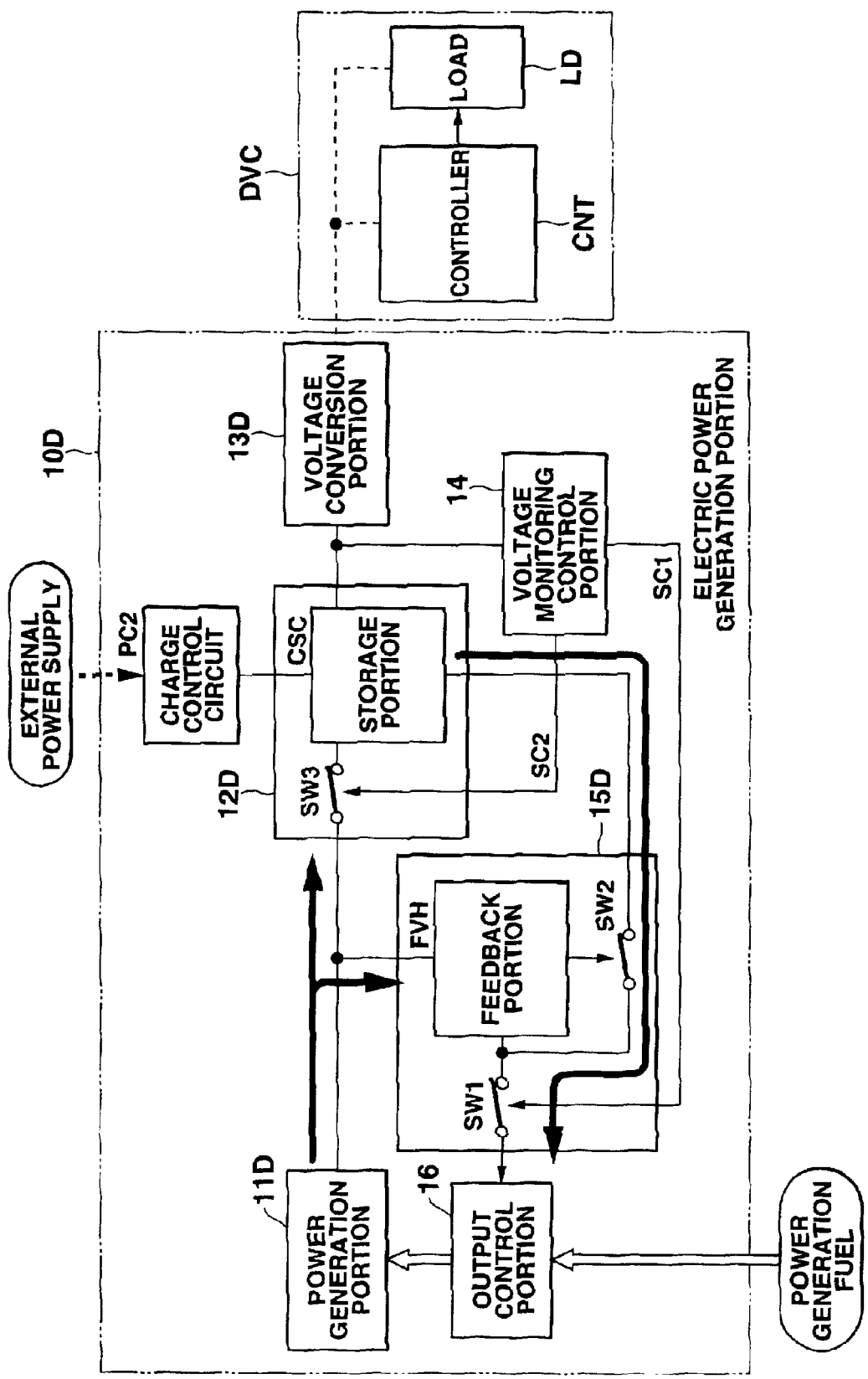
FIG. 26 is an operation conceptual view showing a start-up operation of the power supply system according to the fourth embodiment of the electric power generation portion applied to the power supply system according to the present invention.

FIG. 25 is an operation conceptual view showing an initial operation of the power supply system according to this embodiment, and FIG. 26 is an operation conceptual view showing the start-up operation of the power supply system according to this embodiment. Here, explanation of the operations equivalent to those in the first or second embodiment mentioned above will be simplified or omitted.

In regard to the initial operation of the power supply system according to this embodiment, as shown in FIG. 25, in the start-up control portion, prior to the start-up operation from the initial state of the electric power generation portion 10D, the charge control portion PC2 performs the operation for charging the storage circuit CSC (specifically, the capacitors C21 and C22 shown in FIG. 8B) constituting the electric power holding portion 12D with the electric power at least corresponding to the start-up electric power based on pre-determined electric power supplied from an external power supply provided to the outside of the power supply system. Consequently, as shown in FIG. 26, when the low-level operation control signal SC1 is outputted to the switch SW1 in order to start up the power generation portion 11D, the start-up electric power based on the charge voltage of the storage circuit CSC of the electric power holding portion 12D is supplied to the output control portion 16 through the switches SW2 and SW1. In this embodiment, therefore, as similar to the foregoing embodiments, since it is not necessary to provide the power supply means, e.g., a primary cell as the start-up power supply of the electric power generation portion, the electric power generation portion can be utilized for a long time without taking duration of life of the cell of the start-up power supply into consideration, and simplifying the circuit configuration of the electric power generation portion can reduce the apparatus scale.

In case of restarting up the power generation portion, as similar to the first embodiment mentioned above, if the charge voltage at the auxiliary capacitor C11 (see FIG. 7B) of the feedback voltage generation holding circuit FVH corresponds to or exceeds the voltage Vbat of the start-up electric power, the start-up electric power based on the charge voltage of the auxiliary capacitor C11 is supplied to the output control portion 16. If the charge voltage is less than the voltage Vbat corresponding to the start-up electric power, the start-up electric power based on the charge voltage of the capacitors C21 and C22 (see FIG. 8B) of the electric power holding portion 12D is supplied to the output control portion 16. Here, if the charge voltage of the capacitors C21 and C22 of the electric power holding portion 12D is less than the voltage Vbat corresponding to the start-up electric power, the start-up operation of the output control portion 16 and the power generation portion 11 is not carried out. In such a case, however, a user of the power supply system can normally operate the electric power generation portion by supplying predetermined electric power from the external power supply and charging the capacitors 21 and C22.

Incidentally, in the first to third embodiments mentioned above, description has been given on only the structure in which a plurality of charge storing means such as an electric double layer capacitor are fixedly connected in series as the storage circuit CSC applied to the electric power holding portions 12A to 12D. However, the present invention is not restricted thereto, and it may include the charge storing means having any other structure.

Figure 27:
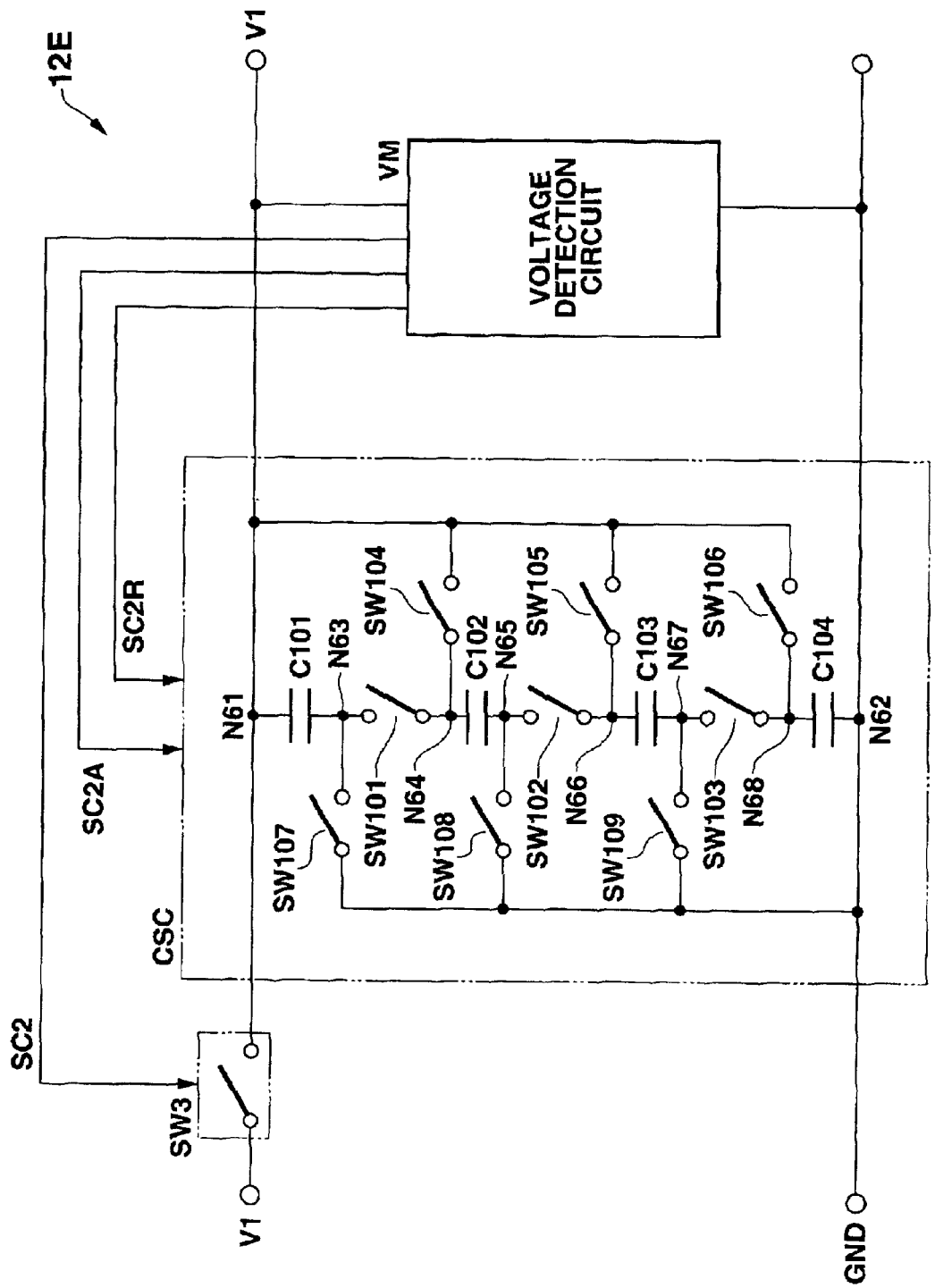
FIG. 27 is a designated circuit view showing another designated structural example of the electric power generation portion applied to the power supply system according to the present invention, being applicable to the electric power holding portion according to the first to fourth embodiments.
Figure 30A:
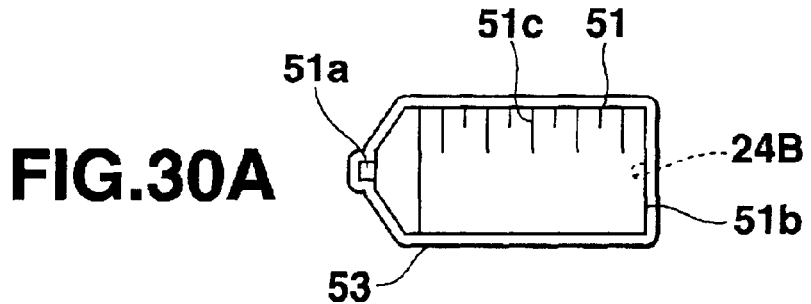
FIGS. 30A to 30H are views showing outside shapes of fuel packs and holder portions of the power supply system according to a first embodiment of a detachable structure according to the present invention, respectively.
Figure 30B:
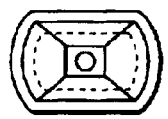
Figure 30C:
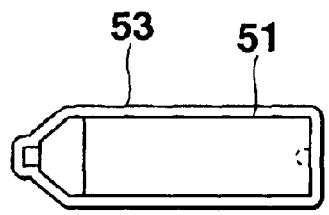
Figure 30D:
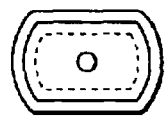
Figure 30E:
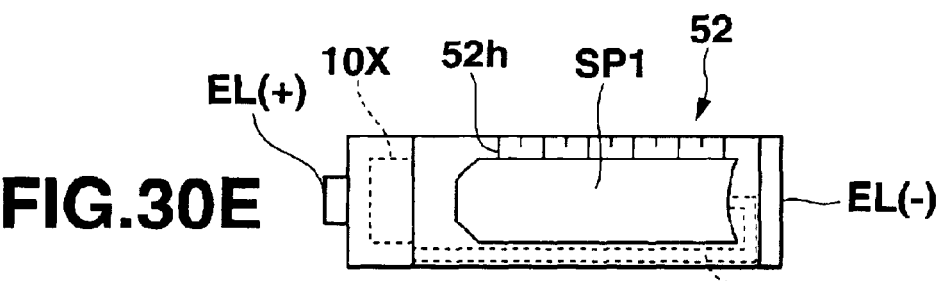
Figure 30F:
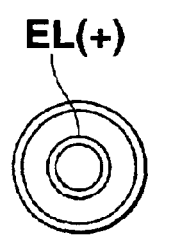
Figure 30G:
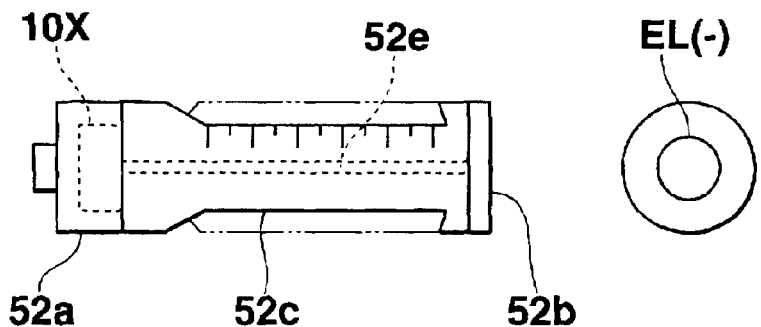
Figure 30H:
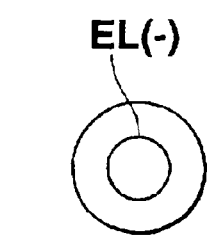

FIG. 27 is a circuit structural view showing another concrete structural example applicable to the electric power holding portions in the first to fourth embodiment of the electric power generation portion applied to the power supply system according to the present invention.

As shown in FIG. 27, in regard to a concrete circuit configuration of the electric power holding portion 12E according to this structural example, for example, as the storage circuit CSC, it is possible to apply a circuit configuration (so-called capacitor bank) including: a capacitor C101, a changeover switch SW101, a capacitor C102, a changeover switch SW102, a capacitor C103, a changeover switch SW103 and a capacitor C104 sequentially connected in series between a contact point N61 on the high-potential side and a contact point N62 on the low-potential side through contact points N63 to N68; change over switches SW104 to 106 respectively connected between the contact point N61 and the contact point N64, between the contact point N61 and the contact point N66 and between the contact point N61 and the contact point N68; and changeover switches SW107 to 109 respectively connected between the contact point N62 and the contact point N63, between the contact point N62 and the contact point N65 and between the contact point N62 and the contact point N67.

Here, the changeover switches SW101 to SW103 and SW104 to SW109 are controlled to be changed over in such a manner that they are simultaneously set to the ON/OFF state with reverse timings based on a non-inversion signal SC2A and an inversion signal SC2R of the operation control signal SC2 outputted from the voltage detection circuit VM (or the non-illustrated voltage monitor/control portion 14) having the circuit configuration (see FIG. 8) equivalent to that of the first embodiment mentioned above.

In the electric power holding portion 12E having such a structure, the changeover switches SW101 to SW103 are controlled to be switched to the ON state and the changeover switches SW104 to SW109 are controlled to be switched to the OFF state based on the non-inversion signal SC2A and the inversion signal SC2R of the operation control signal SC2 outputted from the voltage detection circuit VM. Also, the capacitors C101 to C104 are set to be connected in series between the contact points N61 and N62, and the switch SW3 is set to the ON state. As a result, the charge operation for charging the capacitors C101 to C104 connected in series with the electric charge based on the electric power (voltage V1) generated by the power generation portion 11 is carried out.

On the other hand, the changeover switches SW101 to SW103 are controlled to be switched to the OFF state, and the changeover switches SW104 to SW109 are controlled to be switched to the ON state. Also, the capacitors C101 to C104 are set to be connected in parallel between the input contact point N21 and the contact point N22, and the switch SW3 is set to the OFF state. Consequently, the discharge operation for outputting (discharging) the electric power according to the electric charge charged in the capacitors C101 to C104 is carried out.

As described above, the capacitance value of each capacitor constituting the storage circuit CSC can be reduced to $1/m^2$ ($1/16$ in this structural example) by carrying out the charge operation by switching m (m–4 in this structural example) capacitors to the serial connection state as compared with the case where the storage circuit CSC is constituted by a single capacitor. Therefore, when the electric current component (charge electric current) of the electric power outputted from the power generation portion 11 is reduced to $1/m$ ($=1/4$) in accordance with a number of capacitors to be connected or the charge electric current is set constant, the charge time can be reduced to $1/m$ ($=1/4$). On the other hand, by performing the discharge operation by switching the capacitors C101 to C104 to the parallel connection state and outputting the electric power as the supply electric power to the device through the above-described voltage conversion portion, the capacitance values of the capacitors constituting the storage circuit CSC can be increased to a sum total of the capacitance values of the respectively connected capacitors C101 to C104, thereby improving the load drive capability.

<Outside Shape>

Outside shapes applicable to the power supply system according to the present invention will now be described with reference to the drawings.

FIGS. 28A to 28F are views showing concrete examples of the outside shape applicable to the power supply system according to the present invention, and FIGS. 29A to 29C are views showing the outside shapes applied to the power supply system according to the present invention and the correspondence relationship between such shapes and the outside shapes of the general-purpose chemical cell.

In the power supply system having the above-described structure, as shown in FIGS. 28A to 28F respectively for example, the outside shape with the power generation portion 10 being formed as module (which will be referred to "the power generation module" hereafter) and with the fuel pack 20 being coupled with the power generation module 10 through the I/F portion 30 or these members being integrally configured is formed so as to have the outside shape and dimensions equivalent to any of circular cells 41, 42 and 43 which are in heavy usage as general-purpose chemical cells conforming to JIS or international standards or cells having a special shape (non-circular cells) 44, 45 and 46 in conformity with standards of these cells. Also, the outside shape is configured in such a manner electric power generated by the power generation module 10 can be outputted through the positive (+) and negative (−) electrode terminals of each of the cell shapes illustrated in FIGS. 28A to 28F.

Incidentally, each structure of the power generation module 10 mounted on the power supply system according to the present invention can be realized as a microchip of the millimeter order or micron order or formed as a microplant by applying the existing micromachine manufacturing technique. Further, applying a fuel cell or the like capable of realizing the high energy utilization efficiency as the power generation portion 11 of the power generation module 10 can suppress an amount of the power generation fuel required for realizing a battery capacity equivalent to (or above) that of the existing chemical cell to a relatively small value. Also, the power supply system being compatible with the existing dry battery in outer shapes and size, and electric property may be realized excellently.

Here, specifically, for example, in the state that the positive electrode terminal is arranged on the top of the power generation module 10 while the negative electrode terminal is arranged on the fuel pack 20 side and the fuel pack 20 is coupled with the power generation module 10, there is applied the structure in which the fuel electrode 111 of the fuel cell main body 110 (see FIG. 4) is electrically connected to the negative electrode terminal and the air electrode 112 is electrically connected to the positive electrode terminal, respectively, through wirings or the like for example. Incidentally, in the power generation portion to which power generating means other than the above-described fuel cell is applied, the structure in which the output terminals of the respective power generators are electrically connected to the positive electrode terminal and the negative electrode terminal.

Here, specifically, the circular cells 41, 42 and 43 are mostly in heavy usage as a manganese dry battery, an alkaline battery, a nickel-cadmium battery, a lithium battery or the like which are commercially available, and have an outside shape of, for example, a cylindrical type supported by many devices (cylindrical type: FIG. 28A), a button type utilized in a wrist watch and others (FIG. 28B), and a coin-shaped type utilized in a camera, an electronic databook or the like (FIG. 28C).

On the other hand, the non-circular cells 44, 45 and 46 specifically have the outside shape of a special form type which is individually designed (customized) in accordance with a shape or the like of a device to be used, e.g., a compact camera, a digital still camera or the like (FIG. 28D), an angular type which supports reduction in size and weight of a portable acoustic device or the like (FIG. 28E), a flat type having an electrode structure which supports reduction in thickness, increase in capacity or a charge control function of a notebook-size personal computer, a mobile phone or the like (FIG. 28F) and others.

In the power supply system according to this embodiment, the existing cell shape shown in FIGS. 28A to 28F can be excellently realized. For example, as illustrated in FIGS. 29A and 29B, it is possible to provide the structure that the outside dimension (for example, a length La and a diameter Da) when the fuel pack 20 is coupled with the power generation module 10 or when they are integrally constituted becomes substantially equivalent to the outside shape (for example, a length Lp and a diameter Dp) of such a general-purpose chemical cell 47 as shown in FIG. 29C.

Incidentally, FIGS. 29A to 29C only conceptually show the relationship between the attachable and detachable structure of the power supply system according to the present invention (coupling relationship) and the appearance shape, and a concrete electrode structure and others are not taken into consideration. The relationship between the attachable and detachable structure of the power generation module 10 and the fuel pack 20 and the electrode structure when each cell shape is applied to the power supply system according to the present invention will be described in detail in connection with the later-described embodiment.

Furthermore, any one of outside shapes illustrated in FIGS. 28A to 28F and FIGS. 29A to 29C is only an example of the chemical cell which is commercially available in conformity with standards in Japan, or attached to a device and distributed or is on the sale. Only part of structural examples to which the present invention can be applied is shown. That is, outside shapes applicable to the power supply system according to the present invention other than the above concrete examples may be adopted. For example, such outside shapes match with shapes of chemical cells which are distributed or on the sale around the world or chemical cells which will be put into practical use in future, and it is needless to say that those outside shapes can be designed so as to match with the electrical characteristic.

Detailed description will now be given as to the relationship between the attachable and detachable structure of the power generation module 10 and the fuel pack 20 and the electrode structure when each of the above cell shapes is applied to the power supply system according to the present invention with reference to the drawings.

(First Embodiment of Attachable and Detachable Structure)

Figure 31A:
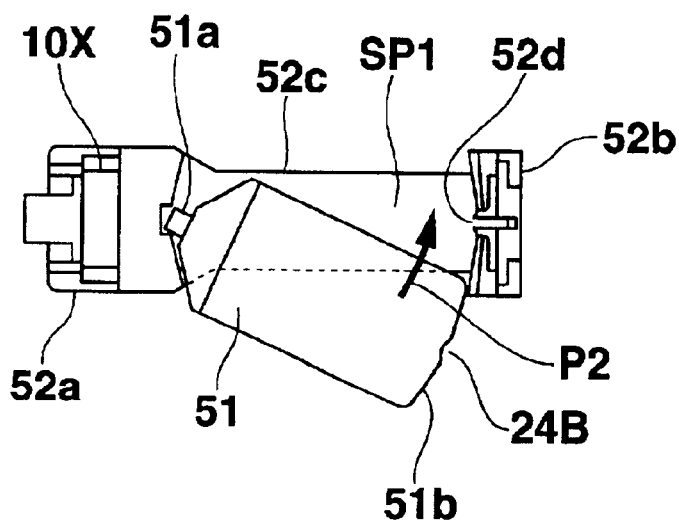
FIGS. 31A to 31C are views for schematically showing a detachable structure of a power generation module and a fuel pack of the power supply system according to the first embodiment of the detachable structure according to the present invention respectively.
Figure 31B:
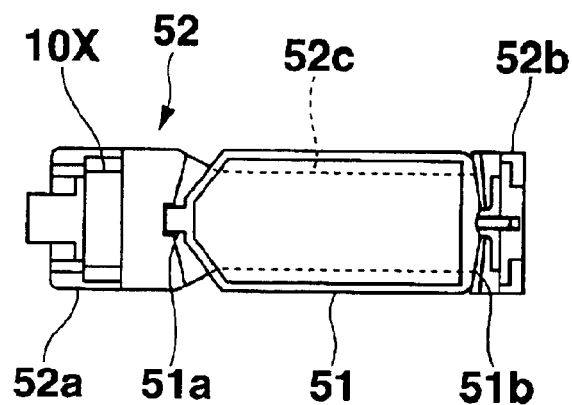
Figure 31C:
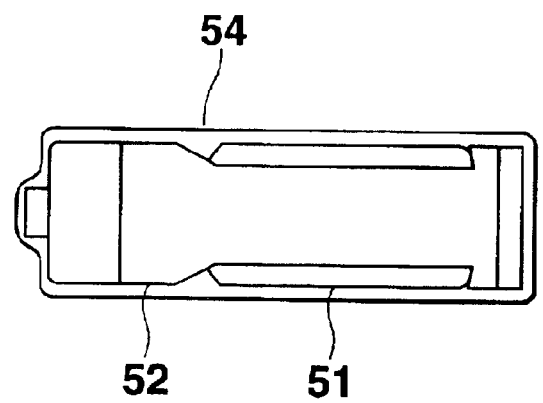

FIGS. 30A to 30D are views schematically showing the outside shapes of the fuel pack of the power supply system according to a first embodiment of a attachable and detachable structure of the present invention when seen from an upper direction, a front direction, a transverse direction and a rear direction. FIGS. 31A to 31C are views showing the attachable and detachable structure of the power generation module and the fuel pack in the power supply system according to this embodiment. As shown in FIGS. 30A to 30D and FIGS. 30E to 30H, the power supply system according to this embodiment is configured to include: a fuel pack 51 (corresponding to the fuel pack 20) in which the power generation fuel is charged under predetermined conditions; and a holder portion 52 functioning as the power generation module 10 and the I/F portion 30, to which the fuel pack is detachably disposed. Here, when the fuel pack 51 is a transparent degradable polymeric case in which the fuel FL is charged and it is unused, the periphery of the case is covered with a package 53 for protecting from a degradation factor such as bacteria. Moreover, when attaching the fuel pack 51, as will be described later, exfoliating the package 53 from the fuel pack 51 can suffice. In addition, since the fuel pack 51 is a transparent case and an index 51c is carved thereon, it is possible to confirm a residual quantity of the see-through fuel.

The holder portion 52 is configured to generally include: a power generation portion 52a in which the power generation module 10X and the I/F portion 30 having the structure equivalent to that of each of the foregoing embodiment are accommodated and a positive electrode terminal EL (+) is provided; an opposed portion 52b to which a negative electrode portion EL (−) is provided; and a connection portion 52c which electrically connects the power generation portion 52a with the opposed portion 52b and electrically connects the power generation portion 52a with the negative electrode terminal EL (−) A piercing space SP1 surrounded by the power generation portion 52a, the opposed portion 52b and the connection portion 52c becomes an accommodation position when the fuel pack 51 is coupled. The holder portion 52 includes: a convex portion 52d which has the elasticity of a spring or the like around the contact portion of the opposed portion 52b and has a hole at the center (see FIG. 66A); and a by-product collection path 52e for connecting the hole of the convex portion 52d with the by-product supply path 17a of the power generation module 10. Since an index 52h is carved on the holder portion 52 in place of the index Sic of the fuel pack 51, it is possible to confirm a residual quantity of the see-through fuel. At this moment, the index 52h can be easily visually confirmed when the connection portion 52c is not transparent.

In the power supply system having such a structure, as shown in FIG. 31A, the fuel feed port (one end side) 51a to which the fuel supply valve 24A (reference to FIG. 34 described hereafter) of the fuel pack 51 is provided is brought into contact with the holder portion 52 and this contact point is determined as a supporting point, and the other end side 51b of the fuel pack 51 is swiveled, whereby the fuel pack 51 from which the package 53 has been removed is thrusted (an arrow P2 in the drawing) with respect to the space SP1 constituted by the power generation portion 52a, the opposed portion 52b and the connection portion 52c,. As a result, as shown in FIG. 31B, a bottom portion (the other end side) 51b of the fuel pack 51 is brought into contact with the opposed portion 52b and the fuel pack 51 is accommodated in the space SP1. At this moment, a fuel feed pipe 52f (reference to FIG. 34 described hereafter) which can be the fuel feed path pushes down the fuel supply valve 24A whose posture is fixed by the spring, and the leak prevention function of the fuel pack 51 is thereby released. Also, the power generation fuel FL charged in the fuel pack 51 is automatically carried and supplied to the power generation module 10X by the surface tension in a capillary tube 52g and the fuel feed pipe 52f.

Incidentally, as shown in FIG. 31C, the entire periphery of the case may be covered with and sealed by a package 54 which protects the periphery of the unused power supply system having the fuel pack 51 coupled with the holder portion 52 from degradation factors such as bacteria, and the power supply system may be distributed to the market in this state. In such a case, when utilizing as a power supply for a device or the like, the package 54 is exfoliated and the power supply is then attached. Further, in the structure applying, as the power generation portion applied to the power generation module, power generating means for generating power by the reaction of the power generation fuel of the fuel pack 51 with a component (oxygen or the like) constituting the atmospheric air as with the fuel cell or the like, waste of the power generation fuel involved by unnecessary power generation when the power supply system is not used or an erroneous operation occurs can be prevented by covering an air hole 110a (see FIG. 34 which will be described later) used for sucking oxygen with the package. Also, the operation state of the power generation module can be controlled so as to shift to the state capable of performing the power generation operation only after peeling off the package 54 when attaching the power supply system to the device.

Here, when the fuel pack 51 is accommodated in the space SP1 and coupled with the holder portion 52, the power supply system is configured to have the outside shape and dimensions substantially equivalent to those of the above-described cylindrical general-purpose chemical cell (see FIGS. 28A and 29C). In addition, at this moment, with the fuel pack 51 being normally accommodated in the space SP1, it is preferable that the other end side 51b of the fuel pack 51 is pressed with appropriate force so that the fuel feed port 51a of the fuel pack 51 can be excellently brought into contact with and connected with the fuel feed path on the power generation portion 52a side, and that the other end side 51b of the fuel pack 51 is engaged with the contact portion of the opposed portion 52b by using appropriate pressing force in order to prevent the fuel pack 51 from accidentally coming off the holder portion 52.

Specifically, as shown in FIGS. 31A and 31B, an engagement mechanism can be applied between a concave portion at which a by-product fetching valve 24B formed on the other end side 51b of the fuel pack 51 is arranged in order to collect water or the like as a by-product and a convex portion 52d having the elasticity of a spring or the like around the contact part of the opposed portion 52b. At this moment, the by-product fetching valve 24B is changed from the closed state to the opened state when pushed up by the convex portion 52d, and it is connected with the by-product collection path 52e. The by-product can be, therefore, collected and held in a predetermined collection space the by-product provided in the fuel pack 51 through the by-product collection path 52e.

As a result, the power generation fuel charged in the fuel pack can be supplied to the power generation portion 11 of the power generation module 10, and the start-up electric power is supplied from the start-up control portion 15 to the output control portion 16 in accordance with a change in the charge voltage of the electric power holding portion 12 as described in connection with the overall operation (see FIG. 11). Then, predetermined electric power is generated in the power generation portion 11 and charged to the electric power holding portion 12, and it is supplied to the start-up control portion 15 as electric power used for generating the feedback voltage.

In addition, when the power supply system according to this embodiment is attached to a predetermined device DVC, electric power generated by the power generation portion 11 and held in the power holding portion 12 is output as electric power (supply electric power) for driving the controller CNT included in the device DVC through the positive electrode terminal EL (+) provided to the holder main portion 52a and the negative electrode terminal EL (−) provided to the opposed portion 52b (initial operation).

Therefore, the power supply system according to the present invention can realize the completely compatible power supply system which can be easily handled as with the known general-purpose chemical cell, has the outside shape and dimensions (cylindrical shape in this example) equal or similar to those of the general-purpose chemical cell, and can supply electric power having the same or similar electrical characteristic. Accordingly, electric power can be applied as the operating electric power to a device such as an existing portable device as similar to the general-purpose chemical cell.

In particular, in the power supply system according to this embodiment, when the structure provided with the fuel cell is applied as the power generation module and a material such as the above-described degradable plastic is applied as the fuel pack 51 which is configured to be attached to or detached from the power generation portion 52a (power generation module 10X) without restraint, the high energy utilization efficiency can be realized while suppressing the affect (burden) on the environment. It is, therefore, possible to excellently solve problems such as environmental concerns caused due to dumping of the existing chemical cell or landfill disposal or the energy utilization efficiency.

Additionally, according to the power supply system according to this embodiment, since the space SP1 on the holder portion 52 side in which the fuel pack 51 is accommodated has a piercing shape, the fuel pack 51 can be readily attached to the holder portion 52 while gripping the opposed side portions of the fuel pack 51, and the fuel pack 51 is thrusted out from one of the two opening portions by pushing the fuel pack 51 from the other one of the two opening portions, thereby easily and securely removing the fuel pack 51.

(Second Embodiment of Attachable and Detachable Structure)

FIGS. 32A to 32C are views schematically showing an outside shape of the fuel pack of the power supply system according to the second embodiment of the attachable and detachable structure of the present invention as seen from the front direction, the transverse direction and the rear direction.

FIGS. 32D to 32F are views schematically showing an outside shape of the holder portion of the power supply system according to the second embodiment of the attachable and detachable structure of the present invention as seen from the front direction, the upper direction, the rear direction and the lateral direction, and FIGS. 33A to 33C are views showing the attachable and detachable structure of the power generation module and the fuel pack in the power supply system according to this embodiment.

As shown in FIGS. 32A to 32F, the power supply system according to this embodiment is configured to include: a transparent fuel pack 71 in which power generation fuel is charged under predetermined conditions; and a holder portion 62 configured so that the several fuel packs 71 can be accommodated. Here, since the fuel pack 71 has the structure and function equivalent to the first embodiment, thereby omitting its explanation.

The holder portion 72 functioning as the power generation module 10 and the I/F portion 30 is configured to generally include: a power generation portion 72a in which the power generation module 10X is accommodated and to which a positive electrode terminal EL (+) and a negative electrode terminal EL (−) on the same end surface is provided; a top cover 72b provided so as to have a space SP2 between itself and the power generation portion 72a; and an opening/closing cover 72c which enables the fuel pack 71 to be accommodated in or removed from the space SP2, and presses and fixes the fuel pack 71 accommodated in the space SP2.

In the power supply system having such a structure, as shown in FIG. 33A, with an opening/closing cover 72c of the holder portion 72 being opened and one surface side of a space SP2 being opened, a plurality of (two in this example) of the fuel packs 71 are inserted in the same direction, and the opening/closing cover 72c is then closed as shown in FIG. 33B and 33C. As a result, the fuel packs 71 are accommodated in the space SP2, and the opening/closing cover 72c pushes the other end side 71b of the fuel packs 71, thereby bringing a fuel feed port 71a of the fuel pack 71 into contact with a fuel feed path (not shown) on the power generation portion 72a side. Consequently, the leak prevention function of the fuel pack 71 is released, and the power generation fuel FL charged in the fuel pack 71 is supplied to the power generation module 10X included in the power generation portion 72a through the fuel feed path.

Here, the power supply system is configured to have the outside shape and dimensions substantially equivalent to those of, e.g., the above-described chemical cell having a special shape (reference to FIGS. 28D to 28G) when the fuel packs 71 are accommodated in the space SP2 and coupled with the holder portion 72. As a result, as similar to the embodiment, it is possible to realize a completely compatible portable type power supply system which has the outside shape and the electrical characteristic equal or equivalent to those of the existing chemical cell. Also, by appropriately selecting a structure of the power generation device applied to the power generation module or a material forming the attachable and detachable fuel pack, the influence on the environment can be considerably suppressed, and it is possible to excellently solve problems such as environmental concerns caused by dumping or landfill disposal of the existing chemical cell or the energy utilization efficiency.

(Concrete Structural Example)

Description will now be given as to a concrete structural example of the entire power supply system to which any of the foregoing embodiments (including each structural example) is applied with reference to the drawings.

Figure 34:
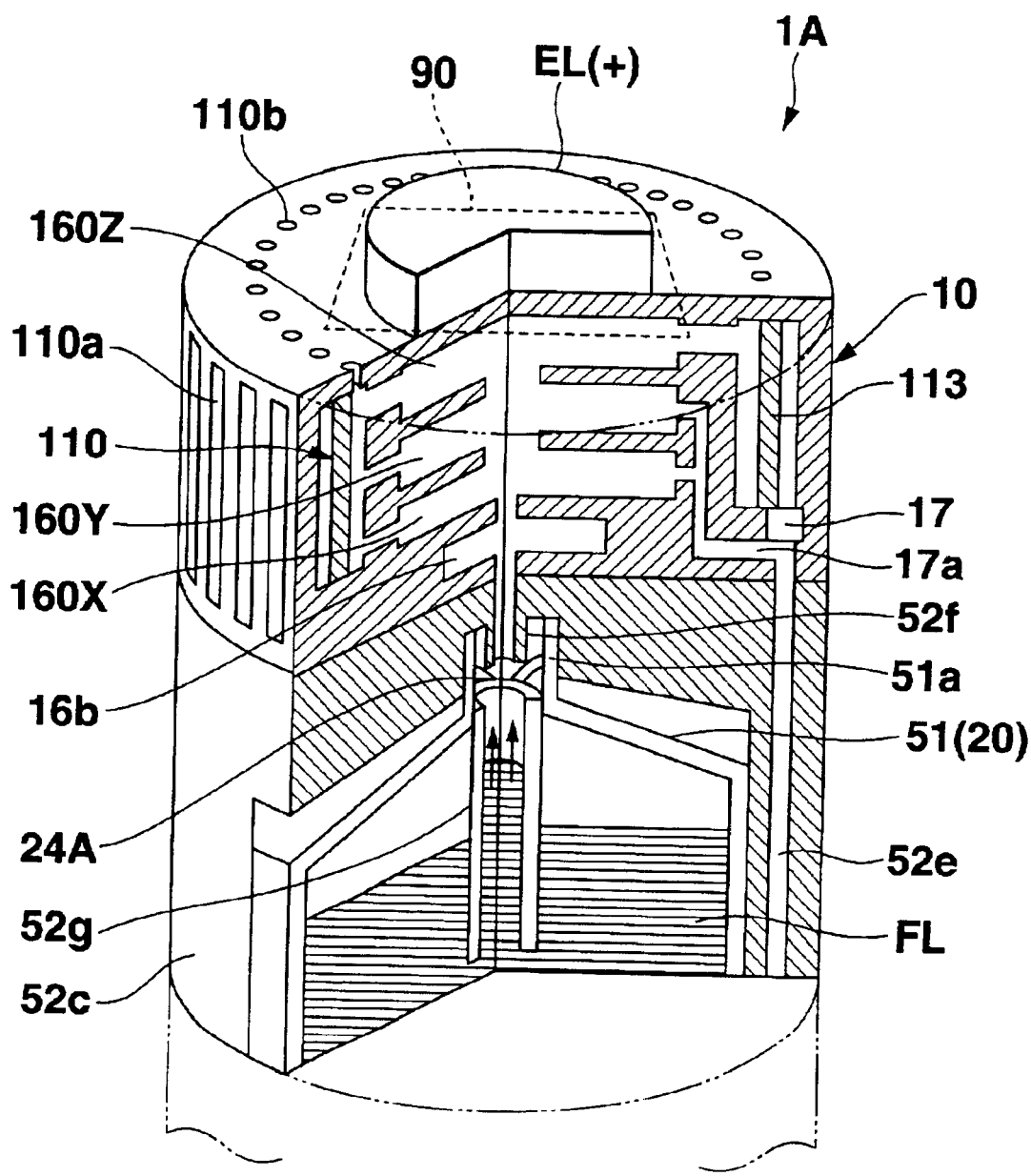
FIG. 34 is a schematic divisional view showing a designated structural example of the whole power supply system according to the present invention.
Figure 35A:
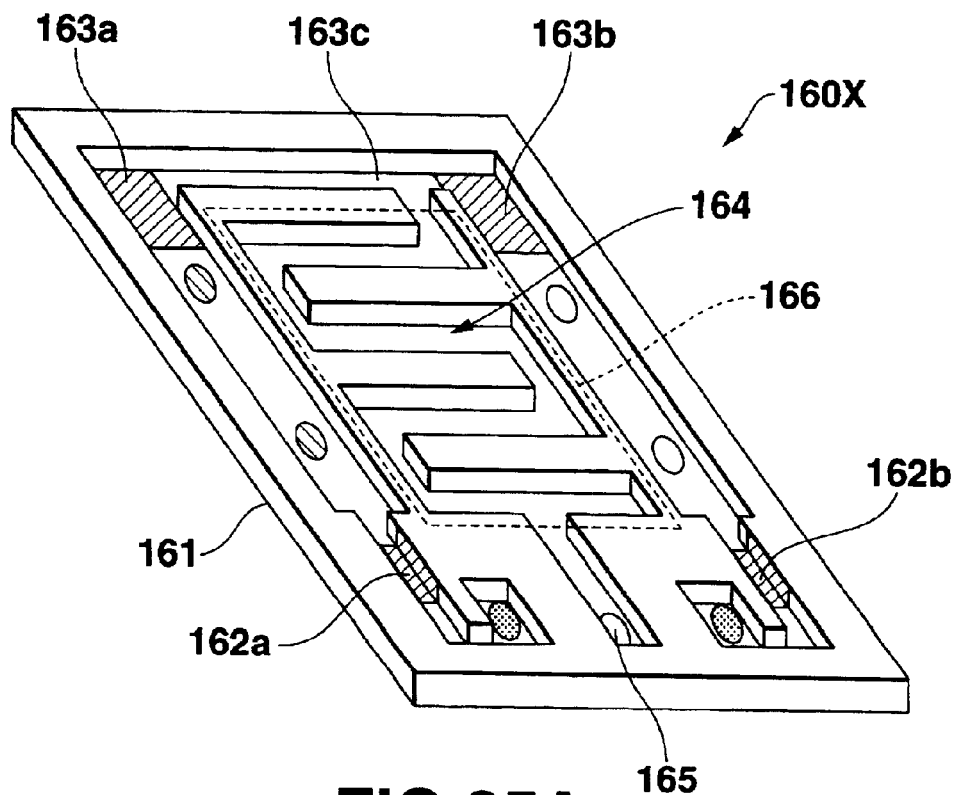
FIGS. 35A and 35B are schematic views showing a structural example of a fuel reforming portion applicable to a designated structural example respectively.
Figure 35B:
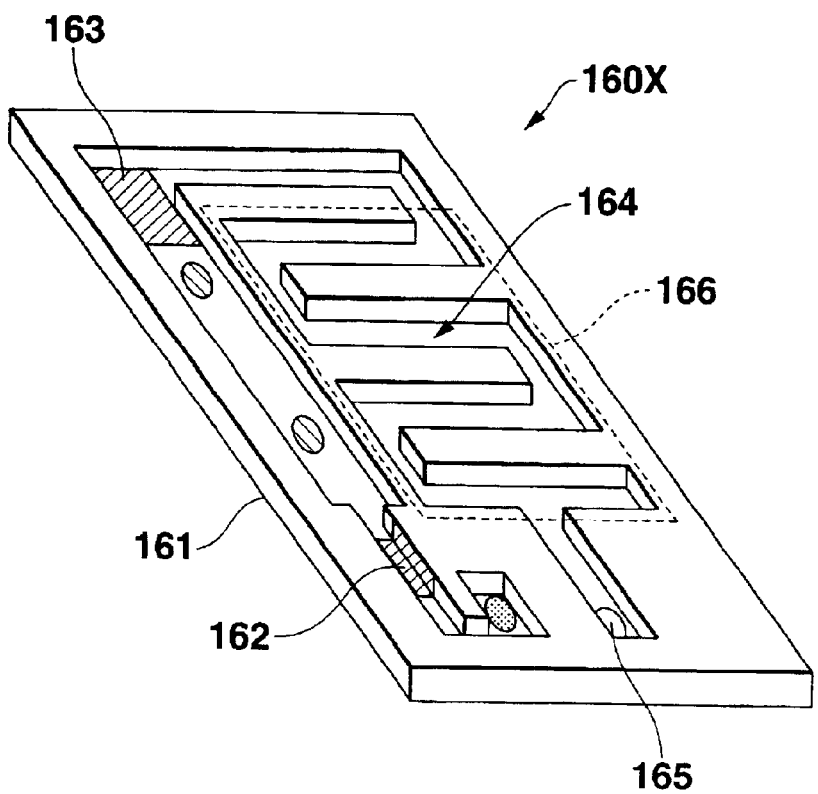

FIG. 34 is a view showing a concrete structural example of the entire power supply system according to the present invention. Further, FIG. 35A and 35B are views showing a structural example of a fuel reforming portion applied to this concrete structural example. Here, it is determined that a fuel reforming type fuel cell is applied as the power generation portion 11 provided to the power generation module. Furthermore, reference is appropriately made to each of the foregoing embodiments and each of the structural examples, and like reference numerals denote equivalent structures, thereby simplifying their explanation.

As shown in FIG. 34, the power supply system 1A according to this concrete structural example has the power generation module 10 and the fuel pack 20 being configured to be attachable thereto and detachable therefrom through the I/F portion 30 as shown in FIG. 2, and has a cylindrical outside shape as a whole as shown in FIG. 28A or FIG. 29C. Moreover, these structures (power generation module 10 in particular) are constituted in a small space by using the micromachine manufacturing technique or the like, and this power supply system is configured to have the outside dimension equivalent to that of the general-purpose chemical cell. The power generation module is configured to generally include: a fuel cell main body (fuel cell portion) 110 which extends along the circumferential side surface of the cylinder shape; a vapor reforming reaction portion 160X to which a heater for setting a fuel flow path having a depth and a width respectively being not more than 500 $\mu$m and a space in the flow path to a predetermined temperature is formed; an aqueous shift reaction portion 160Y to which a heater for setting a fuel flow path having a depth and a width respectively being not more than 500 $\mu$m and a space in the flow path to a predetermined temperature is formed; a selected oxidation reaction portion 160Z to which a heater for setting a flow path having a depth and a width respectively being not more than 500 $\mu$m and a space in the flow path to a predetermined temperature is formed; a control chip 90 which is realized as a microchip and accommodated in the power generation module 10 and mounts thereon an electric power holding portion 12, a voltage conversion portion 13, a voltage monitor/control portion 14, a start-up control portion 15 and the like; a plurality of air holes (slits) 110a which are pierced from the cylindrical side surface of the power generation module 10 to the air electrode 112 of the fuel cell main body 110 and take in outside air; a separation collection portion 17 which liquefies (condenses) a by-product (water or the like) generated on the air electrode 112 side, separates and collects it; a by-product supply path 17a which supplies a part of the collected byproduct to the vapor reforming reaction portion 160X and the aqueous shift reaction portion 160Y; and a discharge hole 110b which is pierced from the top face of the cylinder to the air electrode 112 of the fuel cell main body 110 and discharges to the outside of the power generation module a by-product (carbon dioxide or the like) as a non-collected substance which is generated at least on the fuel electrode 111 side of the fuel cell main body 110 or the vapor reforming reaction portion 160X and the selected oxidation reaction portion 160Z. The members other than the fuel cell main body 110 are provided inside the columnar power generation module 10.

As similar to the structure shown in FIG. 48, the fuel pack 20 (51, 71) is configured to generally include at least: a space in which the power generation fuel FL to be supplied to the power generation portion 11 is filled and charged; a space for fixedly holding a by-product (water); a fuel supply valve 24A (fuel leak preventing means) which is on the connection with the power generation module 10 and prevents the power generation fuel FL from leaking. Here, the fuel pack 20 is formed of degradable plastic such as mentioned above.

When the fuel pack 20 having such a structure is coupled with the power generation module 10 through the I/F portion 30, the fuel feed pipe 52f provided to a side of the power generation module 10 pushes down the fuel supply valve 24A whose posture is fixed by a spring, and the leak prevention function of the fuel pack 51 is released. Also, the power generation fuel FL charged in the fuel pack 51 is automatically carried to the power generation module 10 (the fuel control portion 16b) by the surface tension through the fuel feed pipe 52f or in a capillary tube 52g. In addition, when the fuel pack 20 is removed from the power generation module 10 and the I/F portion 30, the fuel supply valve 24A is again closed by the resilience of the spring so that the power generation fuel FL can be prevented from leaking.

The I/F portion 30 is configured to include: a fuel feed path (the fuel feed pipe 52f) for supplying the power generation fuel FL charged in the fuel pack 20 to the power generation portion 11; and a by-product collection path 52e for supplying to the fuel pack 20 all or a part of a by-product (water) which is generated in the power generation portion 11 and collected.

Incidentally, although not shown, the fuel pack 20 or the I/F portion 30 may have the structure in which residual quantity detection means for detecting a residual quantity of the power generation fuel FL charged in the fuel pack 20 or fuel stabilizing means for stabilizing the charging state of the power generation fuel is provided, as shown in FIGS. 49 and 60.

Here, the vapor reforming reaction portion 160X and the aqueous shift reaction portion 160Y utilize as water required for reaction either water which is generated in the fuel cell main body 110 and supplied through the by-product supply path 17a or water charged in the fuel pack 51 together with the power generation fuel FL. Also, a small amount of carbon dioxide generated by each reaction in the vapor reforming reaction portion 160X and the aqueous shift reaction portion 160Y and the selected oxidation reaction portion 160Z is discharged to outside of the power generation module 10 through the discharge hole 10b.

The vapor reforming reaction portion 160X applied to the power supply system according to this concrete structural example is, for example as shown in FIG. 35A, configured to include: a fuel discharge portion 162a; a water discharge portion 162b; a mixing portion 163c; a reforming reaction flow path 164; a hydrogen gas exhaust portion 165; each of these members being provided so as to have a predetermined groove shape and a predetermined flat surface pattern on one surface side of a small substrate 161 of, e.g., silicon by using the micro-fabrication technique such as a semiconductor manufacturing technique. The vapor forming reaction portion 160X also includes a thin-film heater 166 which is an area corresponding to an area in which the reforming reaction flow path 164 is formed, and provided on, e.g., the other surface side of the small substrate 161.

The fuel discharge portion 162a and the water discharge portion 162b have a fluid discharge mechanism for discharging the power generation fuel which can be a raw material in the vapor reforming reaction and water into the flow path as liquid particles in accordance with a predetermined unit quantity, for example. Therefore, since the stages of progress of the vapor reforming reaction indicated by, for example, the chemical equation (3) are controlled based on a discharge quantity of the power generation fuel or water in the fuel discharge portion 162a and the water discharge portion 162b (specifically, a heat quantity from the later-described thin-film heater 206 also closely relates thereto), the fuel discharge portion 162a and the water discharge portion 162b have a structure serving as a part of the adjustment function for the fuel supply quantity in the above-described output control portion 16 (fuel control portion 16b).

The fuel vaporization portion 163a and the water vaporization portion 163b are heaters heated under vaporization conditions such as a boiling point of each of the power generation fuel and water, execute the vaporization process and vaporize the power generation fuel or water discharged from the fuel discharge portion 162a and the water discharge portion 162b as liquid particles by subjecting the power generation fuel or water to heating processing or pressure reduction processing, thereby generating mixed gas obtained from the fuel gas and the vapor in the mixing portion 163.

The thin-film heater 166 leads the mixed gas generated in the mixing portion 163c into the reforming reaction flow path 164, and cause the vapor reforming reaction shown in the chemical equation (3) based on a copper-tin (Cu-Zn) basis catalyst (not shown) formed to adhere on the inner wall surface of the reforming reaction flow path 164 and predetermined thermal energy supplied to the reforming reaction flow path 164 from the thin-film heater 166 provided in accordance with an area in which the reforming reaction flow path 164 is formed to the reforming reaction flow path 164, thereby generating hydrogen gas ($H_2O$) (vapor reforming reaction process).

The hydrogen gas exhaust portion 165 emits hydrogen gas which is generated in the reforming reaction flow path 164 and contains carbon monoxide and the like, eliminates carbon monoxide (CO) through the aqueous shift reaction process and the selected oxidation reaction process in the selected oxidation reaction portion 160Z and the aqueous shift reaction portion 160Y, and thereafter supplies the obtained gas to the fuel electrode 111 of the fuel cell body 110 constituting the power generation portion 11. As a result, a series of the electrochemical reactions based on the chemical equations (6) and (7) are produced in the power generation portion 11, thereby generating predetermined electric power.

In the power supply system having such a structure, for example, when the fuel pack 20 is coupled with the power generation module 10 through the I/F portion 30 in accordance with the above-described overall operation (the initial operation, the start-up operation, the steady operation, and the stop operation), the leak prevention function by the fuel supply valve 24A (fuel leak preventing means) is released, and the power generation fuel (for example, methanol) FL charged in the fuel pack 20 is supplied to the fuel control portion 16b constituting the output control portion 16 through the fuel feed pipe 52f, thereby transitioning the initial state capable of supplying the fuel to the power generation portion 11.

Furthermore, for example, when a user of the power supply system operates to start up the voltage monitor/control portion 14, the operation control signals SC1 and SC2 are outputted to the start-up control portion 15 and the electric power holding portion 12, and the start-up electric power is supplied from the start-up control portion 15 to the output control portion 16. This start-up electric power is used for control over supply of the power generation fuel FL in the fuel control portion 16b constituting the output control portion 16 and heating a thin film heater 166 provided to the fuel reforming portion 16a (vapor reforming reaction portion 160X in particular) in order to discharge predetermined amounts of the power generation fuel FL and water to a reforming reaction flow path 164 of the vapor reforming reaction portion 160X.

As a result, hydrogen gas ($H_2$) and carbon dioxide ($CO_2$) are generated by the vapor reforming reaction, the aqueous shift reaction and the selected oxidation reaction indicated by the above-described chemical equations (1) to (3). Hydrogen gas ($H_2$) is supplied to the fuel electrode 111 of the fuel cell main body 110 constituting the power generation portion 11, and predetermined electric power is thereby generated. This electric power is supplied as charge electric power to the electric power holding portion 12 and electric power for generating the feedback voltage in the start-up control portion 15. At this moment, carbon dioxide ($CO_2$) generated with the vapor reforming reaction, the aqueous shift reaction and the selected oxidation reaction in the output control portion 16 (fuel reforming portion 16a) is emitted to the outside of the power generation module 10 (power supply system) through the discharge hole 110 provided on the top face of the power generation module 10, for example.

A by-product (gas such as vapor) generated during the power generation operation in the power generation portion 11 is cooled and liquefied in the separation collection portion 17. Consequently, the by-product is separated into water and any other gas components, and only water is collected and partially supplied to the fuel reforming portion 16a (especially, the vapor reforming reaction portion 160X and the aqueous shift reaction portion 160Y) through the by-product supply path 17a. Furthermore, any other water is irreversibly held in a collection space in the fuel pack 20 through the by-product collection path 52e.

According to the power supply system relating to this concrete structural example, therefore, certain electric power without reference to the drive state of the driven load (device DVC) can be autonomously and continuously outputted without accepting resupply of the fuel from the outside of the power supply system, the power generation operation can be effected with the high energy conversion efficiency while realizing the electrical characteristic equivalent to that of the general-purpose chemical cell and easy handling. Moreover, it is possible to realize the portable type power supply system which imposes less burden on the environment at least in case of discarding the fuel pack 20 to the natural world or subjecting the same to landfill disposal.

In this concrete structural example, description has been given as to the case where a part of a by-product (water) generated or collected in the power generation portion 11 is supplied to the fuel reforming portion 16a and reused, on the other hand, water charged in the fuel pack 20 together with the power generation fuel (methanol or the like) is utilized and the vapor reforming reaction is executed in the vapor reforming portion 16a in the power supply system having a structure in which the by-product is not collected and reused.

In case of performing the power generation operation by using the charged power generation fuel to which water is mixed in advance, therefore, as shown in FIG. 35B, as a structure of the vapor reforming reaction portion 160X constituting the fuel reforming portion 16a, it is possible to apply a structure in which there is formed a single flow path consisting of only the fuel discharge portion 162, the fuel vaporization portion 163, the reforming reaction flow path 164 and the hydrogen gas exhaust portion 165 on one surface side of the small substrate 161.

As described above, the power supply system according to the present invention is obtained by arbitrarily combining the members in each structural examples mentioned above, the power generation module in each embodiment and the attachment/detachment structure in each embodiment. In some cases, it is possible to apply a structure in which a plurality of power generating means such as fuel cells constituting the power generation portion in parallel or a structure in which a plurality of types of power generating means are provided in parallel. Since the operation state of the power generation portion and the charge state of the electric power holding portion are controlled so as to constantly output fixed electric power by the simple signal control with the above-described structure irrespective of the drive state of the device (load), waste of the power generation fuel can be suppressed, and the energy resource utilization efficiency can be improved. Also, the power supply system can be extensively utilized in portable devices such as a mobile phone or a personal digital assistant (PDA) in which a removal general-purpose cell is applied as a power supply, a notebook-size personal computer, a digital video camera, a digital still camera and others.

Moreover, although each of the above concrete structural examples has described the case where the compatibility is realized by setting the outside shape or dimension of the entire power supply system in which the fuel pack is coupled with the power generation module to be equal to that of the general-purpose chemical cell, the present invention is not restricted thereto. The structure in which at least the fuel pack of the power supply system according to the present invention can be detached from or attached to the power generation module can suffice. For example, the present invention may have the structure that the power generation module is integrally attached to or included in the device. According to such a device which includes the power generation module, it is possible to realize a usage that the fuel pack having the power generation fuel charged therein is removed and replaced every time the power generation fuel is used up, and a usage equivalent to a well-known device which attaches or removes the existing chemical cell and assures the operating power supply can be realized. Additionally, in this case, since a general device is provided with a preliminary power supply consisting of, e.g., a primary cell for a clock function or backup of a memory in most cases, it is possible to constitute the power supply system so as to fetch necessary electric power from the preliminary power supply even if such a capacitor provided in the power generation module as described in connection with the second or third embodiment mentioned above must be charged by using an outside power supply, for example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply system which generates supply electric power to drive a load using power generation fuel, said power supply system comprising:
    a fuel charged portion in which the power generation fuel is charged;
    power generating means for generating power generation electric power by using the power generation fuel;
    output controlling means for operating and stopping the power generating means based on a drive state of the load; and
    start-up controlling means for supplying start-up electric power used for operating the output controlling means to the output controlling means.

2. The power supply system according to claim 1, wherein the start-up controlling means supplies electric power independent from the operation of the power generating means to the output controlling means as the start-up electric power at the time of starting up the power generating means, and supplies electric power based on the power generation electric power generated by the power generating means to the output controlling means as the start-up electric power after starting up the power generating means.

3. The power supply system according to claim 1, wherein the start-up controlling means includes switching means for switching supply paths of the start-up electric power to the output controlling means at the time of starting up the power generating means and after starting up the power generating means.

4. The power supply system according to claim 1, wherein the start-up controlling means includes a start-up power supply portion which holds predetermined electric power independently from the operation of the power generating means, and supplies the electric power from the start-up power supply portion to the output controlling means as the start-up electric power at the time of starting up the power generating means.

5. The power supply system according to claim 4, wherein the start-up power supply portion includes a primary cell.

6. The power supply system according to claim 4, wherein the start-up power supply portion includes electric power charged and held by electric power supplied from outside of the power supply system prior to the start-up operation or the power generating means.

7. The power supply system according to claim 1, wherein the start-up controlling means includes an auxiliary electric power holding portion which charges a part of the power generation electric power generated by the power generating means, and supplies charge electric power of the auxiliary electric power holding portion to the output controlling means as the start-up electric power after starting up the power generating means.

8. The power supply system according to claim 1, wherein the power generating means includes a fuel cell which generates the power generation electric power by an electrochemical reaction using the power generation fuel supplied from the fuel charged portion.

9. The power supply system according to claim 8, wherein the fuel cell is a fuel reforming type fuel cell including a fuel reformer which reforms the power generation fuel and extracts a specific component, a fuel, electrode to which the specific component is supplied, and an air electrode to which oxygen in air is supplied.

10. The power supply system according to claim 1, wherein the fuel charged portion is detachable.

11. The power supply system according to claim 1, wherein the power supply system is modularized and configured such that a physical outside shape of the power supply system has a shape and dimensions which are substantially equivalent to a shape and dimensions of a corresponding general-purpose chemical cell.

12. The power supply system according to claim 11, wherein the power supply system has a double-electrode terminal structure.

13. An electronic device connected to the power supply system according to claim 1, wherein the load operates with the supply electric power supplied from the power supply system.

14. The electronic device according to claim 13, wherein parts except the fuel charged portion in the power supply system are integrally constituted with respect to the electronic device.

15. The electronic device according to claim 13, wherein the power supply system is modularized and at least the fuel charged portion is detachable with respect to the electronic device.

16. A power supply system which generates supply electric power to drive a load using power generation fuel, said power supply system comprising:
    a fuel charged portion in which the power generation fuel is charged;
    power generating means for generating power generation electric power by using the power generation fuel;
    electric power holding means for holding electric charge based on the power generation electric power generated by the power generating means, wherein the electric charge is adapted to be used to generate electric power to drive the load; and
    system controlling means for controlling operation and stopping of the operation of the power generating means and for controlling charging and stopping of the charging of the electric power holding means in accordance with a change in the electric power held by the electric power holding means.

17. The power supply system according to claim 16, wherein the power generating means includes a fuel cell which generates the power generation electric power by an electrochemical reaction using the power generation fuel supplied from the fuel charged portion.

18. The power supply system according to claim 17, wherein the fuel cell is a fuel reforming type fuel cell including a fuel reformer which reforms the power generation fuel and extracts a specific component, a fuel electrode to which the specific component is supplied, and an air electrode to which oxygen in air is supplied.

19. The power supply system according to claim 16, wherein the electric power holding means comprises at least one capacitance element.

20. The power supply system according to claim 16, wherein the electric power holding means has a structure such that a plurality of capacitance elements are connected with a predetermined relationship.

21. The power supply system according to claim 16, further including supply electric power generating means for generating the supply electric power, based on held electric power held in the electric power holding means.

22. The power supply system according to claim 21, wherein the supply electric power generating means includes voltage converting means for generating the supply electric power having a predetermined voltage from the held electric power in the holding means.

23. The power supply system according to claim 16, wherein the fuel charged portion is detachable.

24. The power supply system according to claim 16, wherein the system controlling means comprises:
    output controlling means for operating and stopping the power generating means by controlling supply and shutoff of the power generation fuel to the power generating means;
    a voltage monitor/control portion which outputs a first control signal which monitors a voltage component of the held electric power in the electric power holding means and controls start-up and stop of the power generating means in accordance with a change in the voltage component, and a second control signal which controls the charging and stops the charging with. respect to the electric power holding means; and
    start-up controlling means for controlling supply of start-up electric power used for operating the output controlling means and controlling an operation state of the power generating means based on at least the first control signal from the voltage monitor/control portion.

25. The power supply system according to claim 24, wherein the voltage monitor/control portion at least outputs the first control signal used for controlling the power generating means to stop when a voltage of held electric power in the electric power holding means has reached a predetermined upper limit value, and the first control signal used for controlling the power generating means to start up when a voltage of held electric power in the electric power holding means has reached or become lower than a predetermined lower limit value.

26. The power supply system according to claim 24, wherein the start-up controlling means supplies a part of the held electric power in the electric power holding means to the output controlling means as the start-up electric power when starting up the power generating means.

27. The power supply system according to claim 16, wherein the power supply system is modularized, and a physical outside shape of the power supply system has a shape and dimensions which are substantially equivalent to a shape and dimensions of a corresponding general-purpose chemical cell.

28. The power supply system according to claim 27, wherein the power supply system has a double-electrode terminal structure.

29. An electronic device connected to the power supply system according to claim 16, wherein the load operates with the supply electric power.

30. The electronic device according to claim 29, wherein parts except the fuel charged portion in the power supply system are integrally constituted with respect to the electronic device.

31. The electronic device according to claim 29, wherein the power supply system is modularized and at least the fuel charged portion is detachable with respect to the electronic device.

32. A power supply system which generates supply electric power, said power supply system comprising:
    a fuel charged portion in which power generation fuel is charged;
    power generating means for generating power generation electric power by using the power generation fuel;
    output controlling means for operating and stopping the power generating means; and
    start-up controlling means for supplying start-up electric power used for operating the output controlling means to the output controlling means;
    wherein the start-up controlling means includes a start-up power supply portion which holds predetermined electric power independently from the operation of the power generating means, and supplies the electric power from the start-up power supply portion to the output controlling means as the start-up electric power at the time of starting up the power generating means; and
    wherein the start-up power supply portion includes a primary cell.

33. A power supply system which generates supply electric power, said power supply system comprising:
    a fuel charged portion in which power generation fuel is charged;
    power generating means for generating power generation electric power by using the power generation fuel;
    electric power holding means for holding electric charge based on the power generation electric power generated by the power generating means; and
    system controlling means for controlling operation and stopping of the operation of the power generating means and for controlling charging and stopping of the charging of the electric power holding means in accordance with a change in the held electric power;
    wherein the system controlling means comprises:
        output controlling means for operating and stopping the power generating means by controlling supply and shutoff of the power generation fuel to the power generating means;
        a voltage monitor/control portion which outputs a first control signal which monitors a voltage component of the held electric power in the electric power holding means and controls start-up and stop of the power generating means in accordance with a change in the voltage component, and a second control signal which controls the charging and stops the charging with respect to the electric power holding means; and start-up controlling means for controlling supply of start-up electric power used for operating the output controlling means and controlling an operation state of the power generating means based on at least the first control signal from the voltage monitor/control portion.

* * * * *

UNITED STATES PATENT AND TRADEMARK OFFICE
CERTIFICATE OF CORRECTION

PATENT NO.       : 6,824,905 B2               Page 1 of 1
APPLICATION NO.  : 10/043404
DATED            : November 30, 2004
INVENTOR(S)      : Masaharu Shioya et al.

It is certified that error appears in the above-identified patent and that said Letters Patent is hereby corrected as shown below:

Column 29, line 22, change "diodes D 41 and D41"

to --diodes D 41 and D 42--.

Column 34, line 55, change "1/m2" to --$1/m^2$--.

Column 37, line 36, change "FIG. 66A"

to --FIG. 31A--.

Column 39, line 62, change "62" to --72--.

Column 40, line 30, change "FIGS. 28D to 28G"

to --FIGS. 28D to 28F--.

Column 41, line 43, change "FIG. 48" to --FIG. 34--.

Column 42, line 11 to 12, delete ", as shown in FIGS. 49 and 60".

Signed and Sealed this

Twelfth Day of February, 2008

JON W. DUDAS
*Director of the United States Patent and Trademark Office*